United States Patent
Satoyama et al.

(10) Patent No.: US 8,984,221 B2
(45) Date of Patent: Mar. 17, 2015

(54) METHOD FOR ASSIGNING STORAGE AREA AND COMPUTER SYSTEM USING THE SAME

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 746 days.

(21) Appl. No.: 13/318,001

(22) PCT Filed: Oct. 18, 2011

(86) PCT No.: PCT/JP2011/005806
§ 371 (c)(1),
(2), (4) Date: Oct. 28, 2011

(87) PCT Pub. No.: WO2013/057751
PCT Pub. Date: Apr. 25, 2013

(65) Prior Publication Data
US 2013/0097377 A1    Apr. 18, 2013

(51) Int. Cl.
*G06F 12/00*    (2006.01)
*G06F 3/06*    (2006.01)

(52) U.S. Cl.
CPC ............ *G06F 3/0665* (2013.01); *G06F 3/0605* (2013.01); *G06F 3/0611* (2013.01); *G06F 3/0631* (2013.01); *G06F 3/0647* (2013.01); *G06F 3/065* (2013.01); *G06F 3/0685* (2013.01)
USPC .......................................... 711/114; 711/117

(58) Field of Classification Search
CPC .............................. G06F 3/0689; G06F 12/08
See application file for complete search history.

(56) References Cited

U.S. PATENT DOCUMENTS

| 7,613,945 B2 | 11/2009 | Soran et al. |
| 2005/0055603 A1 | 3/2005 | Soran et al. |
| 2009/0070541 A1 | 3/2009 | Yochai |

FOREIGN PATENT DOCUMENTS

| EP | 2 302 500 A2 | 3/2011 |
| WO | WO 2011/045831 A1 | 4/2011 |

OTHER PUBLICATIONS

PCT International Search Report and Written Opinion on application PCT/JP2011/005806 mailed Apr. 18, 2012; 13 pages.

*Primary Examiner* — Baboucarr Faal
(74) *Attorney, Agent, or Firm* — Foley & Lardner LLP

(57) ABSTRACT

When a method for relocating data to a preferable storage area based on access frequency is applied to virtual machines, it takes a long time for determining volumes that are not accessed, and the access performance is deteriorated. The present invention provides a system and method in which a utilization status of a virtual machine is checked by the storage system, and pages used by virtual machines not being utilized are relocated promptly to lower tiers and pages used by virtual machines being utilized are relocated promptly to higher tiers, according to which the performance of the system is improved.

4 Claims, 38 Drawing Sheets

| Tier# | Storage location | Media type | Rotation speed | RAID level |
|---|---|---|---|---|
| 0 | Inside | SSD | | |
| 1 | Inside | SAS | 10K | RAID1 |
| 2 | Inside | SAS | 10K | RAID5 |
| 3 | Inside | SATA | | RAID5 |
| 4 | Outside | SAS | | RAID5 |
| 5 | Outside | SAS | | RAID5 |

| Tier# | Media type |
|---|---|
| 0 | SSD |
| 1 | SAS |
| 2 | SATA |

| LANE# | Tier combination |
|---|---|
| 0 | Tier0 |
| 1 | Tier1 |
| 2 | Tier2 |
| 3 | Tier0, Tier1 |
| 4 | Tier1, Tier2 |
| 5 | Tier0, Tier1, Tier2 |

- Logical device number
- Size
- Device attributes
- Pool ID
- Status
- LANE number

METHOD FOR ASSIGNING STORAGE AREA AND COMPUTER SYSTEM USING THE SAME

TECHNICAL FIELD

The present invention relates to a storage system and a method for managing the same, and relates to controlling the storage system for dynamically allocating storage capacities to host computers.

BACKGROUND ART

Conventionally, computer systems providing large-scale data storage services to host computers have been provided. The computer systems are known to include a host computer, a storage system to which the host computer is coupled, and a management server of the storage system.

The storage system manages multiple hard disks via a RAID (Redundant Array of Independent/Inexpensive Disks) system. The storage system forms logical areas from physical storages areas included in the large number of hard disks and provides the same as logical volumes to the host computer. The host computer accesses the logical volume and sends read/write requests of data.

One example of such art for forming logical areas is called a capacity virtualization technique (a dynamic provisioning technique). According to the capacity virtualization technique, there is no physical storage area, and a logical volume having a virtualized storage capacity is assigned with respect to the host device. Such logical volume is called a virtual volume, and simultaneously when the host device requests a write access to the virtual volume, the storage system sequentially assigns storage areas to the virtual volume. Therefore, the present art enables to effectively utilize storage resources compared to a method in which a large capacity storage area is assigned from the beginning to the logical volume.

Patent literatures 1 and 2 are examples disclosing the capacity virtualization technique. In the method for assigning storage areas to a virtual volume according to the disclosed capacity virtualization technique, when a write access occurs from a host device to the virtual volume, a storage area from a capacity pool having a real storage area is assigned to the virtual volume address and the write data is stored therein. The storage area of the capacity pool is composed of a variety of memory media having various access performances and costs, wherein the frequently used data are stored in a storage area composed of memory media having a high access performance. This "capacity pool" (also simply referred to as "pool") is formed for example by organizing multiple logic groups having real capacities to correspond to write requests to virtual volumes. The multiple logical volumes belonging to the pool are each referred to as pool volumes.

Further according to patent literature 2, whether the frequency of access to stored data is high or not is determined. If the access frequency is high, a media suitable for high speed processing is selected based on the physical characteristics information of the media (such as the media type or the rotation speed of disks) in the pool volume. Data is migrated to a pool of the pool volume composed of the selected media to improve the access performance thereof.

CITATION LIST

Patent Literature

PTL 1: US Patent Application Publication No. 2009/0070541

PTL 2: U.S. Pat. No. 7,613,945 (US Patent Application Publication No. 2005/0055603)

SUMMARY OF INVENTION

Technical Problem

According to the disclosed prior art, if the frequency of access to data is high, the data is relocated to a storage area of a media suitable for high speed processing based on the physical characteristics information of media in the pool volume. However, it takes a long time to determine the relocation of data to a storage area of a preferable media based on the monitored result of access frequency of the data. For example, if the present prior art is applied to a virtual machine, if the virtual machine includes a volume that is not accessed, it takes a long time according to the aforementioned access frequency monitoring method to determine that the volume is not accessed.

The present invention aims at solving the problems of the prior art by providing a technique for monitoring the change of status of the host computer and sharing the status information of the host computer among storage systems to enable speedy relocation of data to appropriate tiers and to enable more efficient use of media.

Solution to Problem

In order to solve the problems mentioned above, the present invention enables the storage system to recognize the status of VMs and to relocate data to a storage area of a memory device in a tier different from the tier of the assigned storage area.

Actually, the present invention provides a computer system comprising a host computer on which a plurality of virtual machines are operated, a management server, and a storage system mutually coupled to one another; wherein the storage system comprises a control unit, a cache memory unit, a shared memory unit, a physical memory device unit composed of multiple types of devices, and a virtual machine status management unit; the control unit generates a plurality of logical volumes to be assigned to the host computer; the physical memory device unit composed of the multiple types of devices having tier assigned to each type of devices; the logical volumes are mapped to the virtual machines; and the type of the memory device assigned to the logical volume mapped to the virtual machines is changed based on a status information of the virtual machine that the virtual machine status management unit acquires from the virtual machine.

Further, the present invention provides a method for assigning a storage area in a computer system comprising a host computer on which a plurality of virtual machines are operated, a management server, and a storage system composed of a control unit, a cache memory unit, a shared memory unit and a physical memory device unit composed of multiple types of devices, which are mutually coupled to one another; the method comprising: a step of the storage system generating a plurality of logical volumes to be assigned to the host computer; a step of assigning tier to each type of devices of the physical memory device unit composed of the multiple types of devices; a step of mapping the logical volumes to the virtual machines; and a step of changing the type of the memory device assigned to the logical volume mapped to the virtual machine based on a status information of the virtual machine that the virtual machine status management unit acquires from the virtual machine.

Advantageous Effects of Invention

According to the present invention, data can be assigned to an appropriate tier at a timing at which the status of a VM has changed, so that the media can be used effectively and the performance of the system can be enhanced. The problems, arrangements and effects other than those mentioned above will become apparent from the preferred embodiments for carrying out the present invention and the accompanying drawings.

DESCRIPTION OF EMBODIMENTS

Figure 1:
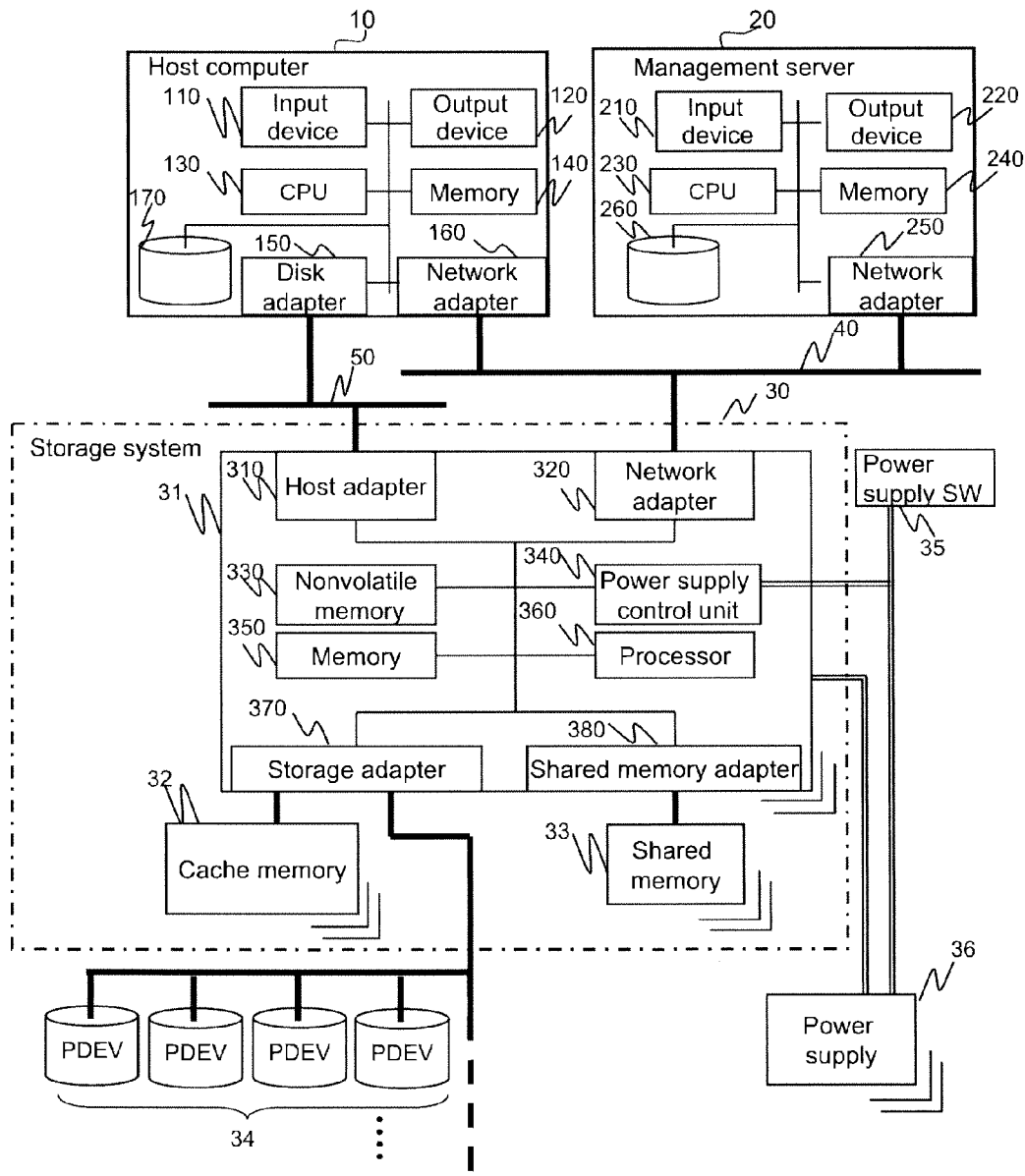
FIG. 1 is a hardware block diagram illustrating a basic configuration of a computer system according to the present invention.

Now, the preferred embodiments of the present invention will be described with reference to the drawings. The present embodiments are merely examples for realizing the invention, and are not intended to restrict the technical range of the invention. In the drawings, the same reference numbers are provided to common components.

Further, the information of the present invention is referred to as "table", but the information is not necessarily expressed via a data structure using a table, and it can be expressed via a data structure such as a "list", a "DB (database)", a "queue" or other structures. Therefore, "table", "list", "DB", "queue" and the like are also simply referred to as "information" to show that the information does not depend on the data structure. Further, contents of various information may be referred to as "identification information", "identifier", "name" and "ID", which are mutually replaceable.

In the following description, the embodiments are explained so that a "program" is set as the subject, but since the program is executed via a processor that performs given processes using memories and communication ports (communication control units), the processor can also be set as the subject of the processes. Moreover, the processes described to be performed via the program can also be performed via a computer such as a management server or an information processor. All or a portion of the programs can be realized via a dedicated hardware, or can be formed into modules. The various programs can be installed to the respective computers for example via program distribution servers or memory media.

Embodiment 1

(1) Configuration of a Computer System According to the Present Invention
(1-1) System Configuration
(1-1-1) Basic Configuration FIG. 1 is a hardware block diagram showing a basic configuration of a computer system according to the present invention. A computer system 1 comprises at least one host computer 10 (such as a general-purpose large scale computer or a server), at least one management server (management computer) 20, and at least one storage system 30 having said devices coupled thereto. The storage system 30 can also be referred to as storage system or storage subsystem.

The host computer 10 accesses the logical storage resources of the storage system 30. The management server 20 manages the structure of memory areas of the storage system 30. The storage system 30 stores data in a storage area set in a physical device 34. The host computer 10 comprises an input device 110, an output device 120, a CPU (Central Processing Unit) 130, a memory 140, a disk adapter 150, a network adapter 160 and a disk drive 170.

The input device 110 is a means for receiving input from an administrator operating the host computer 10 and the like, which is formed for example of a keyboard and a mouse. The output device 120 is a means for displaying conditions and settings of the host computer 10, which is formed for example of a display device, a printer and the like. The CPU 130 (controller, processor) reads a program stored in the disk drive 170 to the memory 140 and executes processes stated in the program. The memory 140 is composed for example of a RAM (Random Access Memory) for storing programs, data and the like.

The disk adapter 150 is coupled to the storage system 30 via a storage area network 50, and transmits and received data to/from the storage system 30. The storage area network 50 realizes data transmission via a protocol suitable for data transmission (such as a fiber channel).

The network adapter 160 transmits and receives data to/from the management server 20 or the storage system 30 via a management network 40. The management network 40 is composed for example of Ethernet (Registered Trademark). The disk drive 170 is composed for example of a hard disk device for storing data and programs. The management server 20 comprises an input device 210, an output device 220, a CPU 230, a memory 240, a network adapter 250 and a disk drive 260.

The input device 210 is a means for receiving input from an administrator or the like operating the management server 20, which is formed for example of a keyboard. The output device 220 is a means for displaying the status or settings of the management server 20, which is formed for example of a display device.

The CPU 230 reads a management program stored in the disk drive 260 into the memory 240 and executes a management process for managing the storage system 30 based on the program. The memory 240 is composed for example of a RAM, for storing programs, data and the like.

The network adapter 250 transmits and receives data to/from the host computer 10 or the storage system 30 via the management network 40. The disk drive 260 is composed for example of a hard disk device, for storing data, programs and the like.

The storage system 30 comprises a controller 31, at least one cache memory 32, at least one shared memory 33, a physical device 34, a power supply switch 35 and at least one power supply 36.

The controller 31 controls the storage of data to a storage area formed in the physical device 34. The cache memory 32 temporarily stores data written to and read from the physical device 34. The shared memory 33 stores configuration information of the controller 31 or the physical device 34.

The physical device 34 is composed of a plurality of disk devices. The power supply 36 supplies power to respective sections of the storage system 30. The power supply switch 35 is a switch for turning the supply of power from the power supply 36 on and off. The disk device (storage system) is composed of a hard disk drive, for example, and mainly stores user data. The memory device can also be composed of a semiconductor memory such as a flash memory.

The controller 31 at least comprises a processor 360, and in the present embodiment, further comprises a host adapter 310, a network adapter 320, a nonvolatile memory 330, a power supply control unit 340, a memory 350, a storage adapter 370 and a shared memory adapter 380.

The host adapter 310 transmits and receives data to/from the host computer 10 via a storage network 50. The network adapter 320 transmits and receives data required for system administration (management information) to/from the host computer 10 or the management server 20 via the management network 40.

The nonvolatile memory 330 is composed for example of a hard disk or a flash memory, and stores programs that operate on a controller 31, configuration information and so on. The power control unit 340 controls the power supplied from the power supply 36.

The memory 350 is composed for example of a RAM, and stores programs and data. The processor 360 reads programs stored in the nonvolatile memory 330 to the memory 350 and executes processes prescribed in the programs.

The storage adapter 370 transmits and receives data to/from the physical device 34 and the cache memory 32. The shared memory adapter 380 transmits and receives data to/from the shared memory 33.

(1-1-2) First Configuration of Computer System

Figure 2:
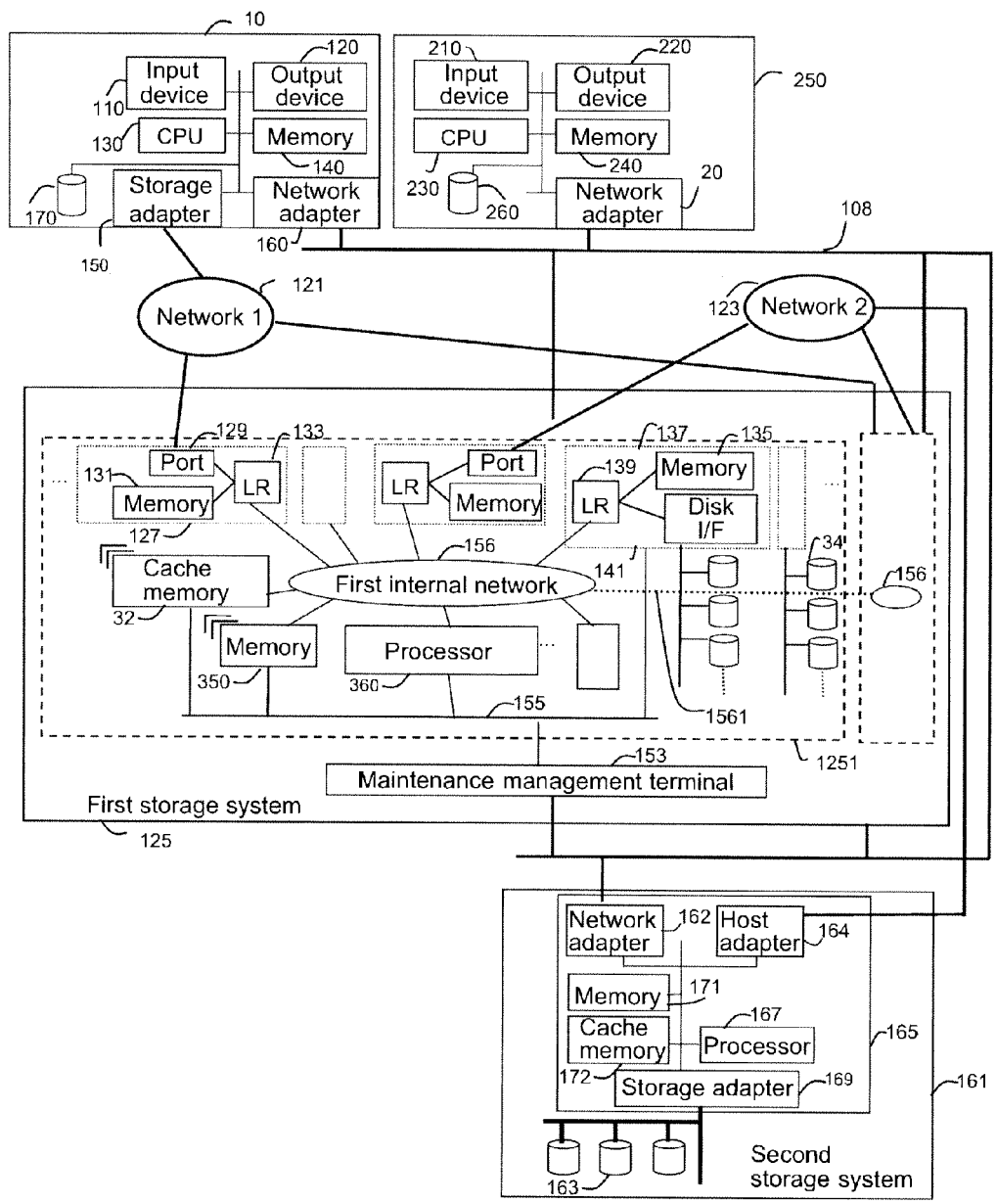
FIG. 2 is a view showing a first configuration of a computer system to which the present invention is preferably applied.

FIG. 2 is a hardware block diagram showing another embodiment of a configuration of the computer system 1 of FIG. 1. The computer system 1 is composed of one or more host computers 10, a management server 20, a first storage system 125 and a second storage system 161.

The first storage system 125 is coupled to the host computer 10 via a first network 121. The second storage system 161 is coupled to a first storage system 30A via a second network 123. The one or more host computers 10, the management server 20, the first storage system 125 and the second storage system 161 are mutually coupled via a third network 108.

The first network 121, the second network 123 and the third network 108 can be any type of network. For example, a SAN can be used for the first network 121 and the second network 123, and a LAN can be used for the third network 108.

The first storage system 125 comprises a controller (not shown) and a physical device 34. The controller comprises, for example, a plurality of front end interfaces 127, a plurality of back end interfaces 137, a first internal network 156, one or more cache memories 32, one or more memories 350 and one or more processors 360.

The front end interface 127 is an interface circuit for communicating with a host computer 10 coupled to the first storage system 125 via a first network 121 or with a second storage system 161. Accordingly, the first storage system 125 at least comprises two front end interfaces 127, one of which is coupled to the first network and the other one of which is coupled to the second network 123.

The front end interface 127 comprises, for example, a port 129 coupled to the first network 121 or the second network 123, a memory 131, and a local router (hereinafter abbreviated as "LR") 133. The LR 133 has the port 129 and a memory 131 coupled thereto.

The LR 133 sorts data received via the port 129 for processing via arbitrary processors 360. Actually, the LR 133 is set so that the process 360 executes an I/O command designating a certain address via the processor 360. Based on the setting, the LR 133 sorts the I/O command and data.

Multiple backend interfaces 137 are provided. A backend interface 137 is an interface circuit for realizing communication with a physical device 34. The backend interface 137 comprises, for example, a disk interface 141, a memory 135 and an LR 139 coupled to the physical device 34. The disk interface 141 and the memory 135 are coupled to the LR 139.

The first internal network 156 is composed, for example, of a switch or a bus. The first internal network 156 has coupled thereto a plurality of front end interfaces 127, a plurality of back end interfaces 137, one or more cache memories 32, one or more memories 350 and one or more processors 143. The communication among these components is performed via the first internal network 156.

A second internal network (such as a LAN) 155 is coupled to the front end interfaces 127, the back end interfaces 137, the cache memory 32, the memory 350 and the processor 360 which are components constituting the controller 31, and to the second internal network 155 is coupled a maintenance and management terminal 153.

The maintenance and management terminal 153 is also coupled to a third network 108, which is a computer for performing maintenance or management of the first storage system 125. A maintenance crew of a first storage system 125 can define various information stored in the memory 350 by manipulating the maintenance and management terminal 153 (or a management server 20 capable of communicating with the maintenance and management terminal 153), for example.

The second storage system 161 comprises a controller 165 and a physical device 163. The controller 165 comprises, for example, a network adapter 162, a host adapter 164, a cache memory 172, a memory 171, a processor 167 and a storage adapter 169.

The network adapter 162 is an interface coupled to the third network 108 and communicating with the management server 20. Transmission and reception of management information required for system management is performed between the management server 20 and the host computer 10 or between the management server 20 and the second storage system 161 via the third network. The host adapter 164 is an interface coupled to the second network 123 and communicating with the first storage system 125. The host adapter 164 can adopt a similar arrangement as a front end interface 127 to the first storage system 125.

The memory 171 is a memory for storing various computer programs and information. The cache memory 172 is a memory for temporarily storing data to be read or written based on an I/O command from the first storage system 125.

The processor 167 executes various computer programs stored in the memory 171. At least, the processor 167 controls the writing and reading of data with respect to the cache memory 172 and the physical device 163 according to the I/O command from the first storage system 125.

The physical device 163 is a physical storage system, and can be similar to the physical device 34, for example. The physical device 163 can also be a tape recording medium.

The first storage system 125 has a so-called external coupling function. The second storage system 161 is externally coupled to the first storage system 125 via this function. We will now describe what is meant by external coupling.

As described, the first storage system 125 provides one or more logical volumes to the host computer 10. Each logical volume is recognized as a single memory device via the host computer 10. For example, the logical volume that the first storage system 125 provides can be associated with the physical device 34 within the first storage system 125. In that case, when the first storage system 125 receives a write command to the logical volume, data is stored in the physical device 34 associated with the logical volume. Such a logical volume is also referred to as a normal volume in the following description.

The logical volume that the first storage system 125 provides can be associated with the physical device 163 within the second storage system 161. In that case, when the first storage system 125 receives a write command to the logical volume, a write command for writing data into the physical device 163 associated with the logical volume is generated. The first storage system 125 transmits the generated write command to the second storage system 161. The second storage system 161 stores the data in the physical device 163 based on the write command received from the first storage system 125.

As described, the function for storing the data to be stored in the logical volume that the first storage system 125 provides actually in the second storage system 161 coupled outside the first storage system 125 is called an external coupling function.

The first storage system 125 comprises a plurality of modules (clusters) 1251 for establishing a storage control process. Each module comprises an internal network 156, and a plurality of module internal networks 156 are coupled via an inter-module network 1561. Accordingly, a single module processor 360 can access another module, that is, can read or write data from/to the cache memory 32 of another module. A plurality of inter-module networks 1561 are composed of paths and switches.

(1-1-3) First Configuration of Computer System

Figure 3:
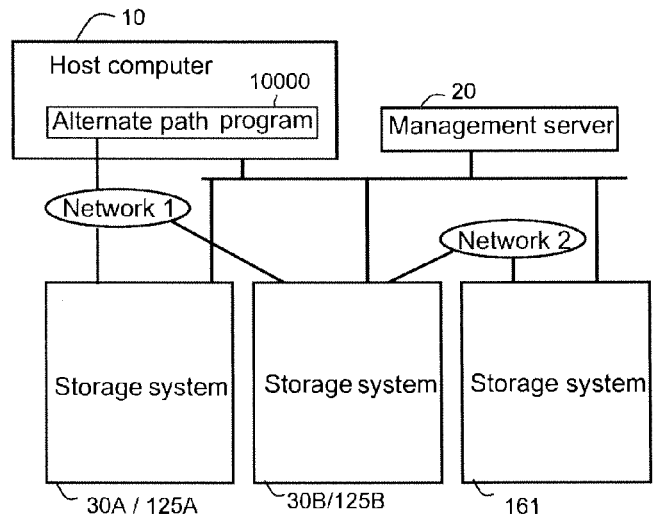
FIG. 3 is a view showing a second configuration of a computer system to which the present invention is preferably applied.

FIG. 3 is a hardware block diagram illustrating a configuration of a computer system 1 to which a plurality of storage systems as shown in FIG. 1 or FIG. 2 is coupled. According to the computer system 1, a plurality of storage systems 30 (FIG. 1) or 125 (FIG. 2) are coupled, which are respectively coupled to the host computer 10 and the management server 20. The storage system 161 is coupled to a second storage system 30B or a second storage system 125B. According to the present embodiment, a storage system 161 is coupled to the second storage system 30B or the second storage system 125B, but it is possible to couple different storage systems 161 to the first storage system 30A and the first storage system 125A, or to couple the same storage system 161 thereto.

An alternate path program 10000 is used in order to utilize two of the first storage system 125A or the first storage system 30A and the second storage system 30B or the second storage system 125B as a single storage system from the host computer 10.

A path management table (not shown), an alternate path program 10000 and a plurality of application programs (not shown) are stored within the memory 140 of the host computer 10. A plurality of paths associated with a single logical volume via the path management table can be a path to a logical unit of a different storage system. In other words, the host computer 10 sets the storage system 125 or the storage system 30 as an alternate path of the same logical volume. These logical units can be provided to a plurality of application programs by returning the same response to an inquiry based on an inquiry command determined via SCSI standard.

The alternate path program 10000 or a corresponding program can be stored in the OS (Operating System), or in a storage system 30, a storage system 125 or a first network 121, or in a device arranged between the storage system 30 or the storage system 125 and the host computer 10.

(1-1-4) Internal Configuration of Storage System

Figure 4:
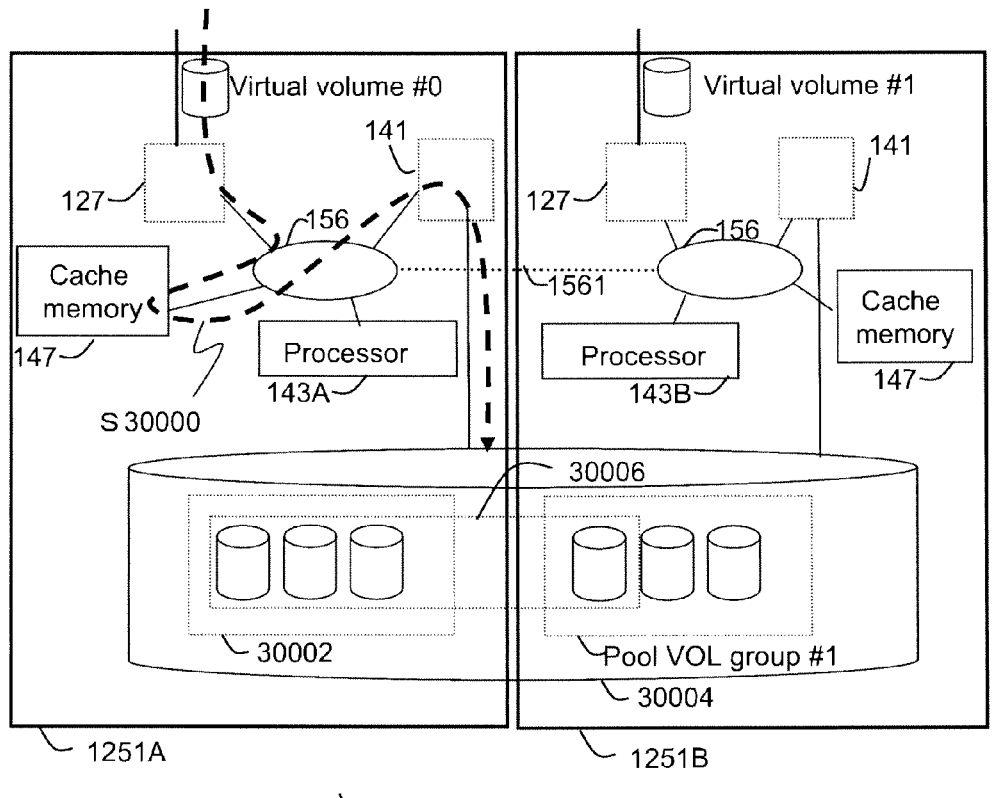
FIG. 4 is a view showing a hardware configuration of an example in which the storage system of FIG. 2 includes multiple modules (clusters).

FIG. 4 is a hardware block diagram showing a configuration in which the storage system shown in FIG. 2 has multiple modules. A first module 1251A controls the accesses to a first virtual volume (VOL #0), and a second module 1251B controls the accesses to a second virtual volume (VOL #1).

A pool volume #1 (30004) shown in FIG. 4 can be formed astride the multiple modules. However, according to the equipment configuration of the network 1561, the transfer speed may be reduced and the performance may be deteriorated by passing through this network 1561. In order to prevent such drawback, the system selects a pool volume that does not pass through the network 1561 when assigning a pool volume to the virtual volume (VOL #0). At this time, the storage system 30 manages the pools in module units. Examples of such management are a pool volume group #0 (30002), a pool volume group #1 (30004) and a pool volume group #2 (30006).

When the storage system 30 assigns a page to the virtual volume #0 set to the module 1251A, the pool volume of pool volume group #0 (30002) is selected (S30000).

The storage system 30 manages the capacity of pool groups via units of multiple tiers. As mentioned in detail later, the system capacity pool is managed in a similar manner. When assuming that the capacity of pool volume group #0 (30002) has depleted, or is likely to be depleted, the storage system 30 adds a pool volume of pool volume group #1 (30004) having spare capacity (when a ratio of free space with respect to the whole capacity is smaller than a predetermined value, it can be determined that the ratio of free space is high) to the pool volume group #0 (30002).

It is possible to set a pool volume group astride pool modules as shown in pool volume group #2 (30006). In that case, the I/O entered from the first module 1251A to the volume existing in the side of pool volume group #2 (30006) 1251B is processed via the network 1561.

The processor 143 of FIG. 4 controls the logical volume coupled within the module 1251. For example, the processing of a pool volume belonging to pool volume group #0 (30002) is performed by processor 143A. The processor mainly performing control of the processes of the virtual volume is the processor 143 within the module to which the pool volume group belongs. The processes of virtual volume #0 are performed by the processor 143A. In contrast, the processes of virtual volume #1 are performed by the processor 143B.

The pool can be set astride modules 1251, but the pool area to be used can be collectively formed within a module 1251 in units of volume used by the VM. As described, if the pool volume group #1 (30004) is formed astride modules 1251, the pools 30004 are used considering the boundaries of modules 1251.

(1-2) Dynamic Allocation Process of Storage Area

Figure 5:
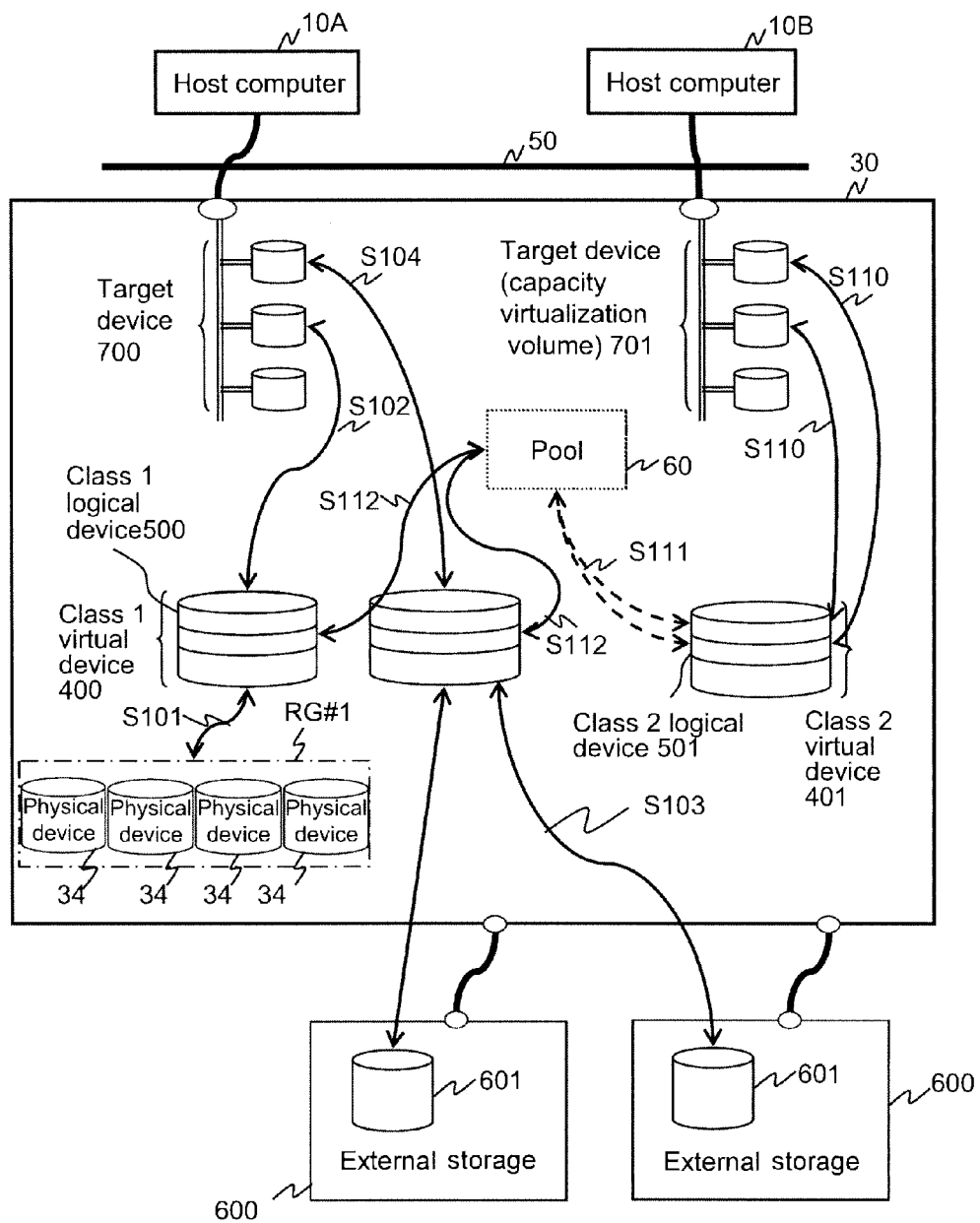
FIG. 5 is a functional block diagram illustrating the operation of dynamic allocation of a storage area performed by the storage system.

FIG. 5 is a block diagram for explaining the operation of dynamic allocation of a storage area performed by the storage system 30. A plurality of physical devices 34 are composed of the same RAID level, by which a RAID group is formed. A virtual device 400 is formed of this RAID group (RG #1) (S101). The virtual device 400 is divided into multiple logical devices 500 which are storage areas. The virtual device composed of physical devices 34 is called a "class 1 virtual device". The logical device included in the class 1 virtual device is called a "class 1 logical device".

A host computer 10A accesses a host-accessing logical unit of the storage system 30. An access target viewed from the host computer 10 is called a "target device". The target device 700 sets up a path definition between a volume including the class 1 logical device 500 and the host computer 10A (S102). The target device 700 is in one-to-one correspondence with the class 1 logical device 500.

The storage system 30 can handle an external storage 600 coupled thereto from the exterior in a similar manner as the physical device 34. This is realized by mapping a logical device 601 of the external storage 600 to the class 1 virtual device 400. Further, multiple class 1 virtual devices 400 are composed of multiple external storages 600 (S103). A RAID group may or may not be foamed on the external storage side, and the mapping operation can be performed by mapping either the logical volume within the external storage or the physical volume itself.

The class 1 virtual device 400 is divided into one or more class 1 logical devices 500 which are storage areas. A path to the host computer 10A is set to the class 1 logical device 500 so as to set up a target device 700 (S104). The storage system 30 further sets up a class 2 virtual device 401. Unlike the class 1 virtual device 400 composed of the physical device 34, the class 2 virtual device is a virtual device having an address area but not having an area corresponding to the physical device 34.

It is possible to set up an area of the cache memory 32 corresponding to the class 2 virtual device 401. The class 2 virtual device 401 includes one or more logical devices. The logical device is called a class 2 logical device 501.

A path to a host computer 10B is set to the class 2 logical device 501 so as to set up a target device 701 (S110). This target device 701 is the target of access of the host computer 10B. The target device 701 is assigned to the class 2 logical device 501. The target device 701 and/or the class 2 logical device 501 correspond to the virtual volume. In the present specification, the target device 701 is referred to as a capacity virtualization volume (a dynamic provisioning volume, hereinafter referred to as virtual volume).

In both class 2 virtual device 401 and class 2 logical device 501, no physical storage area is assigned from the physical device, in other words, they differ from class 1 virtual device 400 and class 1 logical device 500 since the memory capacities are virtualized. In order to enable the host computer 10B to use this virtual area, the class 2 logical device 501 must be mapped to a pool 60 having a real storage area. It is one of the characteristic features of a capacity virtualization technique to use a pool.

A pool 60 is a group having organized one or a plurality of class 1 logical devices 500 via one or a plurality of attributes. The class 1 logical device 500 is assigned to the pool 60 (S112). The class 1 logical device 500 corresponds to the pool volume.

The class 1 logical device 500 set to the pool 60 is assigned to the class 2 logical device 501 using addresses (S111). Therefore, the storage area of the target device 700 will be the class 1 logical device 500, but the storage area of the target device 701 will be the class 2 logical device 501. The pool 60 can be composed of the physical devices 34 within the storage system 30, can be composed of the physical devices (not shown) of the external storage 600, or can be composed of a mixture of the physical devices 34 within the storage system 30 and the physical devices of the external storage 600.

When the storage system 30 receives access to the class 2 logical device 501 via the target device 701, the class 1 logical device 500 corresponding to the class 2 logical device 501 is set as the access destination.

The write data from the host computer 10A and the host computer 10B are stored in the class 1 logical device 500. The class 1 virtual device 400 and the class 2 virtual device 401 are associated via addresses. Therefore, the write data from the host is stored in the physical devices 34.

RG is an abbreviation of a RAID group. A single RG is composed of the same type of physical devices. The types of physical devices are defined at least by either performance or unit cost. Performance refers for example to the rage of I/O of data, or the response time (length of time from receiving a command from a host and returning a response thereto).

Unit cost refers to the cost required to store a data having a unit size (a so-called bit cost, for example). For example, RG #1 is composed of multiple SSDs (Solid State Drive) and physical devices within the external storage 600 or the RG (RAID group) (not shown) formed of the physical devices are composed of multiple SAS type HDDs. The capacities of multiple physical devices forming a single RG can be the same, for example.

(1-3) Mapping of Pool and Virtual Volume

Figure 6:
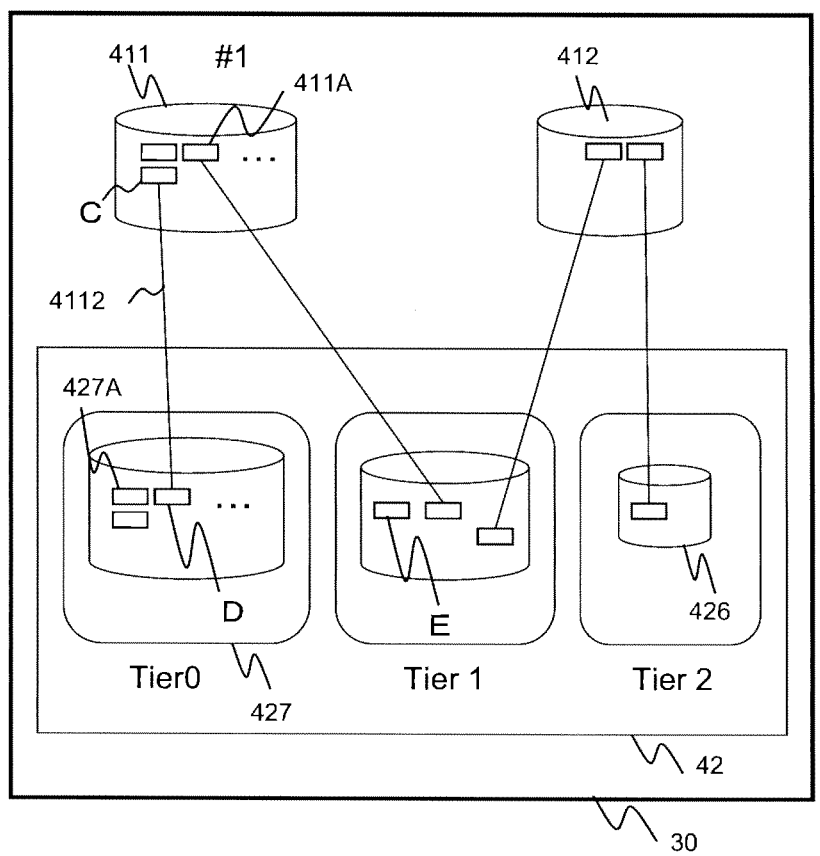
FIG. 6 is a view showing the correspondence between a virtual volume and a pool volume in the storage system.

FIG. 6 is a view showing the mapping of the virtual volume 411 and virtual volume 412 of the storage system and pool volume 426. Reference numbers 411 and 412 each denote one of the target devices 701. Reference number 42 denotes a configuration having combined the pool 60 and the logical device 400 and the physical devices 34 of FIG. 5. Each pool has multiple pool volumes 426. Reference number 427A denotes a page of the pool volume.

Page refers to a unit of the storage area composed of a prescribed capacity for processing the read and write accesses from the host. Write data is stored in one or more pages. There are also cases where page allocation is performed once for each write access, and write data corresponding to multiple write accesses are stored in the same page, wherein if the subsequent write data cannot be stored in the same page, a new page is allocated to the write access corresponding to this write data.

Reference number 411A refers to a virtual page of a virtual volume 411. Unlike the pages of a pool volume 426, the virtual page 411A is a unit of a virtual storage area that does not accompany a real storage area. The read and write accesses from the host are processed via virtual page units of the virtual volume. If the write access from the host is executed in the virtual volume, an actual page of a pool volume is assigned to the virtual page of the virtual volume every time a write access occurs.

Reference number 4112 shows lines mapping the virtual pages of virtual volumes to virtual pages of pool volumes. The storage system 30 maps the virtual volumes to the pools and pool volumes, and pages are assigned to the virtual volumes from pool volumes of pools mapped thereto.

The storage system 30 divides the pool volumes mainly into tiers based on characteristics of the storage system being the source supplying the pool volumes, and manages the same. The tiers are divided into Tier 0, Tier 1 and Tier 2.

Media belonging to Tier 0 are classified as online storages, which are, for example, SSD, SAS and fiber channel HDD having quick response and high reliability. The media belonging to Tier 1 are classified as near-line storages, which are, for example, SATA hard disks and ATA hard disks.

The storage systems belonging to Tier 2 are classified as offline storages, which are inexpensive, large-capacity tape devices, for example. Such classifications are merely examples, and as described later, the storage systems can be classified into tiers based on classifications different from the present classifications.

Now, the basic operation of the present invention will be described with reference to FIG. 6. The storage system 30 provides a virtual volume 411 to the host computer 10 and comprises a plurality of tiers (Tier 0, Tier 1, Tier 2). The virtual volume 411 is a virtual logical volume formed via capacity virtualization technique, that is, a logical volume not based on physical memory devices (hereinafter referred to as physical devices). The virtual volume 411 is composed of multiple virtual pages 411A. The virtual pages 411A are virtual storage areas.

It is assumed that one virtual volume #1 is provided as a virtual volume 411. In the following description, a virtual page #b within the virtual volume #a is expressed as "virtual page #(a-b)". The virtual volume 411 formed via capacity virtualization technique is provided to the host computer 10 as a volume having a virtual capacity, to which a real page is assigned in response to the write request from the host computer 10 to an address of a virtual page.

Therefore, the total capacity of all the real pages assigned to a certain virtual volume 411 is smaller than the virtual capacity, excluding a state where real pages are assigned to completely fill the virtual capacity. One virtual volume 411 is provided to one or more host computers 10, and when one virtual volume 411 is provided to a plurality of host computers 10, the volume is shared by the plurality of host computers 10.

A tier 427 is composed of multiple real pages 427A. The real page 427A is a substantive storage area. For example, two tiers, Tier 0 and Tier 1, are included in tier 427. In the following description, the real page #Y within Tier #X is expressed as "real page #(X-Y)". The tier 427 can be formed for example of one or more real volumes. The real volume is a substantive logical volume, that is, a logical volume based on a physical device. Each of the plurality of tiers 427 within a single pool is designed to be used by one or more virtual volumes 411 prior to having data migrated thereto.

The host computer 10 is generally a computer, but it can be another storage system instead of the computer. The host computer 10 transmits an I/O (Input/Output) command to the storage system 30, for example. The I/O command is a write command or a read command, for example, and includes an I/O destination information. The I/O destination information is information showing the destination of the I/O, which includes, for example, an ID of the virtual volume 411 (such as the LUN, or Logical Unit Number) and the address of the I/O destination (such as the LBA, or Logical Block Address). Based on the I/O destination information, the virtual volume 411 and the virtual page 411A of the I/O destination are specified.

It is assumed that the storage system 30 receives a write command from the host computer 10, and based on the I/O destination information of the write command, a virtual page #(1-C) is specified as write destination. If no real page 427A is assigned to the specified virtual page #(1-C), the storage system 30 assigns any of the free (unassigned) real page #(0-D) to the virtual page #(1-C) and writes a write target data element based on the write command to the assigned real page (0-D).

The data migration among tiers is performed in page units according to the present embodiment. Actually, the storage system 30 executes the following processes (1) through (3) as shown in FIG. 1.
(1) The data element within the real page #(0-D) assigned to the virtual page #(1-C) is migrated to a free (unassigned) real page #(1-E).
(2) The allocation source of the virtual page #(1-C) is changed from real page #(0-D) to real page #(1-E).
(3) The status of real page #(0-D) is updated to free (unassigned state).

(1-4) VM Host Computer Configuration

Figure 7A:
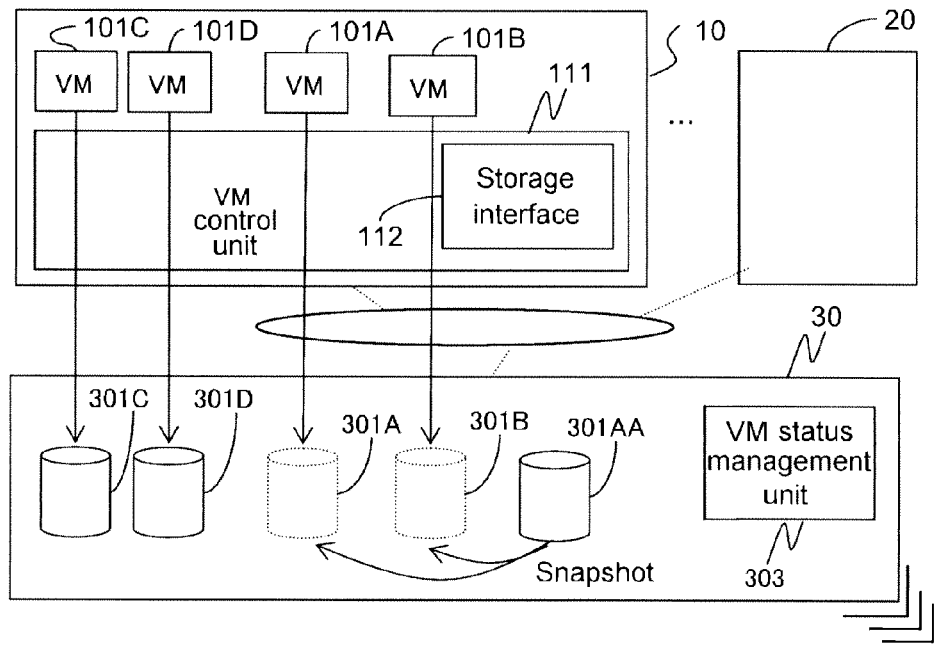
FIG. 7A is a view showing the configuration of a computer system applying a virtual machine mechanism.
Figure 7B:
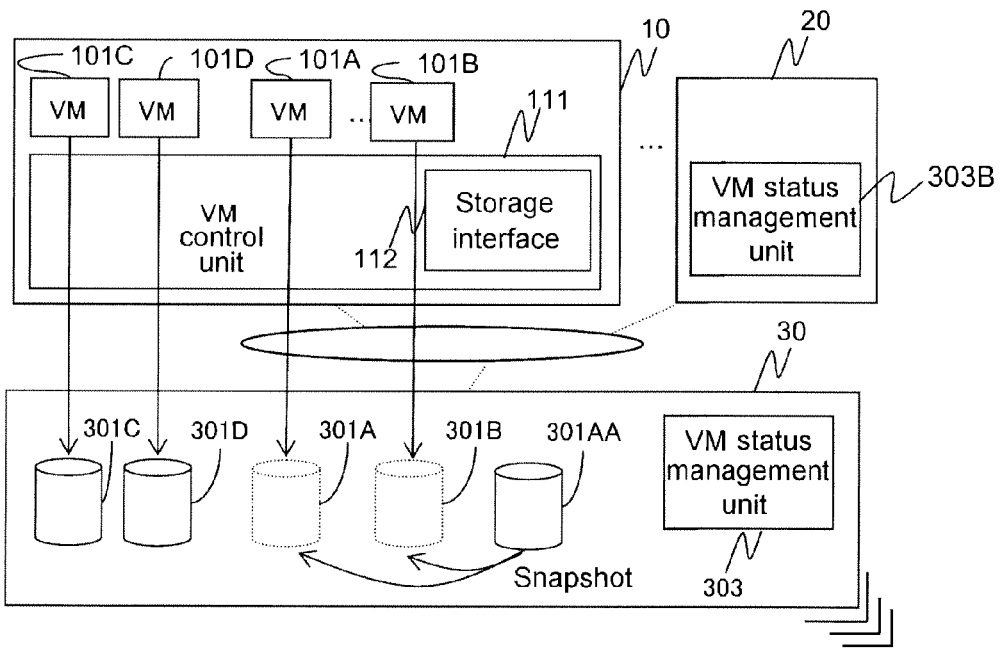
FIG. 7B is a view showing the configuration of a computer system applying a virtual machine mechanism.

FIGS. 7A and 7B illustrate an example of a system configuration of a host computer 10 having a virtualization mechanism (hypervisor) providing a virtual computer (virtual machine (VM), also called a virtual server) 101. The host computer 10 is a physical server formed as hardware. A virtualization mechanism is provided within the host computer 10. The virtualization mechanism is the VM control unit 111, which is a software and/or a hardware for generating and deleting VMs 101, and for executing and controlling VMs 101.

The virtualization mechanism can also be called a virtual host computer control program or a virtual host computer monitor system. The VM control unit 111 generates multiple VMs 101, and can perform independent execution thereof. The generation of VM refers to the process of dividing and assigning resources such as the memory or the processor (CPU) within the physical host computer 10 to the VM.

The VM control unit 111 also performs resource processes. The VM control unit 111 assigns resources such as the storages areas within the storage system 30 when generating the VM 101, and releases the assigned resources within the storage system 30 when deleting the VM 101. It also performs a process to delete the information within the storage area of the storage system 30 used by the deleted VM 101. The VM control unit 111 also executes processes for controlling the schedule in which the VM 101 executes processes. Processes such as the processing of resources, releasing of resources, assigning of resources and deleting of information are realized by a processor within the host computer 10 executing the processes. According to another embodiment, the processes can also be realized via a hardware/firmware.

The VM control unit 111 requires a means for transmitting VM information such as the VM status to the storage system 30. The transmission means include a VM status management unit 303 to which the storage system 30 inquires the status of the VM to the VM control unit 111, and a storage interface 112 having a function to transmit VM information and result of processing the VM information to the storage system 30 from the VM control unit 111 in response to the request from the storage system 30. Further, the VM status management unit 303 can be built into the management server 20 as a VM status management unit 303B as shown in FIG. 7B.

The host computer 10 is coupled to the storage system 30. The host computer 10, the management server 20 and the storage system 30 can also be coupled in a similar manner as shown in FIGS. 1 through 3. FIG. 7A and FIG. 7B illustrates a simplified configuration. The management server 20 stores information of the physical host computer 10. According to the VM environment, a VM can be constructed in a short time by copying a system image (or data or both) of a certain host computer via a copy function of the storage system 30 and having the VM use the copy.

The VM 101 operating on the physical host computer 10 refers to a volume 301 copied via the storage system 30. The volume 301 stores a copy of the VM pattern system image stored in the copy source volume 301AA. Generally, in deploying VMs, it is desired that as much VMs are deployed in a short time as possible. Therefore, in many cases, a local copy created via a snapshot which does not require all data to be copied is used as a copy of the logical volume used in the storage system 30.

The copy source volume 301AA may also be referred to as a primary volume (P-VOL). The copy destination volume 301 may also be referred to as a secondary volume (S-VOL).

Volumes 301A and 301B are virtual volumes. The volume 301AA can either be a virtual volume or a real volume. Volumes 301C and 301D are normal volumes, and can either be a virtual volume or a real volume.

(1-5) Internal Configuration of Memory of Storage System

Figure 8:
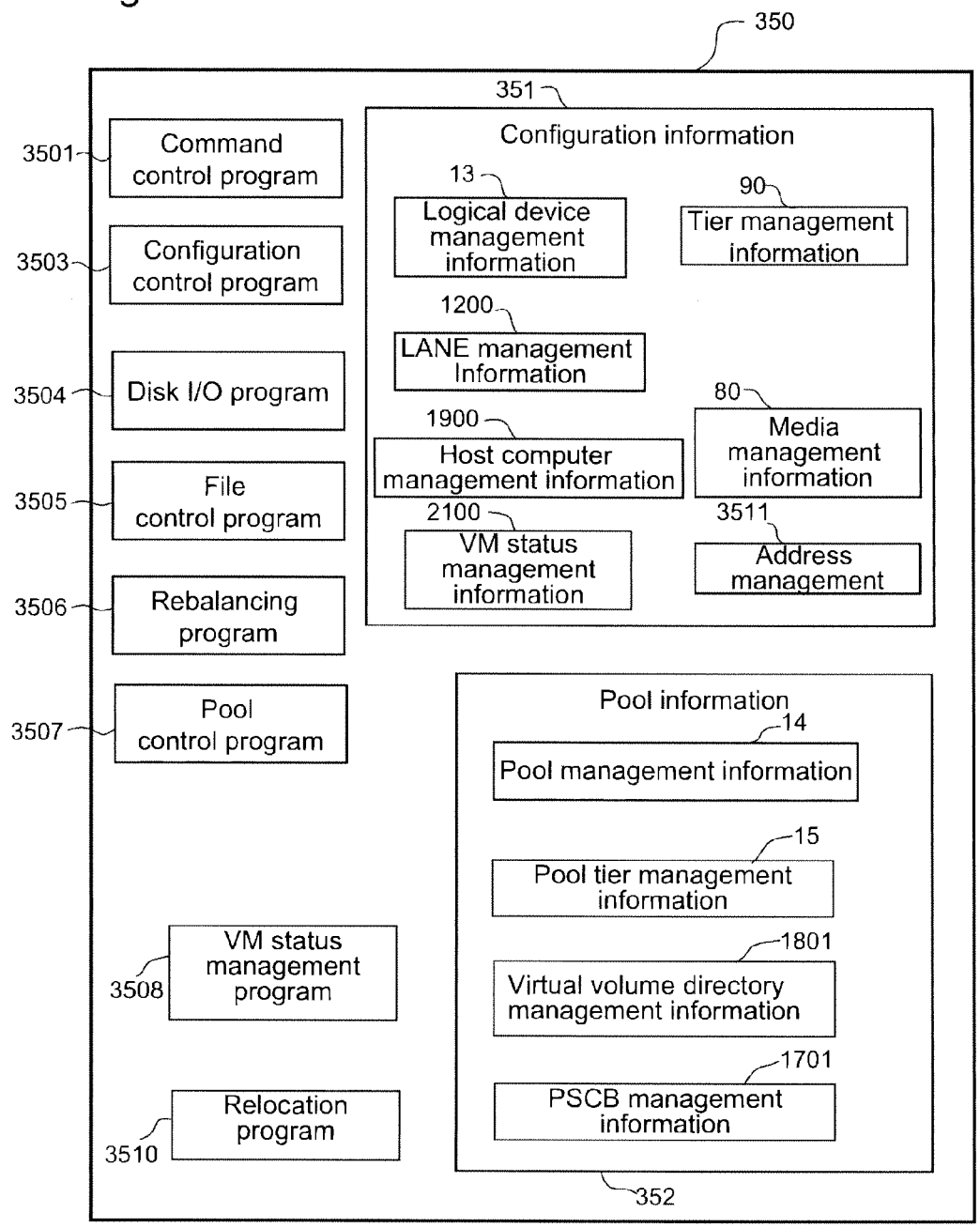
FIG. 8 is a view showing a software configuration within a memory of the storage system.

FIG. 8 is a block diagram illustrating an internal configuration of the memory 350 of the storage system 30. The memory 350 stores various programs read to and executed via the processor 360, the configuration information 351 related to the settings of the logical volumes, and a pool information 352 related to the settings of the pools.

The command control program 3501 interprets the command from the host computer 10 or the management server 20, and executes the process prescribed in the command. A configuration control program 3503 executes processes such as the setting and updating of the configuration of the storage system 30. The disk I/O program 3504 controls the accesses to the physical device 34.

When the host adapter 310 receives a file format data, a file control program 3505 converts the file format data into block unit data. Further, in response to a read request to read a file format data from the host computer 10, the file control program 3505 converts the data read out via block units from the physical device 34 to file unit data.

Figure 45:
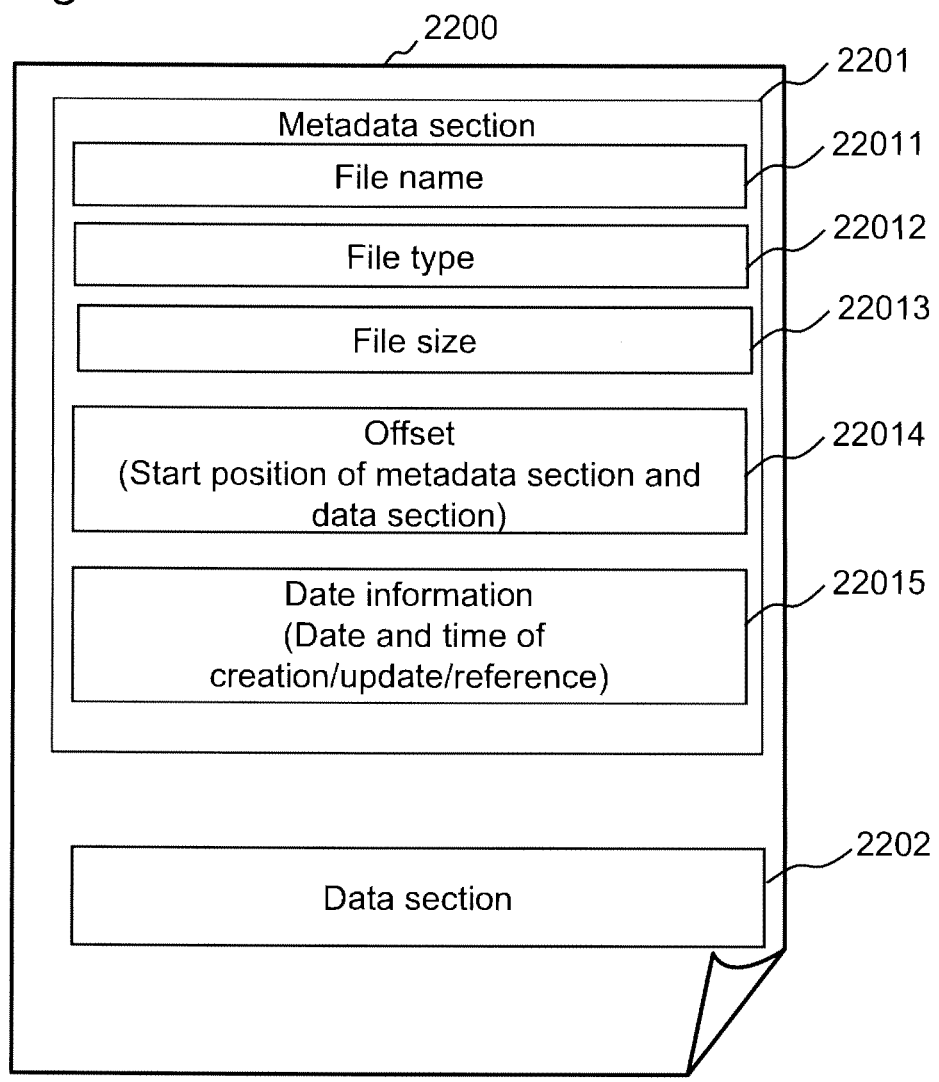
FIG. 45 is a view showing a structure of a file format data.

In other words, the file control program 3505 converts a metadata section 2201 (composed of a file name 22011, a file type 22012, a file size 22013, an offset (start position of metadata section and data section) 22014 and a date information (creation/update/reference date information) 22015) and a data section of a file 2200 as shown in FIG. 45 to block units.

A rebalancing program 3506 migrates pages among pool volumes when storage capacities of pool volumes may become or has become uneven. For example, when a volume is added to a pool, the storage capacity becomes uneven among the added pool volume and the existing pool volume, so that a rebalancing program 3506 migrates pages from existing pool volumes to the added pool volume prior to using the added pool volume so that the storage capacities become even among the respective pool volumes. The migration of pages among the plurality of pool volumes is called the relocation of pages or the rebalancing of pages.

A pool control program 3507 executes various processes regarding the settings of a pool. Actually, the program executes settings such as the registration of a logical device (pool volume) requested via a command to the pool, settings that a volume attribute of the logical device registered to the pool is a pool volume, and settings of a pool ID having registered the base pool ID.

Figure 20:
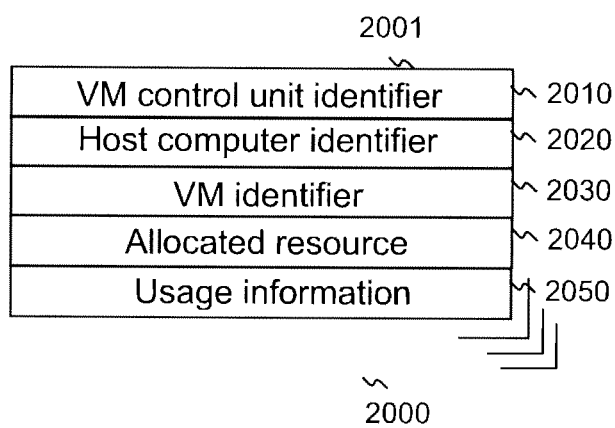
FIG. 20 is a view showing a configuration example of a VM management information table.
Figure 21:
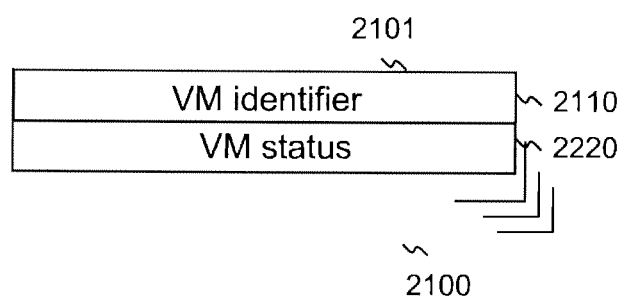
FIG. 21 is a view showing a configuration example of a VM status management information table.

A VM status management program 3508 manages and operates the states of the respective VMs (corresponding host computer, assigned resource, operation status (normal operation/suspended status)) via a VM management information table 2000 of FIG. 20 or a VM status management information table 2100 of FIG. 21.

A relocation program 3501 is a program for changing the tier of the page in which data is stored. At first, the relocation program 3501 determines the tier which is the range of the load (such as the I/O frequency) of the real page that should exist in the target tier. The tier is determined based on capacity and performance, and the tier is determined after referring to the monitored information.

After determining the tier, the relocation program 3510 performs the relocation process according to the tier. For example, the relocation program 3501 checks the plurality of virtual volumes one by one in order, and judges whether the currently located tier corresponds to the tier in which the volume should be located. If they do not correspond, data is migrated and relocated.

The configuration information 351 is the information such as the virtual devices, the logical devices, the tiers and the RAID groups required for setting up the environment of the storage system. The configuration information 351 includes an address management table 3511, a logical device management information table 13, a tier management information table 15, and a LANE management information table 1200. It can further include a virtual device management information table or a RAID group management information table.

The address management table 3511 stores mapping information of the addresses of the target device, the logical device, the virtual device and the physical device, mapping information of the target device and the logical device, mapping information of the logical device and the virtual device, and mapping information of the virtual device and the physical device.

The storage system 30 can recognize which address the correspondence between the addresses of the target devices 700 and 701 and the addresses of the logical devices by referring to the address management table 3511. Further, it can recognize the correspondence between the addresses of the logical devices and the addresses of the virtual devices. It can also recognize which RAID group the addresses of the virtual devices belong to, and the correspondence between the addresses of the physical devices.

The logical device management information table 13 includes the management information related to the logical device. The tier management information table includes management information of the tiers defined to the pool. The LANE management information table 1200 includes information of the combination of tiers defined to the pool.

The pool information 352 stores settings related to the pool, and includes a pool management information table 14, a logical device management information table 13, a virtual volume directory management information table 1601, a PSCB (Pool Slot Control Block) management information table 1701, and a pool tier management information table 15.

The pool management information table 14 includes management information related to the settings of the pools. The virtual volume directory information table 1601 includes information regarding the assignment of logical devices of the pools (pool volumes) to the virtual volumes. The PSCB management information table 1701 includes information of addresses of logical devices in the pools.

The pool tier management information table 15 includes management information of tiers set to the pools. This information is set to correspond to each pool. The process for dynamically allocating the pages of pool volumes in pools to virtual volumes based on the accesses from the host device is realized via a command control program 3501.

A LANE definition program (not shown) replaces the performance requirements instructed from the user with LANE and defines a LANE management information table 1200. It defines the order of priority within the LANE for using tiers or the ratio of tiers used in each LANE. It also sets or changes the LANE associated the virtual volumes. It further selects the pool suitable for the LANE.

(1-5-1) Media Management Information Table

Figures 9, 10, 11:
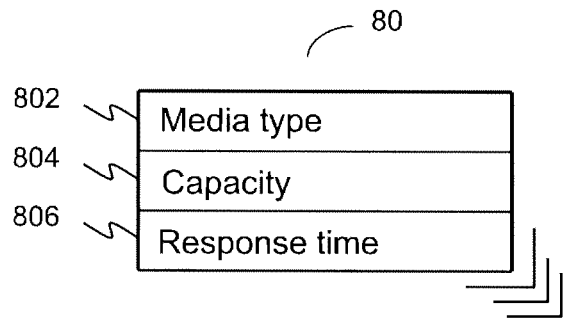
FIG. 9 is a view showing a configuration example of a media management information table.
FIG. 10 is a view showing a first configuration example of a tier management information table.
FIG. 11 is a view showing a second configuration example of the tier management information table.

FIG. 9 is a view showing an example of configuration of a media management information table 80. The media management information table 80 is created by the configuration control program 3503 when a media is coupled to a storage system 30, and includes a media type 802, a capacity 804, and a response time 806 as items of configuration.

The media type 802 refers the types of the media. For example, if the media is a disk, it can be an SSD, a FC (Fiber Channel), an SAS (Serial Attached SCSI), a SATA (Serial ATA) or the like. The response time 806 shows the response time from the media in response to a data read request or data write request. The media having a shorter response time generally has higher processing performance. FIG. 9 merely illustrates one example of the media management information, and it is not intended to exclude other types of information.

(1-5-2) Tier Management Information Table

FIGS. 10 and 11 illustrate tier management information tables 90. These management information are stored in the memory 350 as actual management information of the tier management information. The correspondence between the tier numbers and the media types are shown in the tier management information table (FIG. 10). FIGS. 10 and 11 illustrate an example of classifications for associating the media with the tier numbers. The classification of these media is based on the performance of the media.

Tier # 902 is information showing the identifier of tiers. Reference number 904 refers to the information indicating the storage location of the media. The term "interior" in tier # 902 refers to the HDD (hard disk) built into the storage system 30. The term "exterior" refers to other storage systems 30 externally coupled to the storage system 30.

Rotation speed 908 refers to the information showing the data transfer performance of media. It shows the amount of data that a media can transfer in a unit time, and generally, the greater the value, the higher the data transfer performance of the media. RAID level 910 refers to the information showing the RAID level that can be composed. In other words, the media and the tier numbers are associated based on the rotation speed 908 and the RAID level 910 which are elements influencing the performance of the storage.

FIG. 10 illustrates an example in which media are classified into six types of tiers. The storage system 30 can expand the tiers later, such as by adding a new media. The classification of tiers can be performed by the administrator or the user, or can be determined uniquely via the storage system. Another example of classifying media can adopt a method of adding the viewpoint of bit cost to the performance. If the performance, the cost and the reliability are similar, the media can be collectively classified into a single tier. For example, Tier 1 and Tier 2 of FIG. 10 can be organized together.

FIG. 11 shows an actual example for describing the present embodiment in which the tier levels are divided into three (so that there are three tiers). Only item 906 is shown and the other items are omitted. According to the present embodiment, the adopted policy is that data is stored as much as possible in high performance media and the tier numbers are assigned in order from the higher performance media. According to such policy, the storage area for storing data can be assigned in order prioritizing the tiers having younger numbers. According to another variation of the present embodiment, a method is adopted in which initially assigned tiers are designated.

(1-5-3) LANE Management Table

According to a capacity virtualization technique in which tiers are set, there is a method in which the tier to be used is selected and set for each virtual volume. For example, LANE #3 of FIG. 12 is set for the virtual volume 411 of FIG. 6, and LANE #4 is set for the virtual volume 412.

In the virtual volume, storage areas are assigned to each page based on access characteristics. In FIG. 6, Tier 0 is composed of SSD, Tier 1 is composed of SAS, and Tier 2 is composed of SATA. In this example, the pools are divided into tiers of SSD, SAS and SATA, so that the virtual volume 411 has pages assigned from SSD or SAS, and the virtual volume 412 has pages assigned from SAS or SATA.

As described, the combination of tiers existing within the pool to be used is defined for each virtual volume. This definition is called a LANE. The LANE is information indicating the range of tiers capable of composing the virtual volumes. FIG. 12 shows one example of the LANE using FIG. 6. The tier management information according to this example is shown in FIG. 11.

Figures 12, 13:
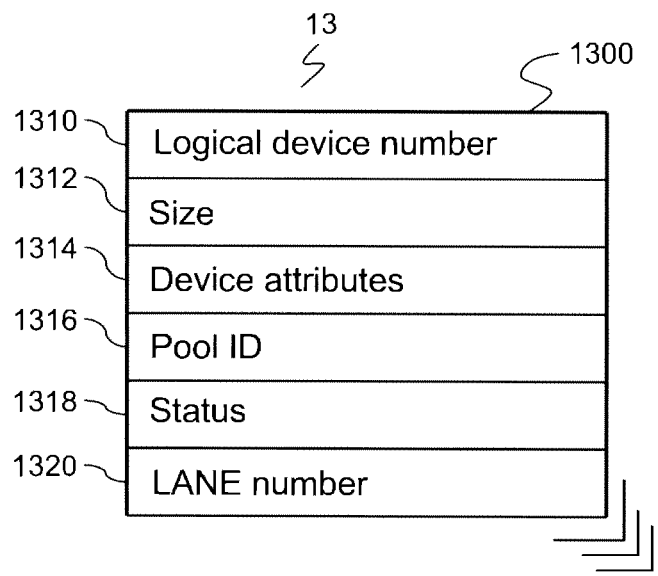
FIG. 12 is a view showing a configuration example of a LANE management information table.
FIG. 13 is a view showing a configuration example of a logical device management information table.

The LANE management information table 1200 shown in FIG. 12 defines the combination of tiers covering the range of the respective LANEs. The LANE management information table 1200 includes as items the information of the combination of LANE numbers 1320 and tiers.

(1-5-4) Logical Device Management Information Table

FIG. 13 is a view showing a configuration example of a logical device (volume) management information table 13. The logical device management information table 13 is composed of multiple logical device specific information tables 1300, wherein each logical device specific information table 1300 includes a logical device number (logical device #) 1310, a size 1312, a device attribute 1314, a pool ID 1316, a device status 1318 and a LANE number 1320 as items.

The logical device # 1310 is information indicting the identifier of a logical device. The size 1312 is information indicating the total size set for the logical device. When the logical device is a virtual volume, the size is a virtualized size.

The device attribute 1314 is information indicating the identifier of the attribute of a logical device. If the logical device is a class 1 logical device, an identifier indicating a class 1 logical device is stored therein, and if the logical device is a class 2 logical device, an identifier indicating a class 2 logical device is stored therein. Further, if the logical device is set in a pool, an identifier indicating a pool attribute is stored therein.

The column of pool ID 1316 stores an identifier of a pool in which the logical device is formed (pool in which the logical device belongs) when the logical device is set to a pool. If the logical device is set to a virtual volume, the pool ID stores the number of pool ID to which the storage area is assigned when storing data.

The status 1318 is information showing the status of the virtual device to which the logical device belongs. The values of the status can be normal, blockage, failure blockage and so on. Blockage shows that blockage such as burst blockage has occurred due to causes other than failure. Failure blockage means that failure has occurred to some device causing blockage.

The LANE number 1320 is information indicating the LANE number set to the logical device. The LANE number is the number shown in FIG. 12. The processor 360 stores data of the logical device within the range of the tiers shown by the LANE number set to LANE number 1320.

For example, it is assumed that a pool is assigned to a virtual volume as shown in FIG. 6 with a LANE arrangement as shown in FIG. 12. According to FIG. 12, LANE #3 is composed of a combination of Tier 0 and Tier 1, and LANE #4 is composed of a combination of Tier 1 and Tier 2.

If it is defined that a pool is composed of LANE #3, the virtual volume 411 uses Tier 0 and Tier 1. If it is defined that a pool is composed of LANE 4, the virtual volume 412 uses Tier 1 and Tier 2. Since the virtual volume 411 and the virtual volume 412 uses the same pool, the same identifier is stored as the pool ID.

According to LANE settings, it is possible to select tiers used for each virtual volume, or to restrict the tiers to be used from all the tiers. Further, if a LANE is not set, it means that all tiers can be used.

(1-5-5) Pool Management Information Table

Figure 14:
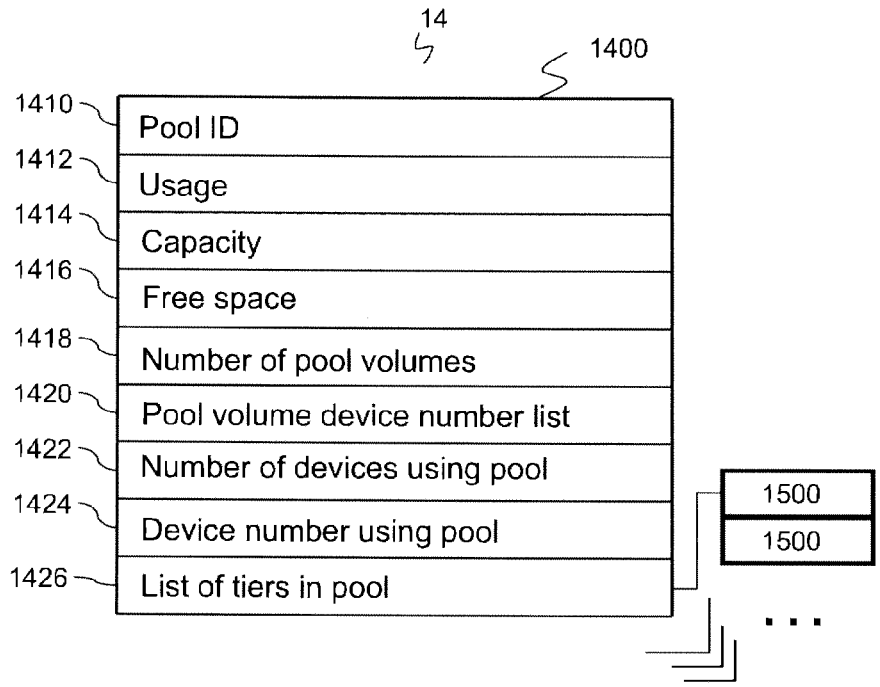
FIG. 14 is a view showing a configuration example of a pool management information table.

FIG. 14 is a view showing a configuration example of a pool management information table 14. The pool management information table 14 is composed of a plurality of pool specific information tables 1400. The pool specific information table 1400 includes a pool ID 1410, a usage 1412, a capacity 1414, a free space 1416, a number of pool volumes 1418, a pool volume device number list 1420, a number of devices using pool 1422, a device number using pool 1424, and a list of tiers within the pool 1426 as items.

The capacity 1414 and the free space 1416 store information corresponding to each media. The pool ID 1410 is an identifier of the pool. The usage 1412 is an identifier showing the usage of the pool. The usage refers to the usage of the operation of the pool, such as capacity virtualization, snapshot and remote copying.

The capacity 1414 stores information showing the real capacity of the pool. It is also possible for the pool management information table 14 of FIG. 14 to store information on the virtualization capacity (virtual capacity) with respect to the host computer 10. The free space 1416 stores information showing the unused real capacity of the pool. The table can also store one or a combination of a total real capacity of the capacity virtualized pool and a used real capacity.

The number of volumes 1418 stores information showing the total number of logical devices set up as pools. The pool volume device number list 1420 stores information showing a list of logical device numbers set up as pools.

The number of devices using the pool 1422 stores information showing the number of pool volumes belonging to a pool. The device number using the pool 1424 stores information showing a list of IDs of pool volumes belonging to the pool. The number of devices using the pool 1422 and the device number using the pool 1424 can also be set to correspond to each tier.

The list of tiers within the pool 1426 stores information showing a list of information on tiers set to the pool. The list of tiers 1426 storing tier information will be described in detail later, but the list of tiers 1426 storing tier information is one example of the pool tier management information table. Further, the pool management information table 14 of FIG. 14 is set and updated via the configuration control program 3503.

(1-5-6) Pool Tier Management Information Table

Figure 15:
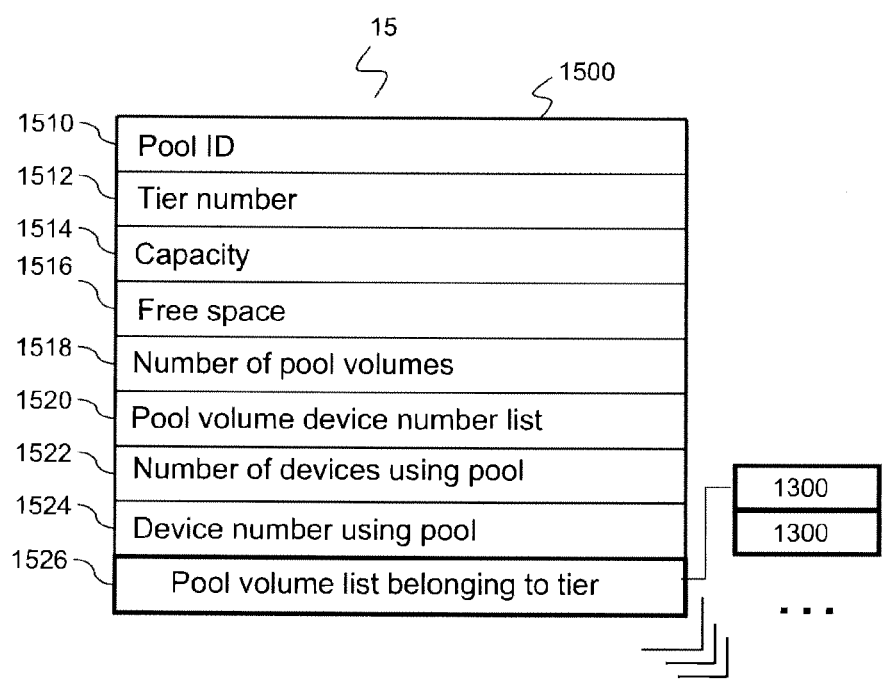
FIG. 15 is a view showing a configuration example of a pool tier management information table for managing tiers of a pool divided into multiple tiers.

FIG. 15 shows an example of a configuration of a pool tier management information table 15. The pool tier management information table 15 includes at least one pool tier specific information table 1500. Each pool tier specific information table 1500 includes a pool ID 1510, a tier number 1512, a capacity 1514, a free space 1516, a number of pool volumes 1518, a pool volume device number list 1520, a number of devices using pool 1522, a device number using pool 1524, and a pool volume list 1526 belonging to the tier as items. In the following description, only the portions of the above information that differ from the pool management information table 14 (FIG. 14) will be described.

The tier number 1512 stores the identification information of tiers set to the pool. For example, if multiple tiers are set within the pool, the table 1500 of FIG. 15 will be set for each tier. If there are three tiers, the pool tier management information table 15 will have three tables 1500.

The capacity 1514 stores the total real capacity that each tier (tier number: 1512) holds. The sum of the capacities 1514 of the tiers will be the capacity 1414 within the pool management information table 14 of the pool shown via the pool ID 1510.

The free space 1516 is the size of the unused area within the tier. The sum of the free space 1516 of the respective tiers is the value of free space 1416 within the pool specific information table 1400 of the pool management information table 14.

The contents of the number of pool volumes 1518, the pool volume device number list 1520 and the number of devices using the pool 1522 are as described, which can be set for each tier.

The pool volume list 1526 belonging to the tier includes the logical device specific information 1300 (refer to FIG. 13) of the pool volume belonging to the respective tiers. Further, as shown in FIG. 4, when the pool is formed astride multiple modules (clusters), an information for distinguishing the modules is added to the pool management information table 14 (refer to FIG. 14), and the information within the table is managed per module. Further, if there are no tiers set within the respective tables mentioned above, NULL is stored in the column for storing information related to tiers.

Figure 16:
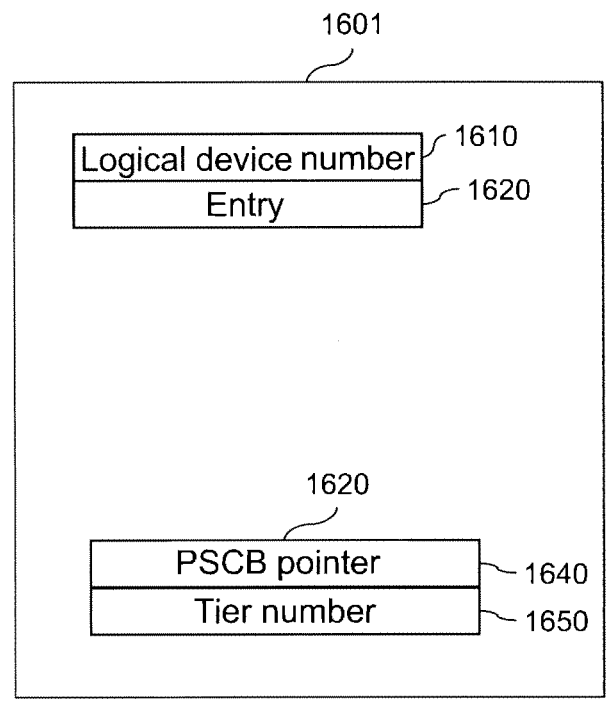
FIG. 16 is a view showing a configuration example of a virtual volume directory information table during normal time.
Figure 17:
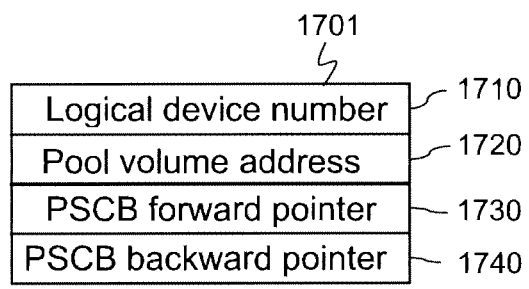
FIG. 17 is a view showing a configuration example of a PSCB management information table.

(1-5-7) Virtual Volume Directory Information Table and PSCB Management Information FIG. 16 shows a virtual volume directory information table 1601, and FIG. 17 shows a PSCB management information table 1701. The virtual volume directory information table 1601 stores information showing the configuration of a class 2 logical device constituting the virtual area of the virtual volume. The PSCB (Pool Slot Control Block) management information table 1701 stores information showing the configuration of a class 1 logical device set to the pool 60.

As described, according to the storage system 30, a class 1 virtual device 400 is composed of a RAID configuration of physical devices 34. The class 1 virtual device 400 is divided into class 1 logical devices 500 which are storage areas. The class 1 logical devices 500 are set to the pool 60. The class 1 logical devices 500 set to the pool 60 are the pool volumes 900.

The storage system 30 also comprises a class 2 logical device 501 which is a virtual volume. The class 2 virtual device 401 is divided into class 2 logical devices 501 as virtual storage areas of a virtual volume.

The storage system 30 assigns the class 2 logical device 501 which is a virtual volume to the class 1 logical device 500 which is a pool volume. Thereby, the storage area of the virtual volume to which the host computer 10 accesses corresponds to the class 1 logical device 500 composed of physical devices 34.

The configuration information of the virtual volume 701 is stored in the virtual volume directory information 1601. The virtual volume directory information 1601 is composed of a logical device number 1601 and an entry 1620.

The logical device number 1610 is information showing the identifier of the class 2 logical device 501. The entry 1620 stores configuration information of the class 2 logical device 501, and is composed of a PSCB pointer 1640 and a tier number 1650. If a class 2 logical device 501 is assigned to a class 1 logical device 500 of pool volume 900, the PSCB pointer 1640 stores a pointer of the area of this class 1 logical device 500.

In the initial state the class 2 logical device 501 is not assigned to the class 1 logical device 500, so that "NULL" is stored in the PSCB pointer 1640. Further, the entry 1620 is set with respect to each address corresponding to the capacity of the class 2 logical device, so that multiple entries exist. For example, if the capacity of the class 2 logical device is 70 MB and the management unit of the PSCB is 10 MB, the class 2 logical device is composed of seven entries.

The information of FIG. 16 is set with respect to the logical device having the device attribute 1314 of FIG. 13 set to "virtual volume". The PSCB management information table 1701 stores information related to the class 1 logical device 500 set to the pool 60. The PSCB management information table 1701 is set for each slot of the class 1 logical device 500 set to the pool 60.

Each PSCB management information table 1701 is composed of a pool volume address 1720, a PSCB forward pointer 1730, and a PSCB backward pointer 1740. The logical device number 1710 stores information indicating the identifier of the class 1 logical device in a pool volume. The pool volume address 1720 is information stating the address of the class 1 logical device in a pool volume 900.

The PSCB forward pointer 1730 and the PSCB backward pointer 1740 are information indicating the identifier of forward and backward slots of the class 1 logical device within the pool volume 900. A start position of the unused area within the area of the pool volume 900 is denoted via a free PSCB queue. The free PSCB queue includes a pointer to a PSCB management information table 1701 indicating the subsequent slot.

The storage system 30 refers to the pointer stored in the free PSCB queue and obtains the subsequent PSCB management information table 1701. Further, the storage system 30 refers to the PSCB backward pointer 1740 of the subsequent PSCB management information table 1701 to follow the PSCB management information tables 1701 in a stepwise manner to acquire the PSCB management information table 1701 corresponding to the final slot of the unused area. The PSCB backward pointer 1740 of the final PSCB management information table 1701 is the free PSCB queue.

The storage system 30 follows the free PSCB queue to recognize the unused area within the pool volume 900 of the pool based on the collection defined via pointers of PSCB management information tables 1701.

The storage system 30 sets a PSCB management information table 1701 corresponding to the class 1 logical device 500 set to the pool 60. Actually, the storage system 30 sets a PSCB management information table 1701 corresponding to each slot of the class 1 logical device 500 set to the pool 60, and further sets the free PSCB queue. In the initial state all the pools 60 are unused, so that the collection of areas coupled via the free PSCB queue corresponds to all the areas of the class 1 logical device 500 set to the pool 60.

Upon using an area of the pool 60, the storage system 30 assigns the PSCB management information tables 1701 corresponding to the necessary amount of slots to the virtual volume directory information table 1601 managing the class 2 logical device 501, by which the relevant areas become usable.

Either a single slot or a collection of multiple slots corresponds to a page. The page is specified via one or a plurality of PSCB management information tables 1701. The access from the host device 10 to the virtual volume 800 or the assignment of a storage area from the pool volume 900 to the access area of the virtual volume 800 is performed via page units.

In further detail, the storage system 30 refers to a free PSCB queue and acquires the PSCB management information tables 1701 corresponding to the necessary amount of area (pages) to be assigned to the class 2 logical device 501. Then, the storage system 30 assigns the acquired PSCB management information tables 1701 respectively to the entries 1620 of the virtual volume directory information table 1601. In other words, the storage system 30 stores pointers designating the corresponding PSCB management information tables 1701 to the PSCB pointers 1640 of the respective entries 1620 of the virtual volume directory information table 1601. Further, the PSCB management information tables 1701 having been assigned are excluded from the coupling of the free PSCB queue.

Thus, the respective pages (slots) of the class 2 logical device 501 are assigned to the PSCB management information tables 1701 designated by the pointers 1640 of the respective entries 1620 of the virtual volume directory information table 1601. The PSCB management information tables 1701 correspond to the slots of the class 1 logical device 500, so that as a result, the class 2 logical device 501 is assigned to the class 1 logical device 500 and the virtual volume being the target of access of the host computer 10 can be used as a physical device.

The storage system 30 also manages the free PSCB management information table 1701 for each tier. If Tier 0 and Tier 1 are used as tiers, the pool 60 is also managed per tier. There are cases where page unit areas from multiple tiers (such as Tier 0 and Tier 1) are assigned to a single class 2 logical device 501. The storage system 30 manages the page unit information as PSCB unit information. The tier number 1650 refers to the number of the tier in which the PSCB belongs.

Now, there are cases where the unit in which the virtual volume assigns areas to the pool (hereinafter also referred to as page) differs from the unit in which the snapshot manages the access of data (hereinafter also referred to as data or slot). If a single page is formed of a collection of multiple slots, the storage system 30 first assigns a page, and stores data within the page in unit of slots. When all the slots are stored in a page area, a new page is assigned. In the following description, it is assumed that a single page corresponds to a single slot. The case in which a single page corresponds to a plurality of slots will be described in detail later.

When a write request is received from the host computer 10, the command control program 3501 follows the virtual volume directory information table 1601 based on the address of the virtual volume 800 contained in the write request, and checks whether PSCB is assigned to the entry of the virtual volume directory information table 1601.

If a PSCB is assigned, the command control program 3501 overwrites the write data to an already existing PSCB. On the other hand, if a PSCB is not assigned, the command control program 3501 selects a PSCB coupled to a free PSCB queue assigned to the number of the target tier, and assigns the same to the entry 1620 of the virtual volume directory information table 1601.

Further, information acquired through verification of the status of pages exist as page unit information. For example, the information is obtained as a result of periodical monitoring of the access frequency of pages. Further, the data stored in the pool volume 900 can include information enabling to search the address of the virtual volume 800 to which data is assigned by storing information for each page of the pool 60. The entry 1620 stores the whole storage area corresponding to the size of the capacity of the volume by dividing the area into page units.

(1-5-8) Virtual Volume Directory Information Table (When Generating Pairs)

Figure 18:
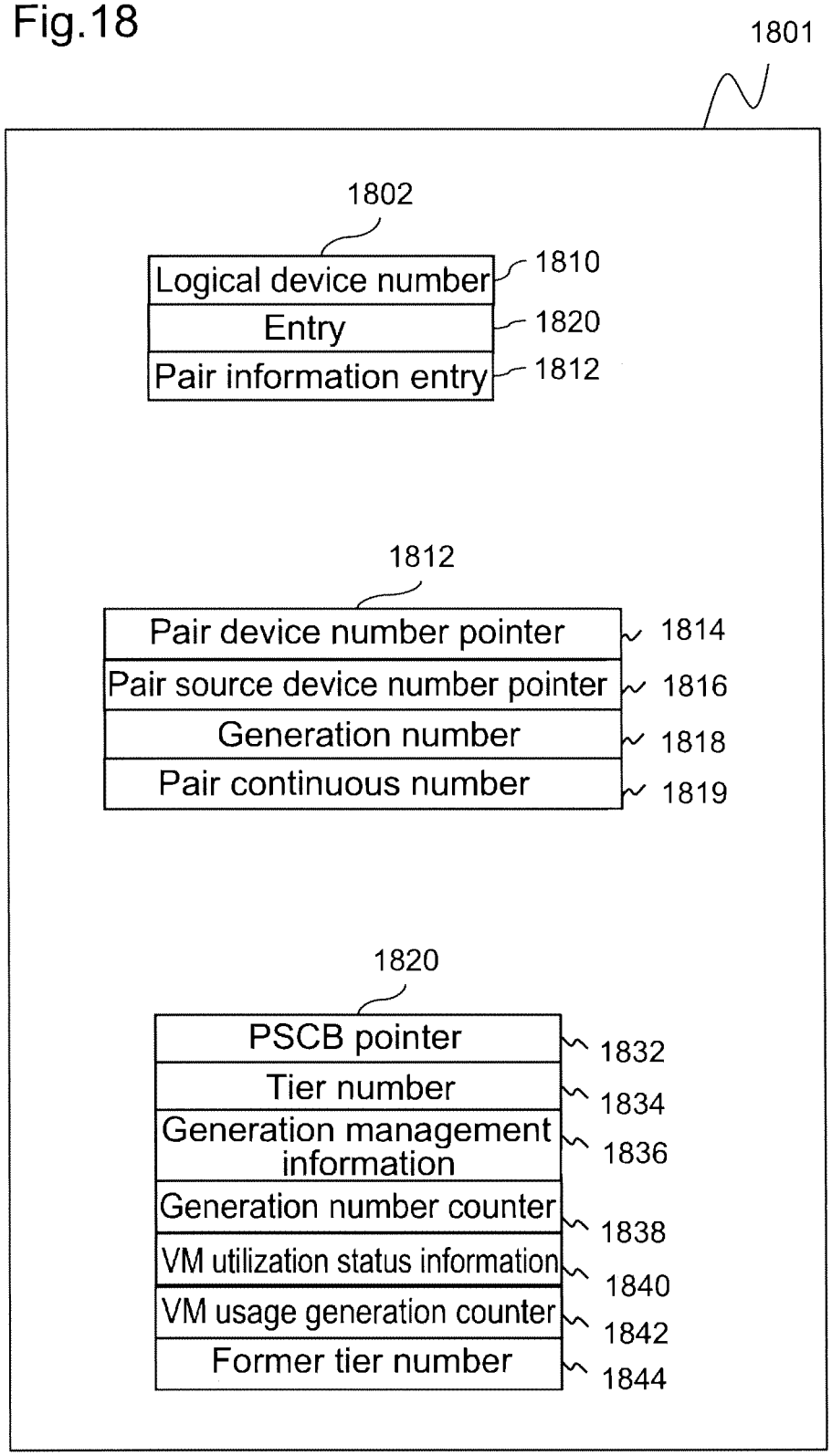
FIG. 18 is a view showing a configuration example of the virtual volume directory information table when taking a snapshot.

FIG. 18 shows a virtual volume directory management information table 1801 of a case where the virtual volume creates pairs via a snapshot. Information is added to the virtual volume directory information 1601 shown in FIG. 16. The basic section is shown in FIG. 16, so the information which becomes necessary by generating pairs will be described here.

In the present description, snapshot refers to a COW (Copy-On-Write). According to COW, the copying process for making a copy is not actually performed, and only when a request to rewrite data occurs, the copying process is executed. A logical device number 1810 is the same as 1610, and an entry 1820 is the same as 1620. The entry 1820 stores the address of 1620. The number of pair information entries 1812 is set to correspond to the number of acquired snapshots by the virtual volume denoted by logical device number 1810.

A pair device number 1814 within the pair information entry 1812 is a pointer 1802 to the virtual volume directory information including the logical device number of the snapshot acquisition destination. By following this information to the virtual volume of the snapshot acquisition destination, that is, the snapshot volume (second virtual device) number, the logical device management information 13 corresponding to the snapshot volume number can be acquired.

Further, if the virtual volume is a snapshot volume, a pointer 1802 to a virtual volume directory information corresponding to the copy source virtual volume is entered via a pointer 1816 to a pair source device number. If the virtual volume is a copy source volume, information showing that there is no copy source, such as "NULL" or "−1", is entered. If a snapshot volume further acquires a snapshot, a pointer 1802 to a virtual volume directory information corresponding to the snapshot destination device number is entered to the pointer 1814 to the pair device number.

A generation number 1818 is the generation number of the snapshot in a case where the present volume is the snapshot destination. The generation number is a continuous number provided to each snapshot source volume. For example, if it is possible to acquire a maximum of 64 generations, wherein the first generation is the original, the respective volumes can acquire snapshots for 63 times.

A pair continuous number 1819 is the continuous number within the storage system 30. According to another system, the continuous number can be a continuous number among a plurality of storage systems 30. According to the present embodiment, the continuous number is numbered via the former numbering method. The entry 1820 is equivalent to the entry 1620. We will now describe information that is not included in entry 1620.

A generation management information 1836 shows whether the present PSCB is shared among snapshot volumes. This information is shown for example via bitmap information. We will now describe an example in which the number of generations, or number of snapshots, is four. If the data is shared among generations, "1" is entered, and if the data is not shared among generations, "0" is entered. If "1000" is entered as four bit data, it means that only the first generation uses the data stored in the present PCSB. If "0110" is entered, it means that the second and third generations use the data. The generations are created with respect to the snapshot source volume. A generation number counter 1838 shows the number of volumes having bits incremented (bits set to "1") in the generation management information 1836, that is, the number of volumes sharing the data stored in the present PSCB.

A VM utilization status information 1840 shows whether the VM is in a state to send I/O to the storage system 30. This information is shown via bitmap information, for example, similar to the generation management information 1836. The VM number manages the VM accessing the storage area of the storage system 30 via continuous numbers, and associates the VM with the bitmap position to manage the VM.

A VM usage generation counter 1842 shows the number of VM possibly accessing the present data out of the VM using the volume having an incremented bit in the VM utilization status information 1840, that is, the VM using the volume sharing the data stored in the present PSCB.

It can be recognized based on these information that even if the value of the generation number counter 1838 is high, if the value of the VM usage generation counter 1842 is small, the data is shared among VMs but the actual frequency in which access occurs is small.

Further, it is possible to provide as pair information a table storing the logical device numbers corresponding to pair numbers and the combination of the pairs of logical devices. According to another method, the pair information can be added to the information of the logical device management table 13, and the pair information can include a pair number, whether the data is a copy source or not, and the number of logical devices forming pairs. It can be recognized that no pair exists if the pair number is not stored and a value such as "−1" is stored. Based on information showing whether the data is a copy source or not and the number of the logical device forming a pair therewith, a copy destination information is stored if the present logical device is a copy source, and a copy source information is stored if the present logical device is a copy destination.

The above description assumes that entries are formed for each virtual page of the virtual volume, but the same description applies to an example in which the snapshot source is not a virtual volume but a normal volume having the capacity size assigned from the beginning and in which a snapshot is acquired with respect to the normal volume, according to which only the snapshot is a virtual volume. Furthermore, if both the normal volumes and the virtual volumes are used, the VM utilization status information 1840 and the VM usage generation counter 1842 can be provided regardless of whether a snapshot is acquired or not.

A pair can be created by having a virtual volume set as the copy source, or having a normal real volume set as the copy source. The present embodiment mainly describes an example in which a pair is created from a virtual volume, but the same description applies for the case in which the pair is created from a real volume. Further, the entry 1820 of the pointer 1802 of the virtual volume directory management information table 1801 shown on the upper area of FIG. 18 can either store the information of the entry 1820 shown on the lower area of FIG. 18 as a direct entry image, or store an address denoted by the entry 1820 shown on the lower area of FIG. 18 to perform mapping. Similarly, the pair information entry 1812 of the pointer 1802 of the virtual volume directory management information table 1801 shown on the upper area of FIG. 18 can either store the information of the pair information entry 1812 shown on the center area of FIG. 18 as a direct entry image, or store an address denoted by the pair information entry 1812 shown on the center area of FIG. 18 to perform mapping.

(1-5-9) Host Computer Management Information Table

Figure 19:
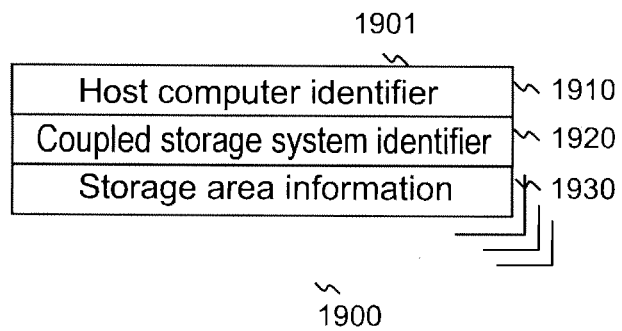
FIG. 19 is a view showing a configuration example of a host computer management information table.

FIG. 19 shows a host computer management information table 1900 stored in the management server 20. The host computer management information table 1900 is composed of multiple host computer specific information tables 1901. The host computer specific information table 1901 is composed of an identifier 1910 of the host computer 10, an identifier 1920 indicating the storage system 30 the host computer is coupled to, and a storage area information 1930 showing the storage area of the storage system 30 to which the host computer is coupled. The identifier 1920 of the coupled storage system 30 can be the device ID or device number, for example. The identifier 1920 is information indicating which device of the storage system 30 is assigned to the physical host computer 10, which can be the identification information of the storage system housing, the Mac address or the WWN (World Wide Name) information, for example.

The storage area information 1930 stores, for example, the volume identifier or the capacity of the volume. The number of volumes stored in the storage area information 1930 can be two or more. There are cases in which the stored volume is shared among multiple host computers 10.

(1-5-10) VM Management Table (Management Server 20)

FIG. 20 shows a VM management information table 2000 stored in the management server 20. The VM management information table 2000 stores a VM identifier 2010 corresponding to the VM control unit 111. Normally, a single physical host computer 10 includes a single VM control unit 111, but it is also possible to realize a system in which a single physical host computer 10 includes a plurality of VM control units 111.

The table also stores a physical host computer identifier 2020 showing the host computer which uses the VM control unit 111. The table also stores a VM identifier 2030 for each host computer 10. The VM identifier 2030 does not have to be a unique number (reference number) among multiple VM control units 111, but the VM identifier is a unique number within a single VM control unit 111. The number of VMs 101 stored in the VM identifier 2030 increases and decreases along with the creation and deletion of VMs 101 by the VM control unit 111.

Further, resources assigned to the respective VMs 101 are stored. The resources include, for example, the assigned status of CPU, the memory capacity, the NIC (Network Interface Card) information and the virtual disk identifier. Utilization information 2050 shows the utilization information 2050 of the respective VMs 101. Utilization information 2050 is information showing whether a VM is utilized or not utilized (created but not utilized at the present point of time). The utilized VMs 101 can be recognized by this information.

(1-5-11) VM Management Table (Storage System 30)

The VM management information table 2000 is not only stored in the management server 20 but also stored in the storage system 30. FIG. 21 shows a VM status management information table 2100 stored in the side of the storage system 30. The table stores a VM identifier 2110 and a VM status 2120 to which the resource of the storage system 30 is assigned. The VM status 2120 shows whether the VM is in a state capable of sending an input/output request or not.

The VM status is determined based on information such as the utilization information of the management server 20, path information from the VM and the login/logout information from the VM. For example, if a VM has been created but not utilized, it can be recognized that even though a storage area of the storage system 30 is assigned, the storage area will not be accessed. If it is recognized based on information other than those listed above that access to a storage area will not occur from the VM, the table will store the information.

The method for managing the status of VMs via the management server 20 and sharing the information in the storage system 30 has been described, but according to another possible method, the storage system 30 can acquire information related to the VM directly from the VM control unit 111. In that case, the VM control unit 111 must have a VM status management unit 303 for inquiring the status of VM to the VM control unit 111 and a storage interface 112 having a function to send a result from the VM control unit 111 to the storage system 30 in response to the request from the storage system 30 on the VM control unit 111 side.

Further, the logical device management information table 13 (FIG. 13), the pool management information table 14 (FIG. 14) and the pool tier management information table 15 (FIG. 15) are stored for each storage system 30. Further, the management device 20 is capable of storing information regarding these management information tables (FIGS. 13 through 15) for all the storage systems 30.

(1-6) Creation of Pool

The management program of the management server 20 receives input information entered by an administrator operating a GUI (Graphical User Interface) such as a pool ID which is the identifier of a pool, a usage, a number of the class 1 logical device and a number of the respective logical devices, generates a create command of a pool including the input information, and transmits the create command to the storage system 30. The storage system 30 receives the command and creates a pool via a pool control program 3507.

The pool control program 3507 accesses a corresponding table using the pool tier management information table 15, and stores a logical device number ID in the logical device specific information 1300 belonging to the tier. Next, the pool control program 3507 assigns a PSCB to the class 1 logical device set to the pool volume and couples the PSCB to a free PSCB queue for each tier.

When the pool control program 3507 sets the class 1 logical device to the pool volume by the above-described process, the configuration control program 3503 sets up a logical device management information table 13 to manage the logical devices used for the pool volume.

Thus, it becomes possible to identify and manage logical devices that are set or not set as pool volume in the multiple class 1 logical devices. In further detail, the configuration control program 3503 sets up an identifier indicating that the logical device constitutes a pool volume (pool volume attribute) to the device attribute 1314 in a logical device management information table 13 for a logical device number designated via a command (corresponding logical device specific information table 1300), and stores a pool ID to which the pool volume belongs.

The above description is based on an example in which a pool is created based on a user request from the management server 20, but the pool can also be created based on a user request entered via the host computer 10 or via the maintenance management terminal 153 instead of the management server 20.

Figure 22:
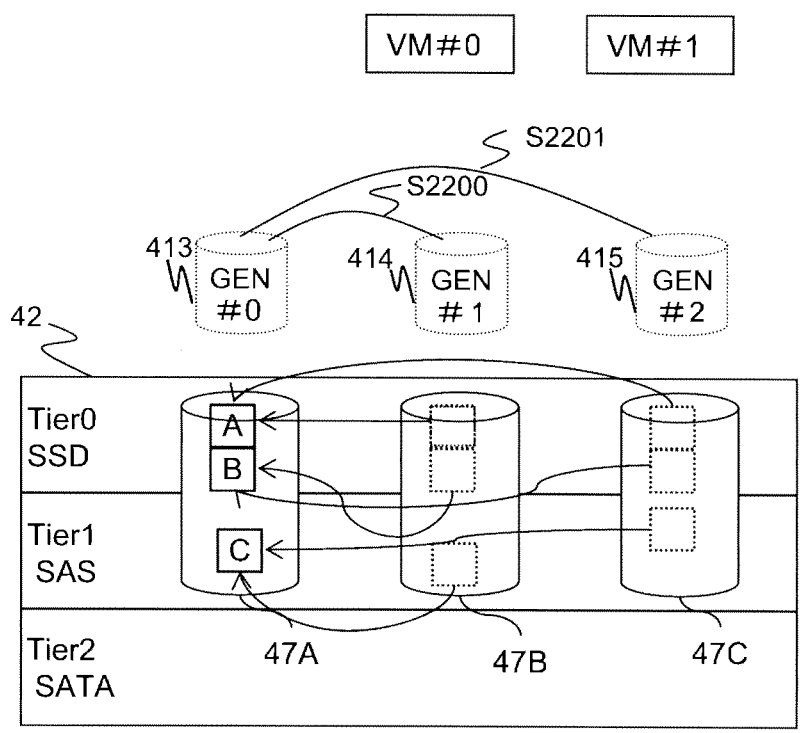
FIG. 22 is a view showing a page allocation to a virtual volume.

FIG. 22 is used to describe the page assignment operation for assigning pages to a virtual volume. The upper portion of FIG. 22 shows the relationship of pools 42 assigned to virtual volumes 413 through 415. The pool 42 is composed of three tiers, Tier 0 (SSD), Tier 1 (SAS) and Tier 2 (SATA), which are managed via PSCB units. FIG. 22 shows a state in which three PSCB pointers are allocated and assigned to virtual volume 413, wherein data is stored in each of the PSCB pointers. The information in the table is only partially shown for necessary sections, and information not related to the present description is not shown.

(1-7) Assigning of Pages to Virtual Volume

The operation for storing information when pages are assigned to the virtual volume 413 will be described. An SSD and an SAS are used based on the LANE number set to the virtual volume 413. In the example, the virtual volume 413 has pages A, B and C assigned to the pool. It can be seen that pages A and B are assigned from SSD and page C is assigned from SAS. Reference numbers 47A through 47C of FIG. 22 are the range of tiers shown by the LANE. The virtual volume 413 has pages assigned from pool areas denoted by pool ID 1316 stored in the logical device management information 13 of the virtual volume 413.

The logical device number of pointer 1802 stores the identifier of the virtual volume 413 (or the logical device number 1310 of the logical device management information 13), and can stores entries 1820 corresponding to each storage area of the virtual volume 413. Regarding entry 1820, 1820 is assigned when a page or PSCB is assigned to the storage area, and the assigned 1820 address is stored in the entry 1820.

Regarding the data stored in the virtual volume 413, following information is stored in the information 1820 designated by the address stored in the entry 1820 corresponding to the number of address in the virtual volume 413 in which data is stored within information of pointer 1802 of the virtual volume 413. The PSCBs which are the stored pages (A, B and C) are assigned from the free PSCB queue, and the addresses of the PSCB are stored in the PSCB pointer within 1820. Actually, if the PSCB address of page A is "00A", the data "00A" is stored in the entry 1820 corresponding to the storage area of the virtual volume 413 to which page A is assigned. Pages B and C are processed similarly.

The tier number 1834 stores the number of the tier including the allocated PSCB. A number "1" representing Tier 0 and SSD is stored in the tier number 1834 in table 1820 for pages A and B, and a number "2" representing Tier 1 and SAS is stored for page C. A logical device number of virtual volume 413 is entered as the logical device address of the entry.

By either setting the initial value of all entries 1820 corresponding to the storage areas of the virtual volume 413 to "NULL" or to create a dedicated PSCB for NULL data only in the pool or the memory and storing the address of the dedicated PSCB (called an exclusive zero page area) in all entries of the page unassigned areas, it is shown that no data is stored in all entries 1820 corresponding to the storage areas of the virtual volume 413. The exclusive zero page area is set for each pool.

(1-8) Snapshot (1-8-1) Taking a Single Snapshot

Figure 23:
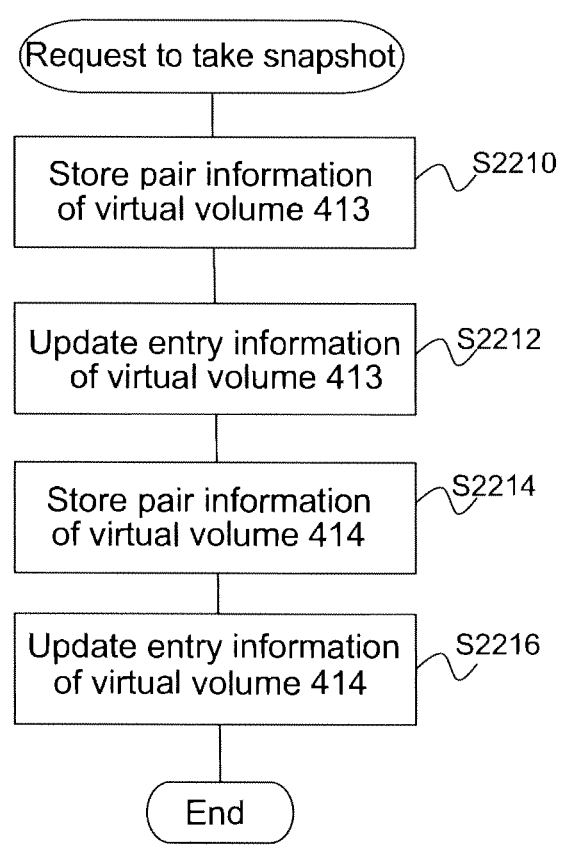
FIG. 23 is a flowchart showing the operation of taking a snapshot.

The operation for taking a snapshot will be described with reference to FIG. 23. The request to take a snapshot is requested based on the demand from the user as a command transmitted from the host computer 10 or the management server 20.

The processor 360 of the storage system 30 takes a snapshot of the virtual volume 413 in the virtual volume 414 (S2200). The address to a pointer 1802 to the virtual volume directory information of the virtual volume 413 is stored in the pointer 1814 to the pair device number within the pair information entry information on the address shown by the pair information entry 1812 in the pointer 1802 (S2210).

The pointer 1816 to the pair source device number stores values such as "NULL" and "−1", since the present volume is the source of the snapshot. The generation number is recorded at the point of time when the snapshot is taken. A value such as "−1" is stored as the initial value, and when a snapshot is taken, since the virtual volume 413 as snapshot source is generation 0 (gen#0), the number "0" is stored. The virtual volume 414 having taken the snapshot will be generation 1 (gen#1).

Regarding generation management information 1836 of entry 1820 corresponding to page A of the virtual volume 413, data is shared by generation 0 (gen#0) and generation 1 (gen#1) since page A is stored in both the virtual volume 413 and the virtual volume 414. The processor 360 sets only the bits corresponding to generation 0 (gen#0) and generation 1 (gen#1) of the generation management information 1836 to "1" and the other bits corresponding to other generations to "0" (S2212). Since the generation number counter 1838 is shared among two generations, the processor 360 stores "2" to the generation number counter 1838

The pointer 1802 to the virtual volume directory information of virtual volume 414 is set in the same manner as virtual volume 413 (S2214). The pointer 1816 to the pair source device number of 1812 for virtual volume 414 stores the address to pointer 1802 storing information of virtual volume 413 (S2216). The pointer 1814 to the pair device number of virtual volume 414 stores information if a snapshot started in virtual volume 414 is taken, but in the present example, a snapshot is not taken, so "NULL" is stored therein.

Figure 24A:
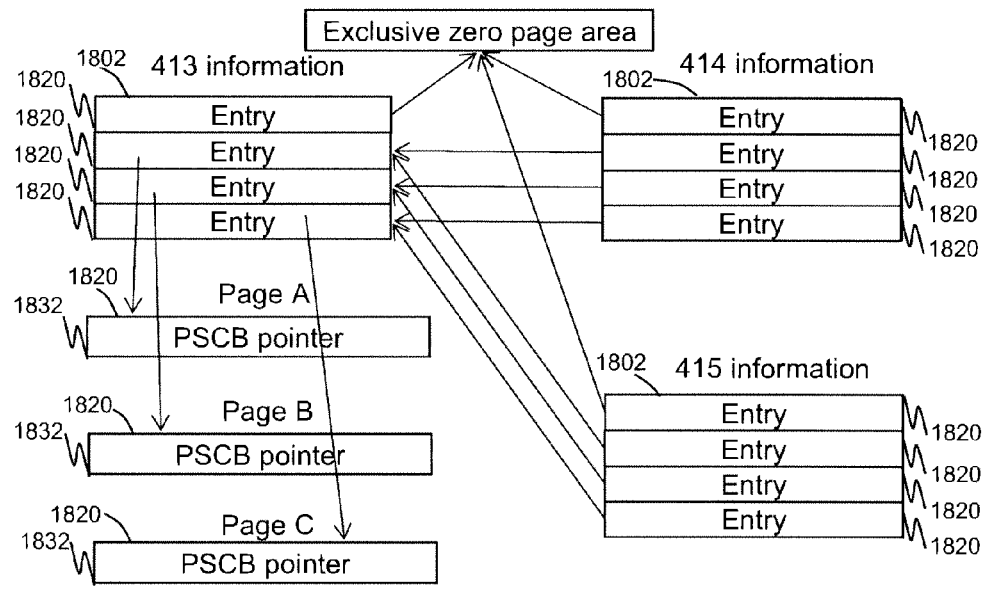
FIG. 24A is a view showing the correspondence between a virtual volume and a PSCB pointer.
Figure 24B:
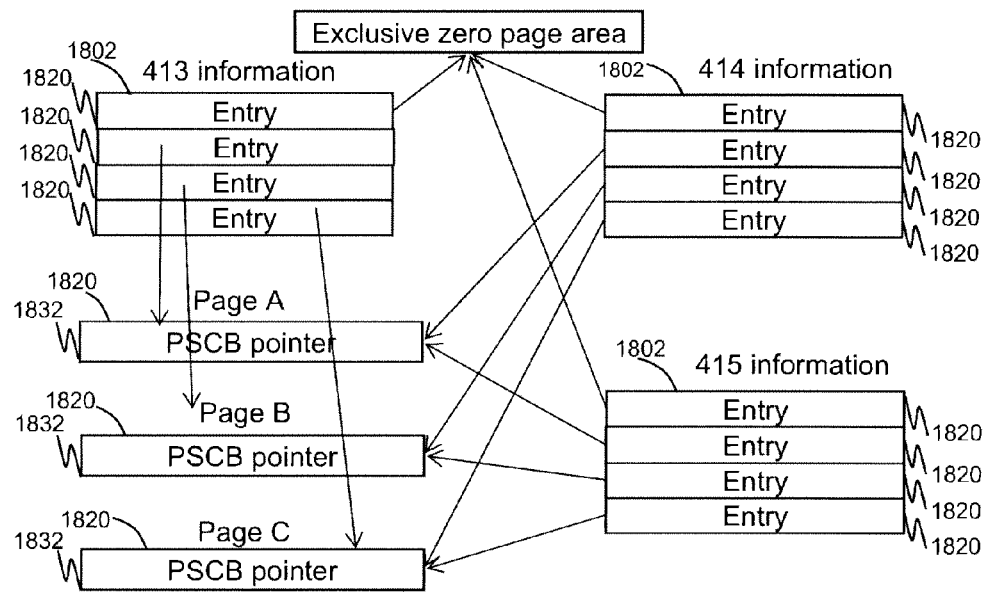
FIG. 24B is a view showing the correspondence between a virtual volume and a PSCB pointer.
Figure 25:
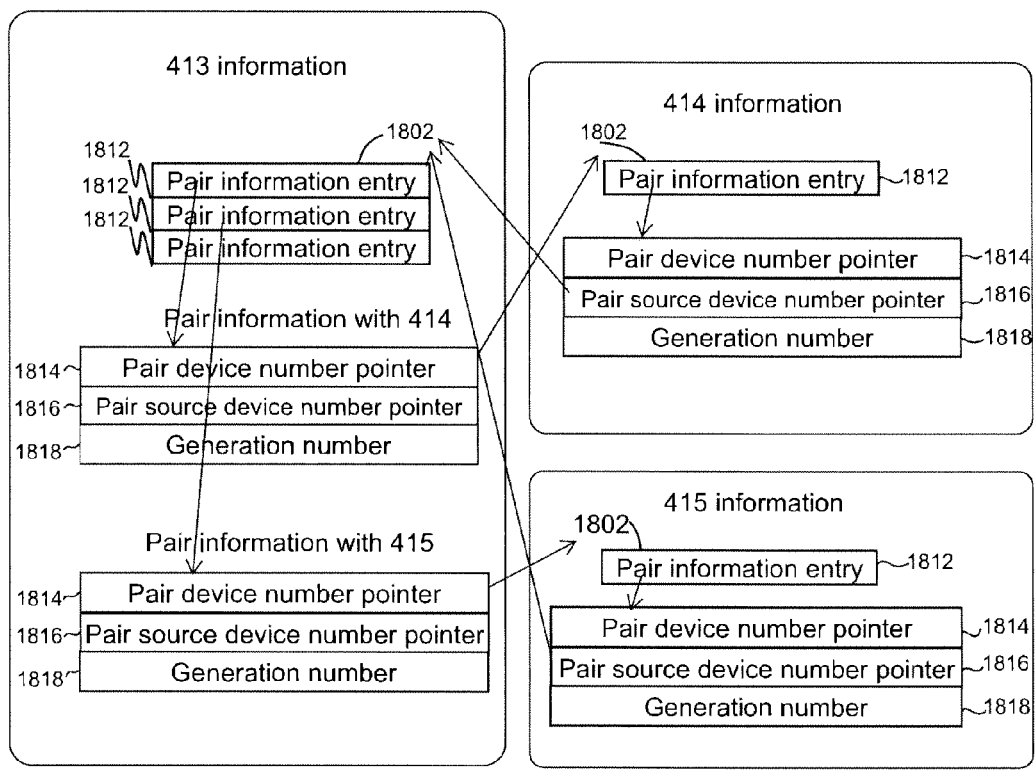
FIG. 25 is a view showing a pair relationship among virtual volumes.

The number "1" is stored as the generation number 1818 of virtual volume 414. Based on the pair source device number and the generation number, the generation number and the source volume of the snapshot of the relevant volume can be recognized. FIGS. 24A and 24B map the virtual volumes to PSCB pointers.

FIGS. 24A and 24B show the pointing relationship of entries of the storage areas of the virtual volume 414 having pages assigned to the virtual volume 413 (not pointing to exclusive zero page area).

FIG. 24A shows the method of mapping the entries. The entry information stored in pointer 1802 storing the entry information of virtual volume 414 adopt a method for pointing pointer 1802 storing the entry information of virtual volume 413.

FIG. 24B shows the method of mapping the entry information. The entry information stored in pointer 1802 storing the entry information of virtual volume 414 adopt a method for pointing entry information 1820 which pointer 1802 storing the entry information of virtual volume 413 points.

In expressing the generation management information 1836 or the VM utilization status information 1840 via bitmaps, the bitmap number according to the method of FIG. 24A should be the maximum number in which each volume can take snapshots. Even if data is cascaded from the snapshot destination, the entry information of the cascaded source is referred to instead of referring to the snapshot source information.

According to the method of FIG. 24B, in order to express the above information in bitmap format, the bitmap number should be set sufficiently high. The switching method of FIG. 24A or FIG. 24B can be used independently, or the methods can be mixed for use.

(1-8-2) Taking Multiple Snapshots

The processor 360 of storage system 30 takes the snapshot of the virtual volume 413 in the virtual volume 415 (S2201 of FIG. 22). The processor 360 adds a pair information entry 1812 of a pointer 1802 to the virtual volume directory information of the virtual volume 413, and stores an address to 1802 storing information of the virtual volume 415 in pointer 1814 to the pair device number within the pair information entry information denoted by the address shown in pair information entry 1812. Since the virtual volume 415 taking the snapshot is generation 2 (gen#2), the processor 360 stores "2" to the generation number 1818 of pair information entry 1812 of virtual volume 415.

Since the generation management information 1836 of entry 1820 corresponding to page A of the virtual volume 413 stores page A in virtual volumes 413, 414 and 415, the processor 360 increments the bit corresponding to generation 2 (gen#2) to "1" in addition to bits of generation 0 (gen#0) and generation 1 (gen#1) to show that data is shared by generations 0 (gen#0), 1 (gen#1) and 2 (gen#2). The generation number counter 1838 is set to "3" to show that data is shared by three generations. FIGS. 22 to 25 show main items of the table, and the relationship of tables of virtual volumes 413, 414 and 415.

As described, the pair information table can store information related to the taken snapshots, or the logical device management information 13 can have an area for storing the information related to the taken snapshots (pair information).

(1-8-3) Deleting Snapshots

We will now describe an example of deleting a virtual volume 414 which is generation 1 (gen#1) according to FIG. 22. The processor 360 of storage system 30 delete portions related to the virtual volume 414 of FIGS. 24 and 25. Actually, since all data of the virtual volume 414 refers to the pages of the virtual volume 413, the pointer 1802 of virtual volume 414 is deleted. The contents of entry 1812 pointed by virtual volume 414 are also deleted.

On the other hand, out of the entries 1820 pointed by pointer 1802 of virtual volume 413 as copy source of virtual volume 414, the generation management information 1836 and the generation number counter 1838 of portions corresponding to pages A, B and C referred to by the virtual volume 414 are updated.

Actually, bitmaps of the generation management method of portions corresponding to "generation 1" which is the generation to be deleted are changed to "0" and the generation number counter 1838 is decremented. The VM utilization status information 1840 and the VM usage generation counter 1842 are also changed in a similar manner. Moreover, out of the pair information entries of the virtual volume 413, the pair information with the virtual volume 414 is deleted.

Another example of deleting the virtual volume 414 which is generation 1 (gen#1) shown in FIG. 28 will be described. The difference from the example of FIG. 22 is that in FIG. 22 all the pointers 1802 of the virtual volume 414 point to exclusive zero page area, whereas in the case of FIG. 28, the pointer 1802 corresponding to page C points to entry 1820.

Figure 28:
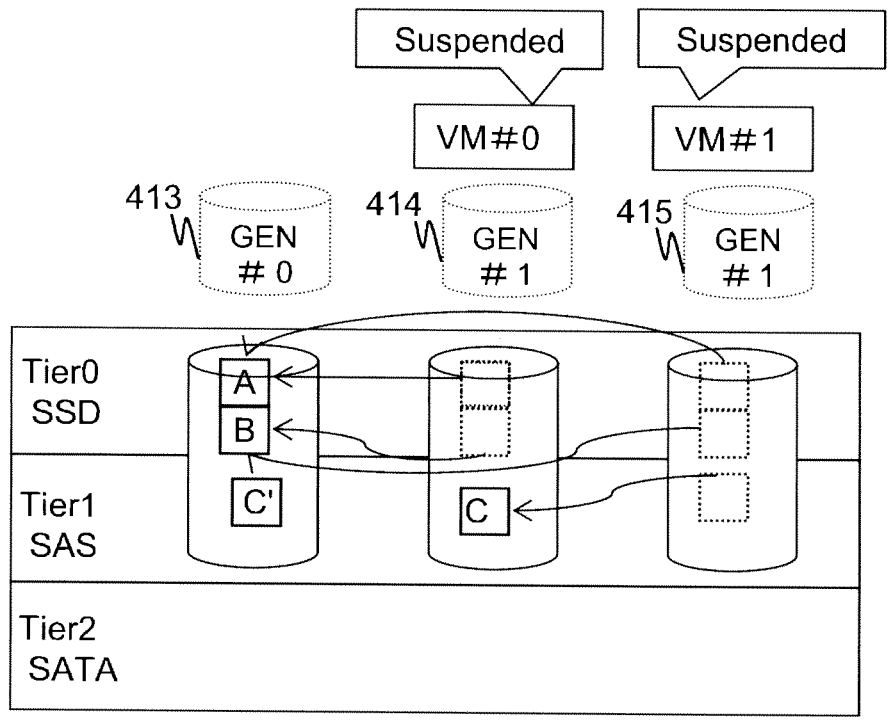
FIG. 28 is a view showing the process for changing VM utilization status and relocation process.
Figure 28:
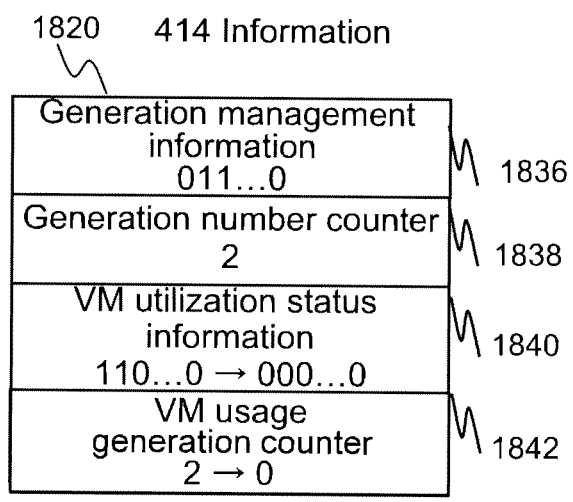

As shown in FIG. 28, if page C is not referred to from other generations and only the virtual volume 414 refers thereto, the process similar to FIG. 22 is performed, and the processor 360 deletes entries 1820 of the pointer 1802 of virtual volume 414 assigned to page C and frees the PSCB corresponding to page C and to return the same to the free PSCB queue.

Figure 27:
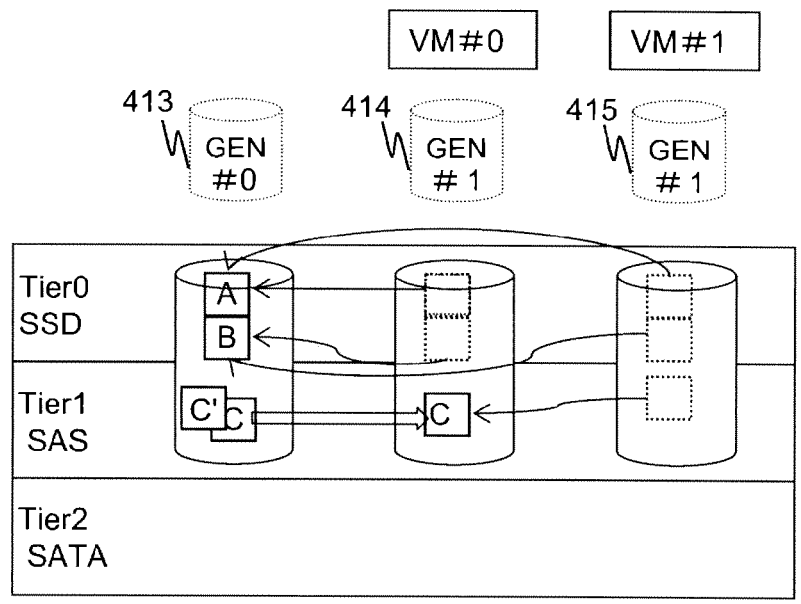
FIG. 27 is a view showing the change of generation relationship among virtual volumes when a write target page is not assigned.
Figure 27:
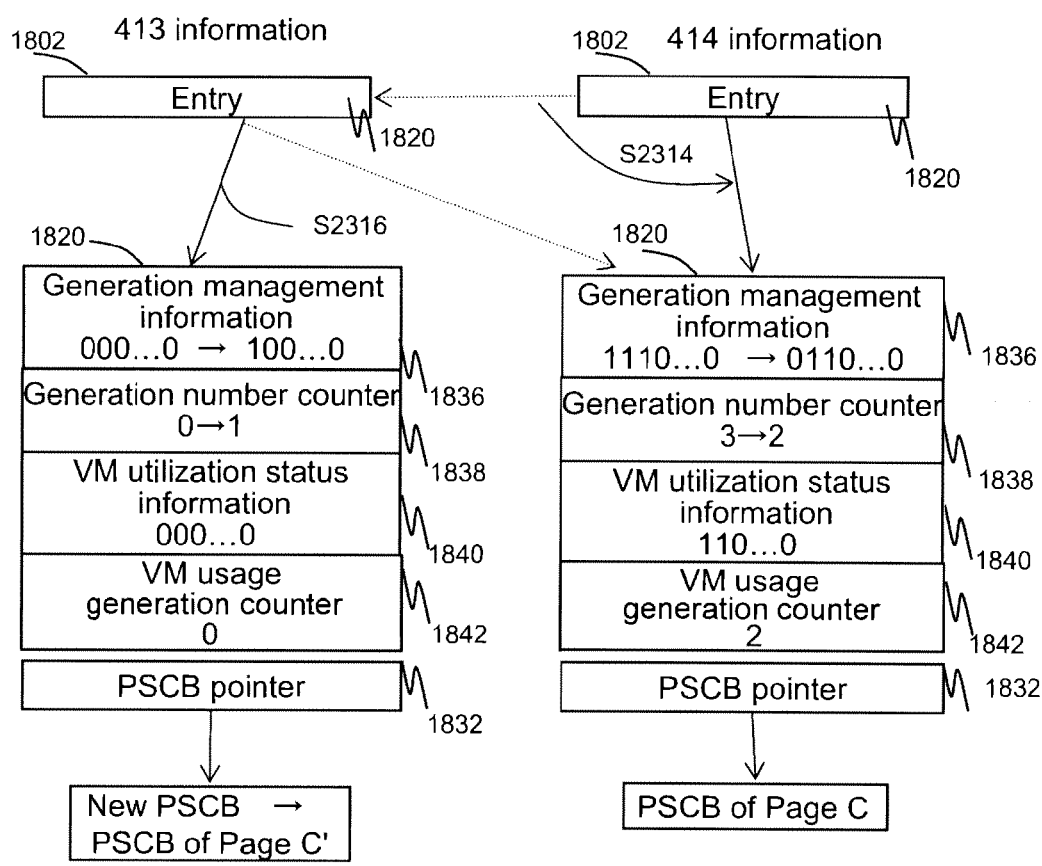

However, unlike FIG. 28, if page C is referred to from other generations, the processor 360 executes the mapping process for selecting a generation referring to page C and performing mapping to that volume, similar to the process of changing the mapping of page C of FIG. 27 from the virtual volume 413 to the virtual volume 414. In this case, the processor 360 prohibits the read/write process of the snapshot volume being subjected to snapshot deleting process.

(1-9) Registration of VM Utilization Status

The present process is described taking as an example the structure in which snapshots are taken. An example in which respective generations of snapshots are used by various VMs is considered. It is assumed that VM #0 uses snapshot generation 1 (gen#1) of FIG. 22, that is, the virtual volume 414, and VM #1 uses snapshot generation 2 (gen#2), that is, the virtual volume 415. The usage information 2050 of VM specific information table 2001 corresponding to the VM out of the VM management information table 2000 or the VM status 2220 of the VM status specific information table 2101 is set to "utilization", that is, in a state where I/O requests are sent from the VM to the storage system 30.

Currently, the contents of the virtual volumes 414 and 415 are the same as that of the virtual volume 413, so that the VM utilization status information 1840 of entry 1820 corresponding to the storage areas of pages A, B and C of virtual volume 413 has bits corresponding to VM #0 and VM #1 incremented to "1" to show that they are shared by VM #0 and VM #1. The VM usage generation counter 1842 shows the number of bits incremented to "1" of the VM utilization status information 1840, that is, the number of references from VM. In the example, the VM utilization status information 1840 is set to "1100 . . . 0" and the VM usage counter is set to "2".

Figure 29:
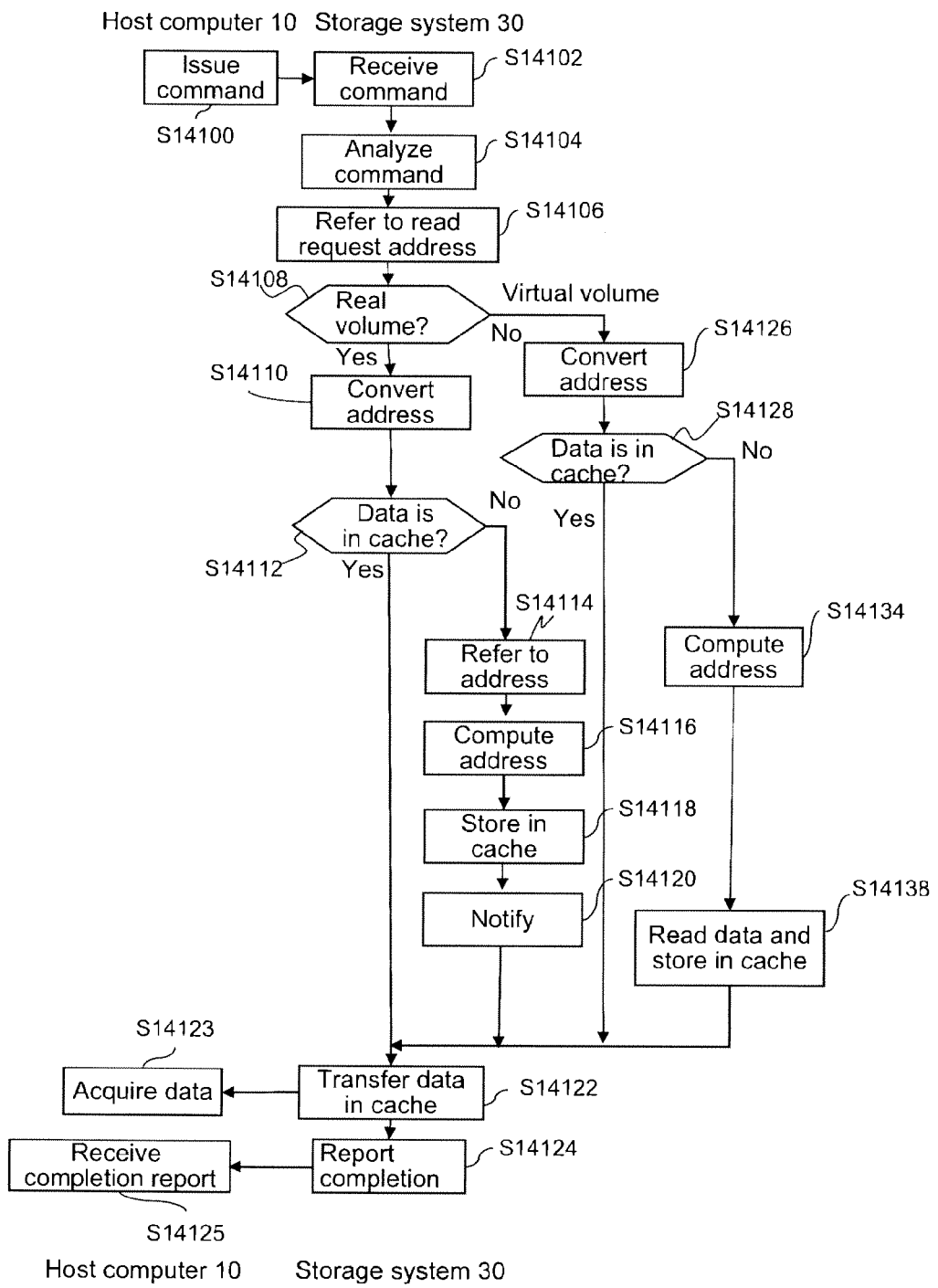
FIG. 29 is a flowchart showing the steps for processing a read request of a page allocated area in a virtual volume.

(1-10) Processing of I/O Access (1-10-1) Normal Read Process and Read Process of Snapshot FIG. 29 is a flowchart illustrating the read process of the virtual volume. When the host computer 10 issues a command (S14100), the storage system 30 receives the command (S14102). The command control program 3501 of the storage system 30 analyzes the command (S14104) and refers to the address included in the read request (S14106).

The command control program 3501 determines based on the referred address whether the access target volume is a virtual volume (class 2 logical device) or not (S14106). If the access target is a real volume (class 1 logical device), the process advances to S14110.

In step S14110, the command control program 3501 performs an LU—logical device—virtual device address conversion (14110), and determines whether the data of the read target address is in a cache memory 32 or not (S14112).

If the data of the read target address is in the cache memory 32 ("Yes" in S14112), the command control program 3501 transfers the data in the cache memory 32 to the host computer 10 (S14122), and notifies completion to the host computer 10 (S14112).

If the data of the read target address is not in the cache memory 32 ("No" in S14112), the command control program 3501 performs a virtual device—physical device/external LU address conversion (S14114), computes the address of the media storing the read target data (S14116), and starts a media access program (not shown).

The media access program reads data from the address of the computed media, stores the same in the cache memory 32 (S14118), and notifies the command control program 3501 that data has been stored in the cache memory 32 (S14120).

Upon receiving the notice from the media access program, the command control program 3501 transfers the data in the cache memory 32 to the host computer 10 (S14122).

On the other hand, if the read target address is a virtual volume address, the command control program 3501 performs a LU—logical device—virtual device address conversion (S14126), and determines whether the data of the read target address is in the cache memory 32 or not (S14128).

If the data of the read target address is in the cache memory 32 ("Yes" in step S14128), the command control program 3501 transfers the data in the cache memory 32 to the host computer 10 (S14122).

If the data of the read target address is not in the cache memory 32 ("No" in S14128), the command control program 3501 further performs a virtual device—physical device/external LU address conversion to compute the address of the media in which the read target data is stored (S14134). If the exclusive zero data area is assigned, the address will be the address corresponding to that area. The command control program 3501 reads data from the address of the computed media and stores the data in the cache memory 32 allocated for the address of the space of the virtual volume (S14138).

The above process refers to a method in which all pages are necessarily assigned and the pages where data are not yet written are assigned to the page where all values are zero, that is, to the exclusive zero data area (called an exclusive zero data area assignment method).

Figure 30:
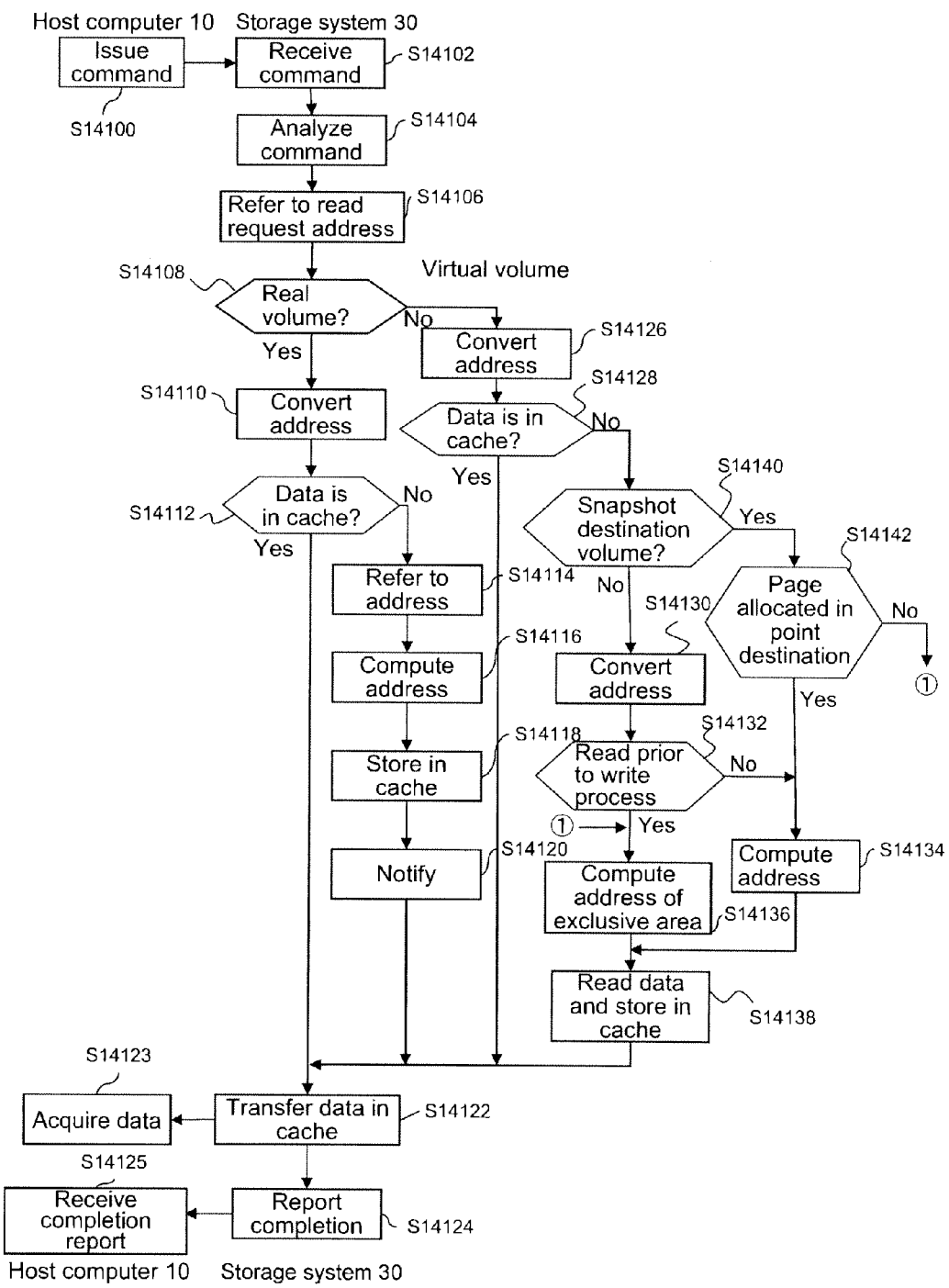
FIG. 30 is a flowchart showing the steps for processing a read request of an unassigned page in a virtual volume.

On the other hand, FIG. 30 shows an example in which pages are assigned at write timings, and when a page having no data written thereto is subjected to a read process, the process accesses the exclusive zero data area (called a write timing page assignment method). Only the differences of FIG. 30 from FIG. 29 are described hereafter.

If the data of the read target address is not in the cache memory 32 ("No" in S14128), the command control program 3501 determines whether the volume itself is a snapshot destination volume or not (S14140). If the volume is stored in the pointer to a pair source device number of the pair information entry 1812, the command control program 3501 determines that the volume is a snapshot destination ("Yes" in S14140), and executes the procedure of S14142. If the command control program 3501 determines that the volume is not a snapshot destination, the command control program 3501 executes the procedure of S14130.

If the volume itself is a snapshot destination volume ("No" in S14140), the command control program 3501 converts the address of the virtual device space of the virtual volume to the address of the virtual device space of the capacity virtualization pool using a virtual—pool address conversion function (S14130).

At this time, if the request is a data read request of area not yet having any data written thereto ("Yes" in S14132), the command control program 3501 calculates an address of the VDEV space (exclusive zero data area) for returning a default value (for example, all "0") (S14136). In another example, the address of the exclusive zero data area having been stored is read.

If not ("No" in S14132), the command control program 3501 further performs a virtual device—physical device/external LU address conversion, and computes the address of the media storing the read target data (S14134). Then, the command control program 3501 reads data from the address of the computed media and stores the data in the cache memory 32 allocated for the address of the virtual volume space (S14138).

If the volume itself is a snapshot destination volume ("Yes" in S14140), the process advances to S14134 if the address is stored in a PSCB pointer within entry 1820 pointed by the pointer 1802 corresponding to the storage area in which read target data is stored or if the pointer 1802 points to another pointer 1802 and the address is stored in a PSCB pointer within the 1820 pointed via the pointer 1802 ("Yes" in S14142), and the command control program 3501 executes the procedure of S14134. If step S14142 is "No", the program executes the procedure of S14136.

(1-10-2) Normal Write Process

Figure 31:
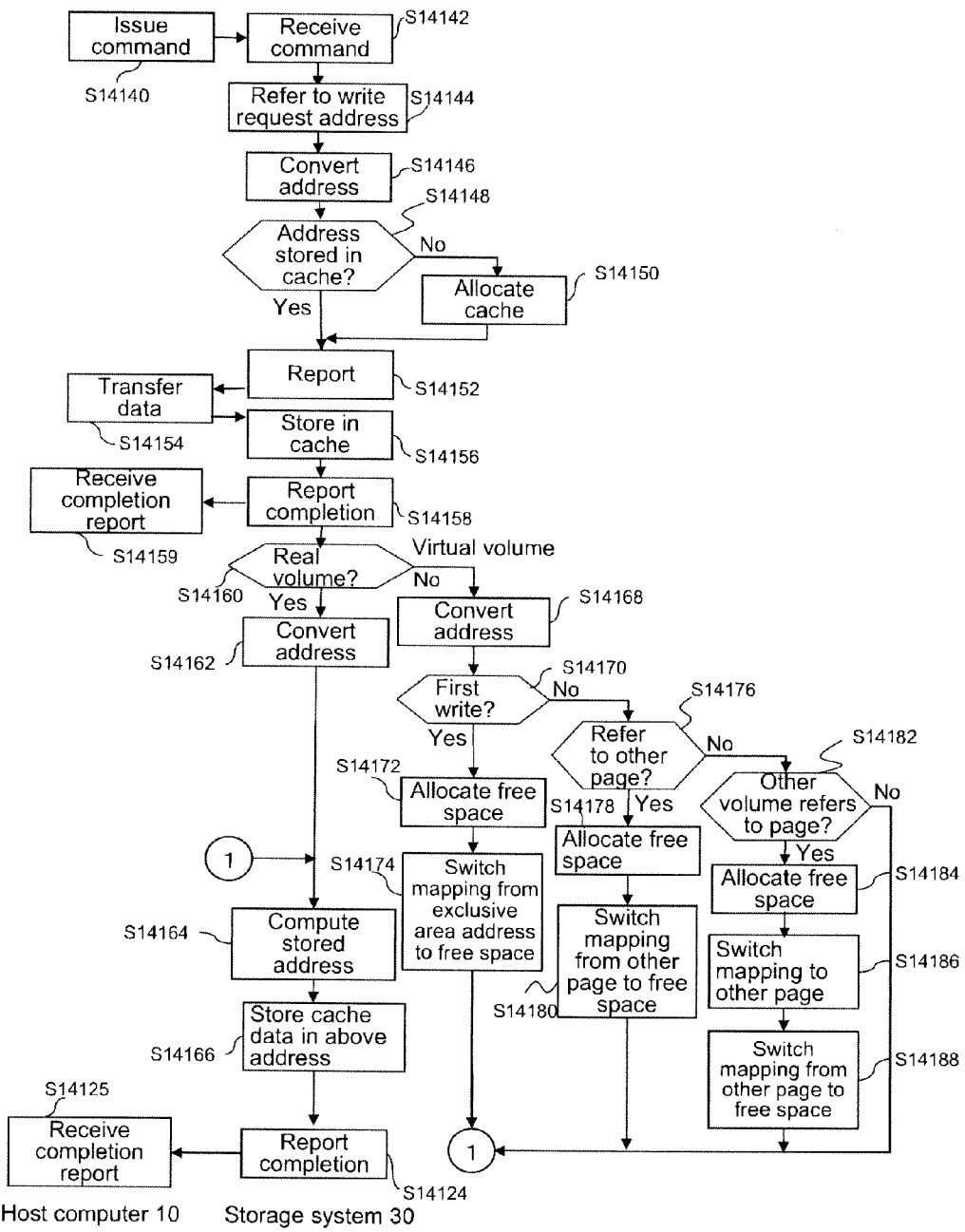
FIG. 31 is a flowchart showing the steps for processing a write request to a volume.

The write process of a volume will now be described with reference to the flowchart of FIG. 31. When the host computer 10 issues a write command (S14140) and the storage system 30 receives the write command (S14142), the command control program 3501 refers to the address in the write request (S14144).

The command control program 3501 performs a LU—logical device—virtual device address conversion regardless of whether the address is of a real volume (class 1 logical device) or a virtual volume (class 2 logical device) (S14146), and determines whether the write target address is allocated in the cache memory 32 or not (S14148).

If the cache memory area is not allocated with respect to the write target address ("No" in S14148), the command control program 3501 allocates a cache memory area for storing data transmitted from the host 10 (14150).

Next, the command control program 3501 notifies the host 10 that it is ready to receive data (S14152). When the command control program 3501 receives transferred data from the host computer 10 (S14154), the program stores the data in the allocated cache memory 32 (S14156) and transmits a write completion report to the host 10 (S14158).

If the write request address is the address of a real volume ("No" in S14160), the command control program 3501 performs a virtual device—physical device/external LU address conversion (S14162), computes the address of the media storing the write target data (S14164), and writes the data stored in the cache memory 32 to the media address (S14166).

On the other hand, if the write request address is a virtual volume (class 2 logical device) (S14160), the command control program 3501 refers to the virtual volume directory table based on a virtual volume address—capacity virtualization pool address conversion function to convert the address of the virtual device space of the virtual volume to an address of the virtual device space of the capacity virtualization pool (S14168).

If the write request requests data to be written to an area to which data has never been written ("Yes" in S14170), the command control program 3501 computes an address of a virtual device space (exclusive zero data area) for returning a default value (such as all "0"), and frees the assignment of this address and the virtual volume address.

At first, the command control program 3501 dynamically allocates a free space of the capacity virtualization pool for storing data corresponding to the address of the virtual volume (S14172). According to the exclusive zero data area assignment, the mapping is changed from the exclusive zero data area to the area allocated in S14172 (S14174).

If the write request requests data to be written to an area having data once written thereto or if the write request requests data to be written to an area mapped to a page having data stored therein ("No" in S14170), the command control program 3501 executes step S14176. If the currently mapped page having data stored therein is a page managed by another volume ("Yes" in S14176), the command control program 3501 performs the same process as S14172 (S14178), and mapping is changed from the other currently mapped page to the area allocated in S14178 (S14180).

If the currently mapped page having data stored therein is a page managed by its own volume ("No" in S14176) and the page is referred to from another volume ("Yes" in S14182), the command control program 3501 changes mapping so that the page is managed by another volume referring to the page. Further, the command control program 3501 performs switching (S14184 to S14188) so that pages assigned from free space are mapped (S14184, similar to S14172). If no other volume refers to that page ("No" in S14182), the procedure advances to S14164.

(1-10-3) Write Process to Existing Data

As described in the above-described process, the process differs depending on whether an area is newly assigned or not in the case of the virtual volume, but if a snapshot is taken, it is further necessary to consider whether the already assigned area is shared or not. Thus, the processes of step S14176 and the subsequent steps of FIG. 31 will be described in detail.

Figure 26:
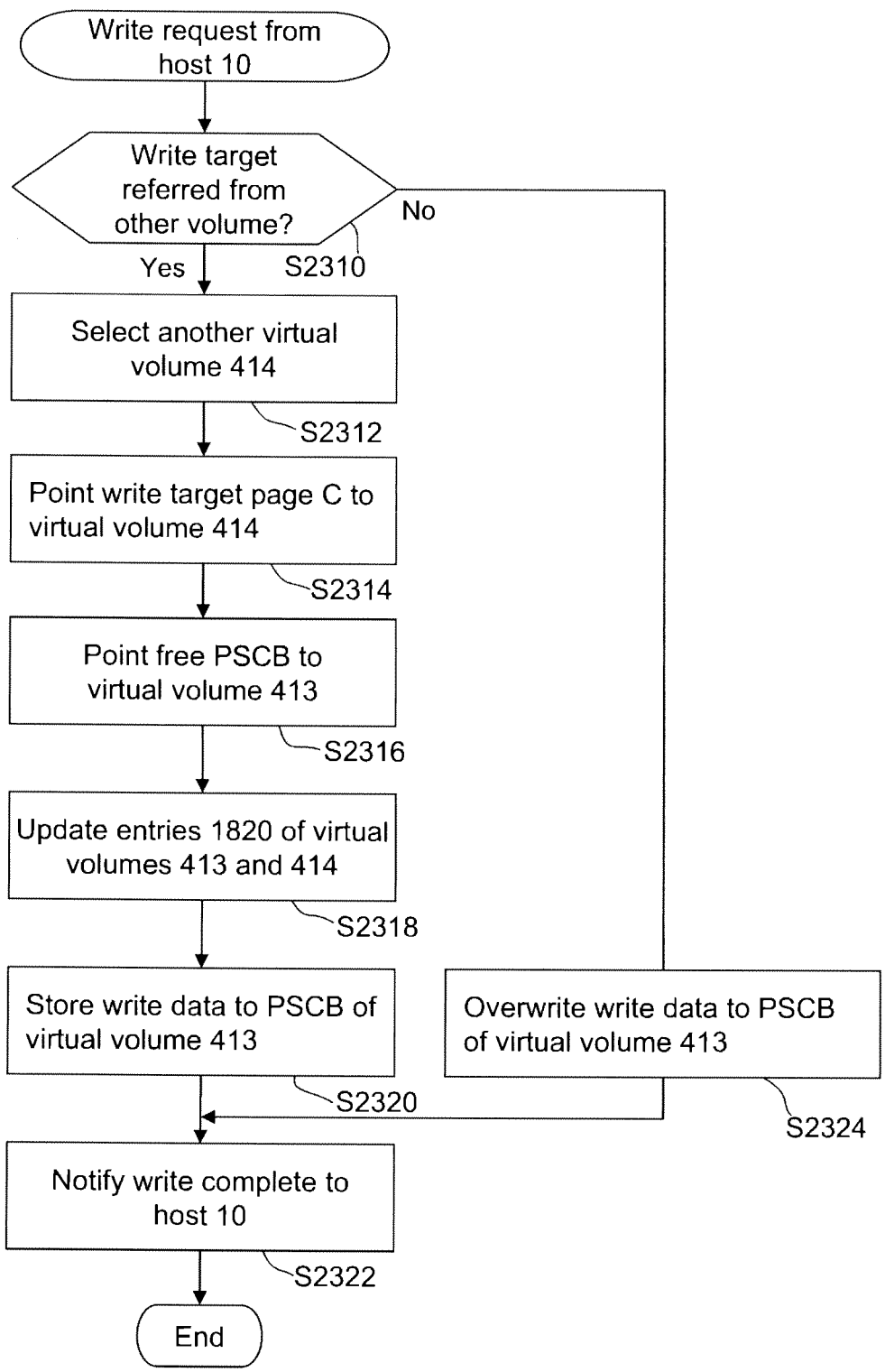
FIG. 26 is a flowchart showing processing steps when a write request occurs to a snapshot source virtual volume.

The process in which a data write command occurs to the snapshot source virtual volume 413 according to which data is rewritten is described with reference to FIG. 26. First, the command control program 3501 checks whether a page within the range in which write target data is stored is referred to from volumes other than virtual volume 413 (S2310). In other words, if "1" is stored other than itself in the generation management information 1836 of the entry 1820 of the virtual volume 413, it can be determined that the page is referred to from other volumes.

If the page is referred from other volumes ("Yes" in S2310), the command control program 3501 selects a virtual volume from the other virtual volumes referring to the target page. In other words, the command control program 3501 selects a virtual volume from virtual volumes of the generation in which "1" is set in the generation management information 1836 of the entry 1820 (S2312).

It is assumed that the selected virtual volume is virtual volume 414. Various methods can be adopted for selecting a virtual volume out of a plurality of generations of virtual volumes, such as selecting the youngest generation number (the time of creating the generation is oldest), selecting the volume of the generation known to have higher frequency of use in the future, selecting the volume having a certain characteristics or selecting the volume designated by the user.

The command control program 3501 migrates the write target page to the selected virtual volume. Actually, the command control program 3501 points the address stored in the PSCB pointer 1832 of the entry 1820 of virtual volume 413 to the PSCB 1832 of the entry 1820 of the storage area corresponding to the target page of the selected virtual volume 414 (S2314). Then, the command control program 3501 allocates one free PSCB from the free PSCB queue and the address of that PSCB is stored in PSCB 1832 of the entry 1820 of the storage area corresponding to the target page of the virtual volume 413 (S2316).

Upon allocating a PSCB, whether to allocate a PSCB from a free PSCB queue of the same tier as the former PSCB or to allocate a PSCB from a free PSCB queue of the tier having the higher performance can be determined based for example on the mode designated by the user, and the mode can be changed. The command control program 3501 updates the generation management information 1836 and the generation number counter 1838 of the entries 1820 of virtual volumes 413 and 414 (S2318). The command control program 3501 stores the write data in the storage area pointed by the PSCB being allocated (S2320). If there is no reference from other virtual volumes ("No" in S2310), the command control program overwrites the storage area pointed by the current PSCB (S2324). The command control program 3501 notifies the host 10 that the write process has been completed normally and the present process is ended (S2322).

According to the present example, a write request occurs to page C of the virtual volume 413 and data is rewritten, wherein page C is referred to from virtual volumes 414 and 415. Therefore, the command control program 3501 stores the content of the pointer of PSCB of page C stored in PSCB pointer 1832 of entry 1820 of the storage area corresponding to page C of the virtual volume 413 in the PSCB pointer 1832 of entry 1820 of the storage area corresponding to page C of the virtual volume 414.

The PSCB pointer 1832 of virtual volume 414 has its address switched from the exclusive zero page area (FIG. 27). FIG. 27 shows the operation according to the method shown in FIG. 24B. The PSCB pointer of page C can be switched to either virtual volume 414 or virtual volume 415 sharing page C. In the present example, the virtual volume having a smaller generation number is selected.

The information within entry 1820 is updated via the processor 360 by having the PSCB pointer of page C switched between virtual volume 413 and virtual volume 414. First, since only the virtual volume 413 refers to the data, the bitmap information of the generation management information 1836 of entry 1820 of the virtual volume 413 is updated from "1110 . . . 0" to "1000 . . . 0" via the processor 360. The processor 360 updates the generation number counter 1838 from "3" to "1".

The processor 360 updates the VM utilization status information 1840 from "110 . . . 0" to "000 . . . 0" since the VM using virtual volume 413 is not utilized. The processor 360 updates the VM usage generation counter 1842 from 2 to 0. On the other hand, the processor 360 updates the bitmap information of generation management information 1836 of the entry 1820 of the virtual volume 414 from "0000 . . . 0" to "0110 . . . 0". The generation number counter 1838 is updated from 0 to 2. The processor 360 updates the VM utilization status information 1840 from "000 . . . 0" to "110 . . . 0" since the VM referring to page C is utilized. The processor 360 updates the VM usage generation counter 1842 from 0 to 2.

(1-10-4) Write Operation to Snapshot

FIG. 27 is a drawing explaining the changing of generation relationship among virtual volumes when the write target page is unassigned. If the write target page is unassigned, the command control program 3501 processes both the snapshot source volume 413 and the snapshot volumes 414 and 415 in a similar manner as a new write process (corresponding to processes of S14172 and subsequent steps of FIG. 31).

If the write target page is assigned, the command control program 3501 processes the page in a similar manner as an assigned page write process. If the write target page refers to a page of a different volume, a process for switching mapping is performed. This process is shown in S14176 and subsequent steps of FIG. 31. According to the present embodiment, the entry 1820 is switched as shown in FIG. 27, but it is also possible to manage information by switching PSCB pointers.

(1-11) VM Utilization Status Information

For example, if a VM is suspended, the VM will not output an input/output request (I/O). If the VM does not output an I/O, it means that the page used by the VM is not accessed, and therefore, the access frequency of the page is changed.

However, since the access frequency of a page is recognized by monitoring the access status for a certain period of time, there is a time rag for the system to recognize that the access frequency of the page has changed. If the monitor timing is once a day, the change may not be reflected.

However, if it is possible for the system to recognize that there is no I/O output from a VM, the system can recognize that the page will not be used by the VM. Therefore, this information is important for a system having data stored in tiered storages and performing operation so as to place data in high speed storages in an efficient manner, as according to the present embodiment. Even regarding data referred to from a large number of virtual volumes, if the data is not used by the VM, there is no need to place the data in a high performance tier. Therefore, the data is reallocated to a low performance tier so as to free the high performance tier to other data. According to this process, the actually used data can be allocated to higher performance tiers in real time, and the overall performance of the system can be improved.

(1-11-1) Method for Acquiring VM Utilization Status Information

The method for acquiring VM utilization status information can adopt one of the following patterns.

(1) The host computer 10 sends information to the management server 20, the management server 20 determines the VM utilization status regarding whether the VM is utilized or not based on the information sent from the host computer 10, and sends information to the storage system 30 on which VM is presently utilized.

(2) The host computer 10 performs the role of the management server 20 of (1), and converts the determined VM utilization status to information on whether the VM is presently utilized before sending the information to the storage system 30.

(3) The host computer 10 sends the VM information to the storage system 30, and the storage system 30 holds a function to determine whether the VM is presently utilized or not based on the information to recognize whether the VM is presently utilized.

(1-11-2) Determining VM Utilization Status

We will now describe the information used as basis for determining whether a VM is presently utilized, the method of determining the same, and the pattern in which the VM utilization status is changed. The storage system 30 acquires various information for determining whether I/O is sent from a VM or not. The VM utilization status can be determined based on various information including the following:

(1) Whether the power of the host computer main body is turned on or off.
(2) Whether the VM is logging on or logging off.
(3) Whether the OS (Operating System) is being started or completely started.
(4) Whether the VM is suspended or resumed.
(5) Whether a path is coupled.
(6) Whether failure exists or not.
(7) Whether the port information is utilized or not.

Based on these information, whether or not the VM is utilized, that is, in a state capable of sending I/O to the storage service 30, is determined. The storage system 30 manages the VM status as shown in FIG. 21.

(1-11-3) Timing for Acquiring VM Information

The following patterns are considered as possible timings for acquiring the above-described VM information. The timings at which the storage system 30 acquires the VM information are a timing at which the number of VM utilization of a page is changed ((1) and (2) of the following), and a timing at which the number of VMs sharing a page is changed ((3) to (6) of the following).

(1) At a timing when the VM status has changed, only the fact that a change in VM status has occurred is notified from the host computer 10. The VM information is acquired mainly by the storage system 30.

(2) At a timing when the management server 20 recognizes the change of VM status.

(3) At a timing when a snapshot is acquired and at a timing when a snapshot is deleted.

(4) At a timing when old data prior to a write process is saved during a write process.

(5) At a timing when a snapshot volume is restored to another snapshot volume.

(6) At a timing during a deduplication process in which deduplication is performed.

(7) At a timing when the object of use or the usage of the volume of an application is changed.

(1-11-4) Process for Changing Utilization Status of VM

With reference to FIG. 28, we will now describe the process for changing the VM utilization status and the relocation process when the utilization status of a VM is changed. In the present example, VM #0 and VM #1 are suspended. In this case, the VM utilization status information 1840 and the VM usage generation counter 1842 of entries 1820 of pages A, B and C are updated via the processor 360. The example of page C will be described in detail. The VM utilization status information 1840 is updated to "000 . . . 0" via the processor since VM #0 and VM #1 referring to page C are suspended.

The VM usage generation counter 1842 is updated from "2" to "0" via the processor 360. The generation management information 1836 is information indicating whether a page is shared or not, and the shared status is unchanged. Therefore, the processor 360 will not change the generation management information 1836 and the generation number counter 1838. The usage information 2050 which shows the VM status of the VM specific information table 2001 is updated to "not utilized" via the processor 360.

(1-11-5) Relocation Process Via Change of VM Status

When the processor 360 changes the status of the VM, the system determines whether to relocate the data referred to from the VM having its status changed. In the example of FIG. 28, page C is referred to from VM #0 and VM #1. Now, VM #0 and VM #1 are suspended, that is, not utilized. Therefore, page C is not accessed. Therefore, while VM #0 and VM #1 are suspended, there is no need to locate page C in a high performance disk. In such case, migration of page C to a different tier is considered. The steps of the process performed when the VM utilization status has changed will be described with reference to FIG. 32.

(1-11-6) Method for Detecting Relocation when VM Utilization Status has Changed

The processor 360 starts the relocation process if even a single VM having its utilization status changed is found (S2810). When the change of VM utilization status has been detected, for example, if a series of VMs are suspended, the process cooperates with the host computer 10 or the management server 20 to start the relocation process via the processor 360 after all the change of utilization statuses of the series of VM has been completed.

The processor 360 selects one of the VMs having its utilization status changed (S2812). The processor 360 selects one volume that the VM selected in S2812 uses (S2814). The processor 360 selects a page assigned to the volume selected in S2814 is selected (S2816). The processor 360 refers to the VM utilization status information 1840 of the page (actually the entry 1820), and the VM statuses 2220 of all VMs referring to that page is updated (S2818).

The processor 360 also updates the VM usage generation counter 1842. This process is shown in FIG. 28. The processor 360 determines whether to perform relocation or not based on the VM usage counter and the tier in which the page is currently located (S2820). The processor 360 performs processes of S2818 through S2822 for each page within a volume, each volume used by the VM, and each VM having its utilization status changed (S2824 through S2828). Upon executing the present process flow, it is possible to adopt a process to prevent determination to be performed for the same page. For example, if the generation and VM correspond, the page of the generation corresponding to an already searched VM will not be subjected to the determination of S2822.

(1-11-7) Method for Determining Whether to Perform Relocation

Figure 32:
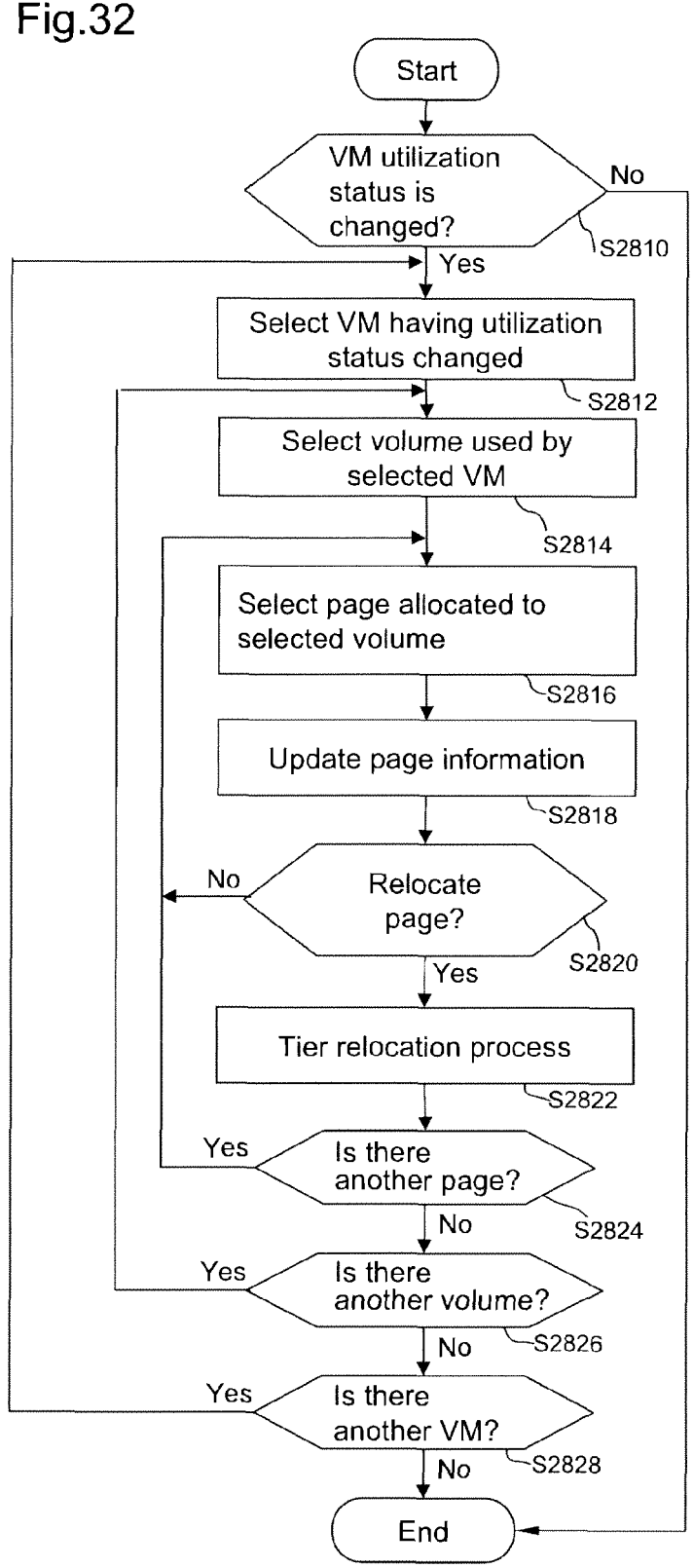
FIG. 32 is a flowchart showing the processing steps when a VM utilization status is changed.

The determination shown in S2820 of FIG. 32 on whether to relocate a page include the following.

(1) If all the VMs referring to a page are not utilized or are assumed to be not utilized, the page is migrated to a lower performance tier.

(2) If all the VMs referring to a page is utilized or are assumed to be utilized, the page is migrated to a higher performance tier.

Further, there are cases in which a designated ratio of utilized VMs out of the total number of VMs is used as the threshold, or in which a designated ratio of VMs is used as threshold in the determination step. The ratio is designated by the user or the management server 20. Processes performed at the timings for acquiring the VM information excluding the timings when the VM utilization status has changed, or processes of steps (3) through (6) of (1-11-3), will be described.

(1-11-8) Method for Detecting Relocation When Shared Number of Page Has Changed

At the timing for acquiring a snapshot, or a timing for deleting a snapshot, or a timing for restoring a snapshot volume, the processor 360 refers sequentially to pages of a snapshot source volume or another snapshot volume taken from the same snapshot source volume which is a volume related to the snapshot process. When the processor 360 finds a page having its generation management information 1836 changed, it determines whether to perform relocation of the page or not.

At a timing for saving an old data prior to writing performed in a write process, the processor 360 determines whether saved data should be relocated to the target or not. If a deduplication process is performed, the processor 360 determines whether or not to relocate the page to be subjected to deduplication at the timing of performing deduplication via the deduplication process. The determination on whether or not to perform relocation is based on the same logic as the process of determining the utilized VM number.

When taking a snapshot, the snapshot source volume is shared among multiple volumes when the snapshot is taken, so that the data can be relocated to a higher performance tier at the timing of taking the snapshot. Further, it is possible to adopt a method in which the snapshot source volume is not moved from the upper tier regardless of whether the volume is shared.

At a timing when the object of use or usage of the volume of the application has changed, for example when the usage of the volume is changed to backup use and the object of use becomes an archive use without any access, the page assigned to a snapshot source volume can be relocated to a lower tier. According to another example, if an operation using the volume has become a prioritized operation and when the frequency of access to the volume is assumed to be increased, or if the user expects the volume to have a high speed response regardless of the access frequency, the page assigned to a snapshot source volume is placed in an upper tier.

(1-11-9) Relocation Process

In the relocation process of S2822, the processor 360 relocates the relocation target page to a tier within the LANE set to the logical device management information of the virtual volume. According to another embodiment, the processor 360 relocates the target page to a tier exceeding the range of the LANE. For example, if the LANE is set to be composed of two tiers composed of SSD and SAS, the processor 360 migrates the page assigned to the snapshot source volume to a SATA tier. If the relocation causes a free space in another tier to be reduced, the process is performed in combination with a conventional method for monitoring the access status.

The processor 360 not only migrates the page referred to from a VM unutilized (or expected to be unutilized) due to suspension or the like one-sidedly, but migrates other pages to a higher performance tier to locate pages so that the pool usage frequency becomes uniform or so that load is dispersed.

There is a variation in which the LANE of the snapshot source volume and the snapshot destination volume are set according to the above-described process. Further, there are cases in which the data corresponding to the same storage area is stored in different tiers.

According to another embodiment, the timing for performing the relocation process is the changing of LANE settings of a snapshot destination volume or the setting of a LANE that differs from the LANE set to the snapshot source volume.

(1-12) Deleting a Snapshot

The process of deleting a snapshot is performed by the combination of the process for taking a snapshot and the process of a write request. If the page managing the snapshot volume being deleted is referred to from another volume, the processor 360 migrates the management of the page to one of the other volumes referring to that page. In other words, the processor 360 switches mapping of the information related to that page from the snapshot deleting volume to the migration destination volume.

Embodiment 2

(2) Second Method Of Relocating Page

FIGS. 36 to 40 illustrate a process for relocating a page.

(2-1) Relocation Based on VM Status

Figure 36:
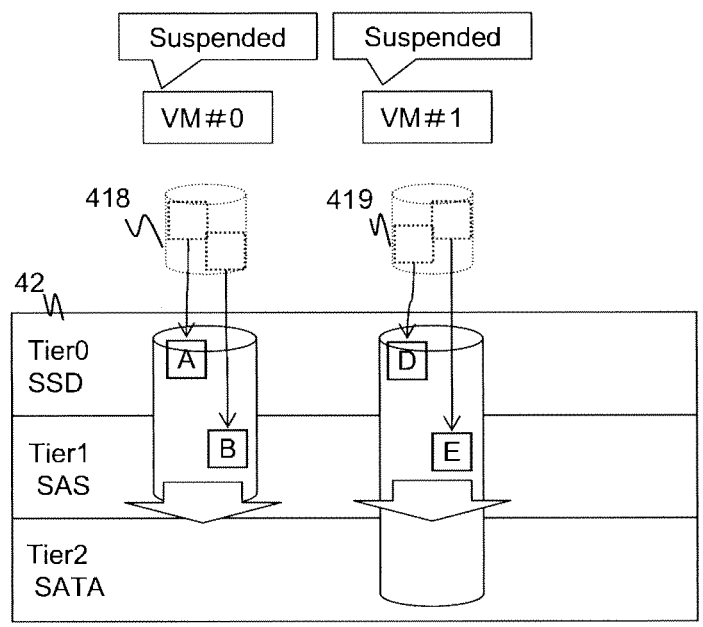
FIG. 36 is a first correspondence view illustrating the page relocation of virtual volumes based on VM status change.

FIG. 36 illustrates relocation of a page via the processor 360 based on the VM status. Since VM #0 and VM #1 using virtual volumes 418 and 419 are suspended, the processor 360 migrates pages assigned to virtual volumes 418 and 419 to a lower tier. Upon selecting the lower tier for migration, there are two possible cases; a case for selecting the tier from within a LANE and a case for selecting an external tier. According to the illustrated example of FIG. 36, the LANE of virtual volume 418 are Tier 0 and Tier 1, and the LANE of virtual volume 419 are Tier 0, Tier 1 and Tier 2.

(2-2) Relocation Using Deduplication Function

Figure 37:
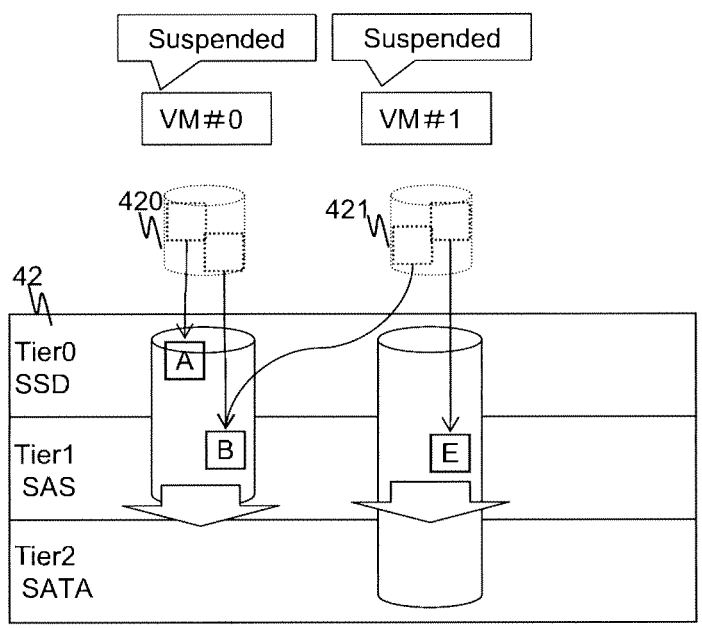
FIG. 37 is a second correspondence view illustrating the page relocation of virtual volumes based on VM status change.

FIG. 37 illustrates an example in which the virtual volume executes the deduplication function. The deduplication function refers to a function of when a content of a certain storage area of a certain volume is the same as the content of a page already stored in a pool, the already stored page is pointed without storing a new page to a pool so as to share the duplicated page. When deduplication is performed, if all the VMs using all the virtual volumes pointing at a duplicated page are suspended, the processor 360 migrates the page to a lower tier.

For example, if the VM is resumed, the processor 360 migrates the page to the higher tier. In the example of FIG. 37, page B is shared by virtual volumes 420 and 421, so that only when the VM #0 and VM #1 using the virtual volumes 420 and 421 are suspended, the processor 360 migrates page B to the lower tier.

(2-3) Relocation in Normal Volume (Physical Volume)

Figure 38:
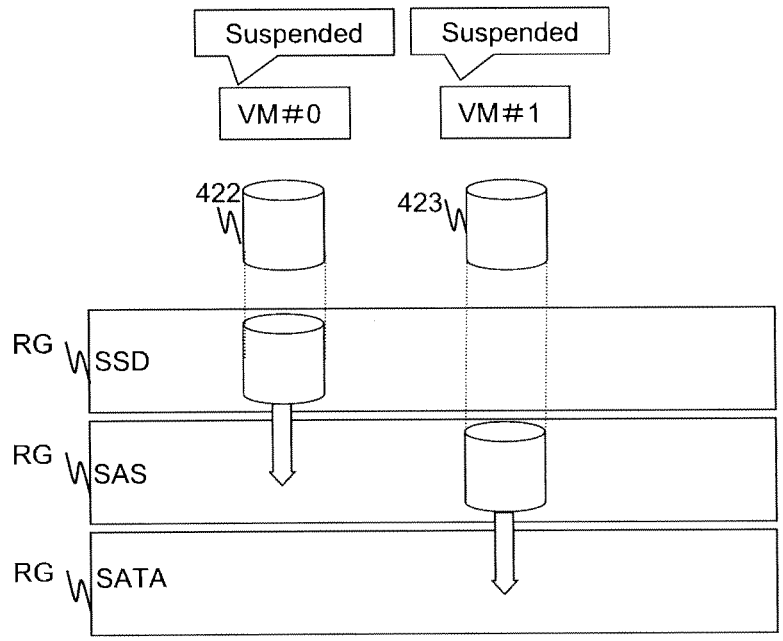
FIG. 38 is a first correspondence view illustrating the page relocation of real volumes based on VM status change.

FIG. 38 illustrates another embodiment of the arrangement of FIG. 36. The difference of FIG. 38 from FIG. 36 is that the target is a normal volume (real volume) instead of a virtual volume. At the timing of change of the VM status using the real volume, the processor 360 performs migration among tiers in volume units. According to the example of FIG. 38, the whole volume is migrated to the lower tier since the VM #0 using the real volume 422 is suspended.

(2-4) Relocation in Normal Volume and Replication Volume

Figure 39:
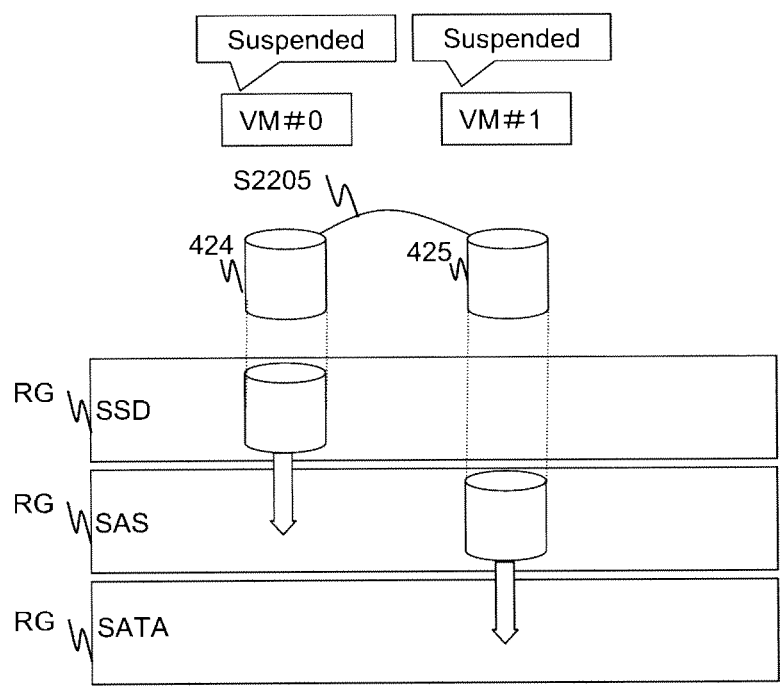
FIG. 39 is a second correspondence view illustrating the page relocation of real volumes based on VM status.

FIG. 39 is a drawing describing the data relocation in the case where a replication volume has been created with respect to the normal volume 424 of FIG. 38. Reference number S2205 refers to the process for replicating a real volume 424 to a real volume 425. Possible methods for replication include a method for the processor 360 copying the whole real volume 424 as copy source from the start to the end of the storage area, or a method for the processor 360 copying a data prior to update from the copy source to the copy destination only when update occurs to the copy source or the copy destination. For example, if VM #0 or VM #1 using the real volume 424 or the real volume 425 are suspended, the processor 360 migrates the whole volume to the lower tier.

Embodiment 3

(3) Relocation in Snapshot Volume (3-1) Cascading of Snapshot

Figure 33:
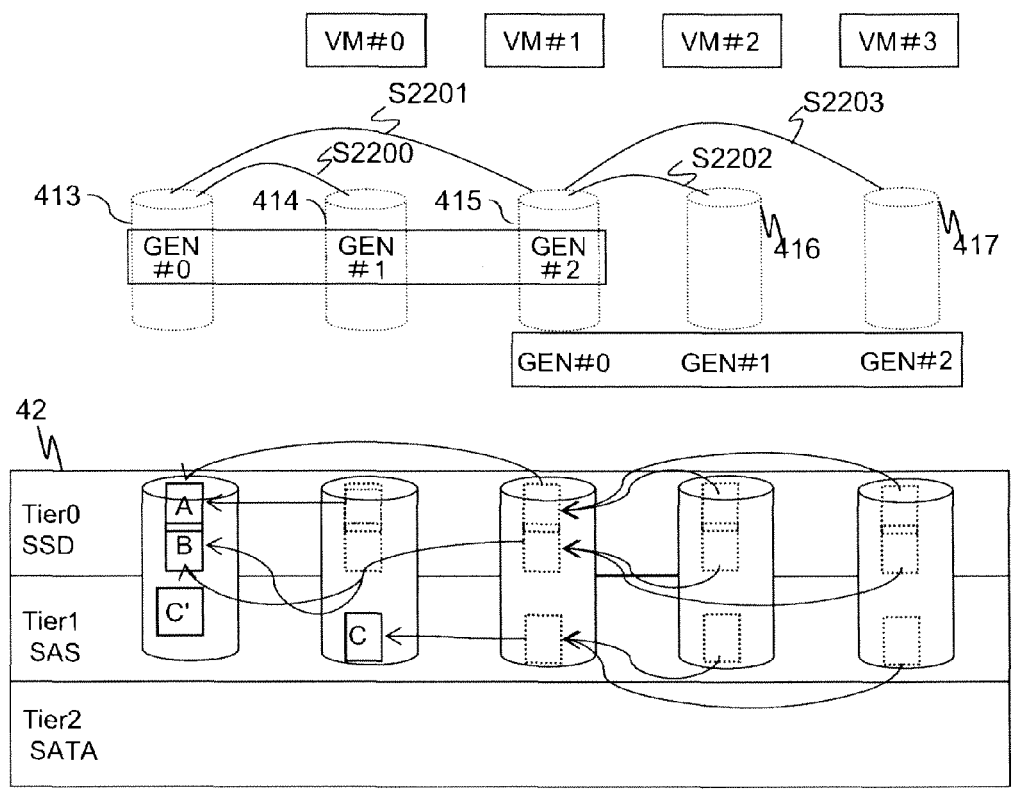
FIG. 33 is a view showing a cascading relationship of a snapshot of a virtual volume and a snapshot volume.

We will now describe a cascading process for taking a further snapshot from a snapshot volume. For the purpose of distinguishing volumes, the volumes are called a snapshot source volume, a snapshot volume and a cascading snapshot volume. FIG. 33 illustrates the cascading relationship of a snapshot of a virtual volume and a snapshot volume thereof.

The virtual volume 413 is a snapshot source volume, and the virtual volumes 414 and 415 are snapshot volumes of the virtual volume 413. Virtual volumes 416 and 417 are cascading snapshot volumes of the virtual volume 413 and are also snapshot volumes of the virtual volume 415.

In FIG. 33, the cascading snapshot volume is only managed from the snapshot volume which is the snapshot source of the cascading snapshot volume. The cascading snapshot volume cannot be seen from the snapshot source volume which is the source volume of the snapshot volume. Of course, the cascading snapshot volume is not managed by the snapshot source volume. By following the respective table information, it becomes possible to reach the management information of the snapshot source volume.

The relationship of retention of the management information according to the arrangement of FIG. 33 is shown. The relationship of virtual volumes 413, 414 and 415 are as illustrated in FIGS. 24A, 24B, 25 and 27.

Figure 34:
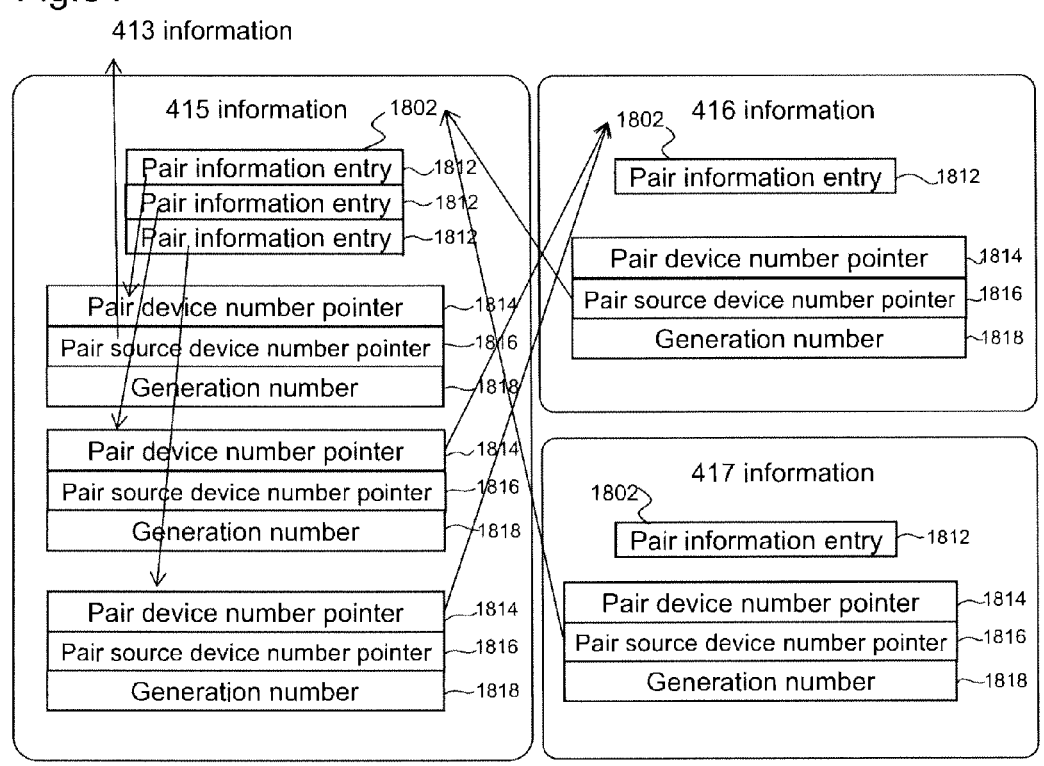
FIG. 34 shows a pair relationship among virtual volumes in generation cascading relationship.
Figure 35A:
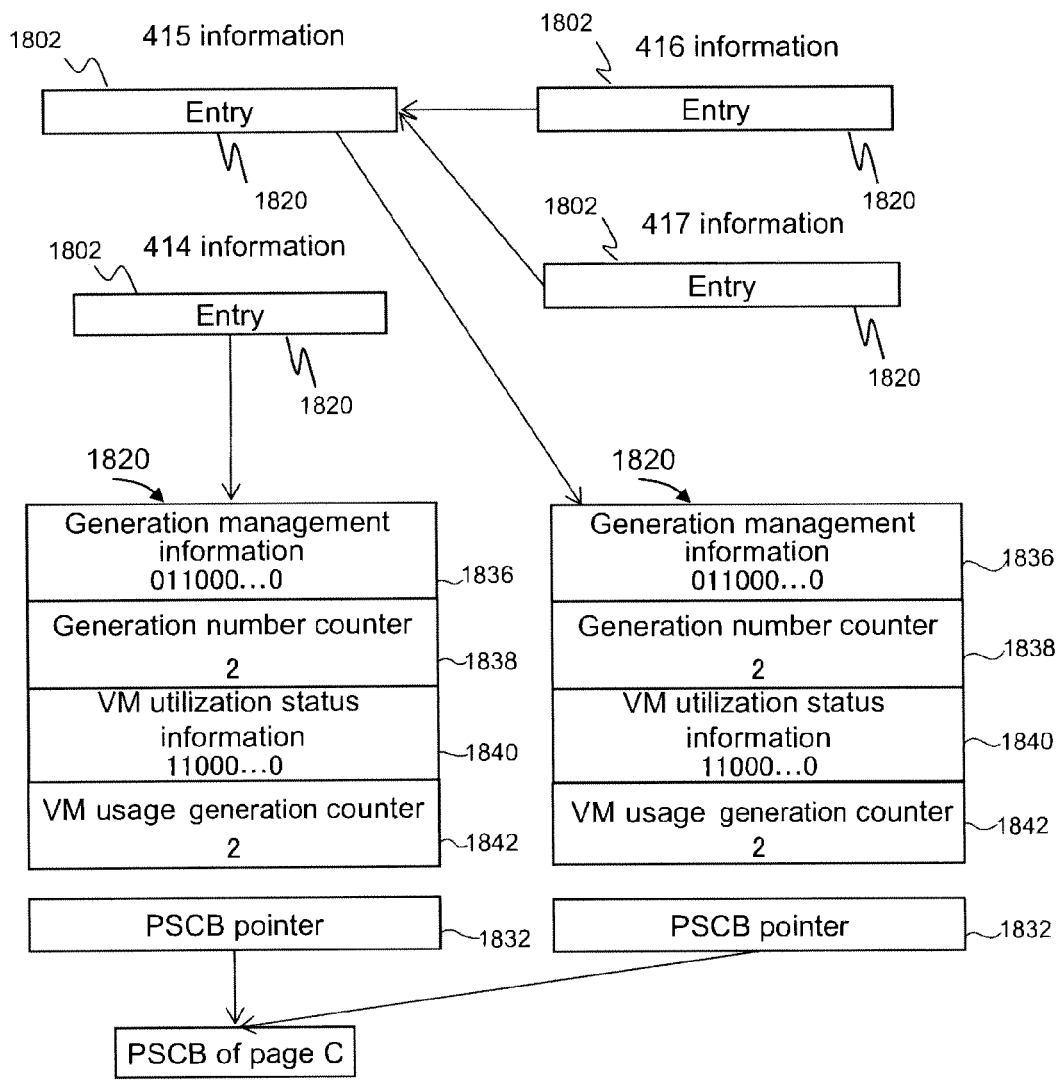
FIG. 35A is a view showing the correspondence between virtual volumes and PSCB pointers in generation cascading relationship.
Figure 35B:
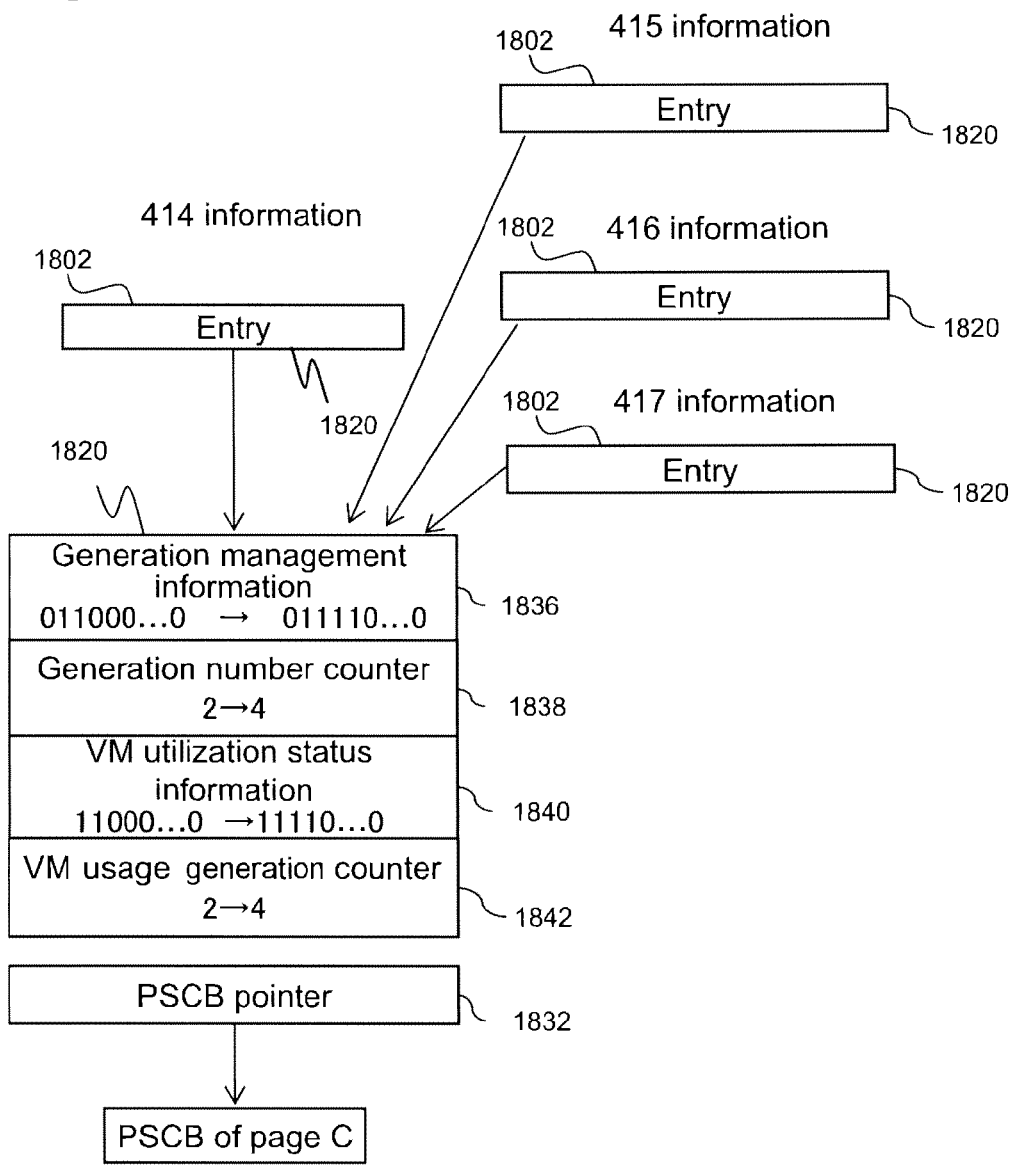
FIG. 35B is a view showing the correspondence between virtual volumes and PSCB pointers in generation cascading relationship.

FIGS. 34, 35A and 35B illustrate the relationship of virtual volumes 416 and 417 as snapshot destination of virtual volume 415 which is a snapshot destination of the virtual volume 413, in other words, illustrate the cascading relationship. FIG. 34 shows a pair information relationship. FIGS. 35A and 35B show a relationship of entry 1820 which is a content designated by the address stored in the entry 1802 and the entry 1820 of the virtual volumes 414, 415, 416 and 417. The method of FIG. 24A corresponds to the method of FIG. 35A, and the method of FIG. 24B corresponds to the method of FIG. 35B.

In order to delete the virtual volume 415 of FIG. 33, since the virtual volume 415 being the target of deleting is cascaded, the cascading virtual volumes 416 and 417 are deleted first before deleting the virtual volume 415.

(3-2) Relocation During Cascading of Snapshot

Figure 40:
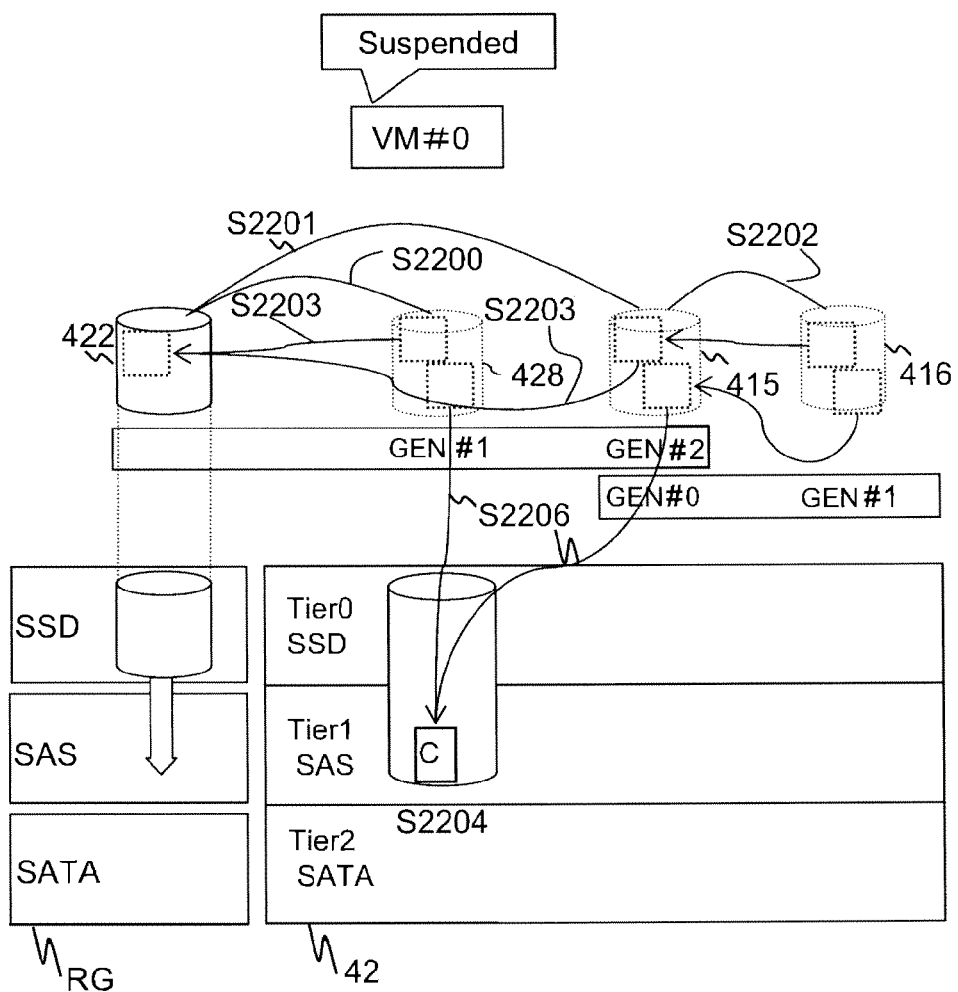
FIG. 40 is a view showing the cascading relationship between a snapshot of a real volume and a snapshot volume.

FIG. 40 illustrates an example in which a snapshot is taken and the snapshot is cascaded when the copy source is a real volume. The processor 360 takes snapshots S2200 and S2201 of a real volume 422 in the virtual volume 428 and the virtual volume 415. When the snapshot is taken, since the virtual volumes 428 and 415 all refer to the data of the real volume 422, the processor 360 maps the snapshot volume to the storage area shown by the real volume 422 (S2203).

Actually, the processor 360 maps virtual volumes 428 and 415 to the address of the storage area of the real volume 422, and when access occurs to the virtual volume 428 or the virtual volume 415, a storage address of real data is computed from the address of the storage area of the corresponding real volume 422 and data is read. When a write request occurs to a certain data of the real volume 422, since the data prior to the write process is referred to by the virtual volumes 428 and 415, the processor 360 migrates data to the virtual volume 428 (S2204).

Actually according to the present embodiment, the processor 360 allocates a storage area capable of storing data "C" prior to the writing process, migrates data "C" thereto, selects one of the volumes referring to the data in a shared manner (in this case, virtual volume 428 is selected), and remaps the storage area storing data "C" to the virtual volume 428. Similarly, the processor 360 switches the mapping of virtual volume 415 referring to data "C" from the storage area of the real volume 422 to the data migrated to the virtual volume 428 (S2206). Tiers can be changed when migrating data "C".

If the snapshot of virtual volume 415 is further taken in virtual volume 416 (cascading), the virtual volumes 415 and 416 can be mapped similar to the relationship of the real volume 422 and the virtual volume 414. That is, when referring to the storage area of the virtual volume 416 having the same data as virtual volume 415, the snapshot volume is mapped to the storage area of the virtual volume 415. According to another method, virtual volume 416 can be mapped directly to data "C".

The pair information entry 1812 can be grouped via the snapshot source information and the snapshot destination information and managed in a divided manner Actually, such method can be realized by providing one more tier to the pair information entry 1812.

According to the aforementioned example, it may be possible that the volumes used by the VMs are duplicated. In other words, a single volume may be used by multiple VMs. In such case, when all the VMs using the target volume satisfy the above-described conditions, the target volume is migrated to another tier.

It is assumed that volume 413 of FIG. 28 is used by VM #2 (not shown). When the VM #2 is suspended, the processor 360 relocates the page within volume 413 to a lower tier. In other words, even if a snapshot is taken, the processor 360 relocates the virtual volume among tiers depending on the status of the VM.

(3-3) Restoration of Snapshot

Restoration refers to a state of a snapshot source generation brought to a state of a certain snapshot generation. Actually, a page of a snapshot source volume that differs from a snapshot volume being the restoration target is changed to the page of the restoration target volume. FIG. 28 illustrates an example in which generation 1 (gen#1) is restored to generation 0 (gen#0). Since page A and page B are the same for virtual volumes 413 and 414, no process occurs. As for page C that differs between virtual volume 413 and virtual volume 414, page C is changed to page C. This is a mapping process in which the direction of arrows of processes S2316 and S2314 are opposite from the mapping process of FIG. 27.

(3-4) Restoration Due to Reutilization of VM

When the VM status is changed from suspended state to resumed state, the processor 360 performs a restoration process to return the data to a former tier. In that case, the processor 360 stores the tier in which the data has been located formerly for each page, and the information is referred to when performing the relocation process for relocating data from the current tier to the tier stored in the information. The former tier information is stored as a former tier number 1844 in the entry 1820.

Embodiment 4

Figure 42A:
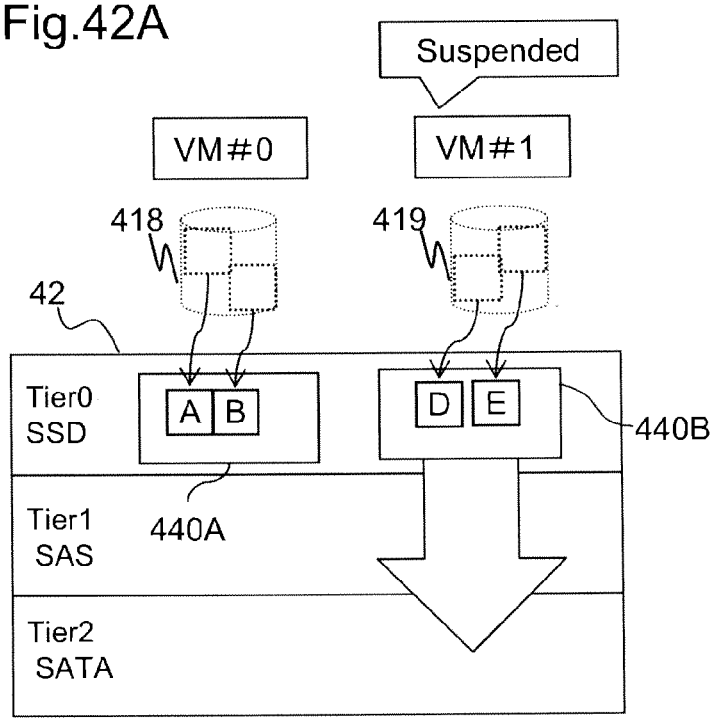
FIG. 42A is a view showing the page relocation method when the unit of page differs from the unit of data access.
Figure 42B:
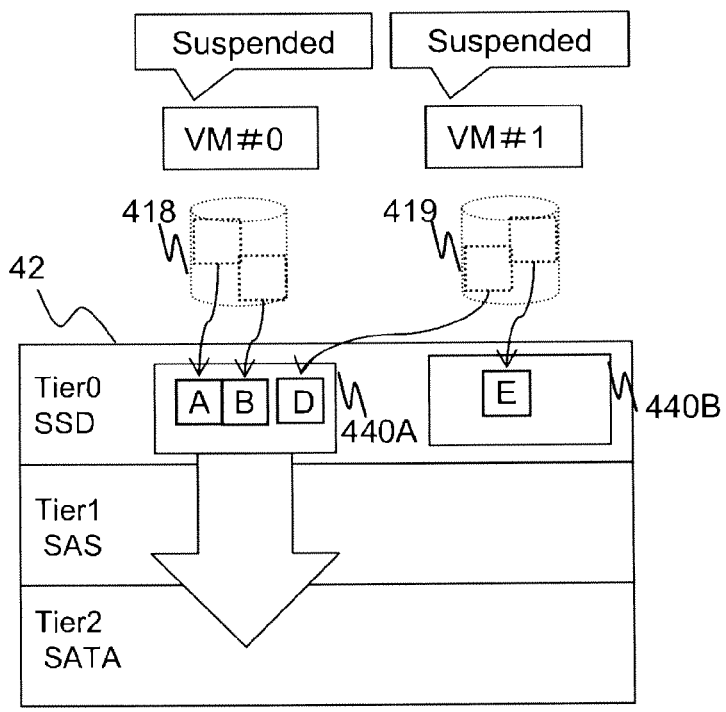
FIG. 42B is a view showing the page relocation method when the unit of page differs from the unit of data access.

(4) Relocation Considering Size/Access Unit (4-1) When Page Size Differs From Access Data Units FIGS. 42A and 42B are referred to in describing the page relocation method when the page size differs from the unit of data access. When page 440 is composed of multiple data, the following method (1) or (2) is executed.

(1) Method for Assigning Pages in VM Units and Organizing Slots

If a page is composed of multiple host computer access units, a single page may store data used by multiple VMs. In such case, there are multiple VMs using a single page. Even if a part of such VMs using a page is suspended, the page may still be accessed by other non-suspended VMs using the page. Therefore, the processor 360 cannot migrate such page to other tiers. This example is illustrated in FIG. 42A. If pages are assigned via VM units, the effect of the present invention will be enhanced further. A similar effect is considered to be achieved by assigning pages in units such as work groups, such as to VMs in which jobs are performed at nighttime.

(2) Method for Not Pairing VM and Page

As shown in FIG. 42B, one page is shared by multiple volumes, and the volumes are shared by multiple VMs. Even if data is not shared, since the page is shared, the page is relocated to a lower tier if all the VMs using the page are suspended. In a case of use where OS is disposed on each VM, if the OS capacity is greater than the page size, the reduction of capacity efficiency by assigning pages per VM (per volume) is reduced. If a single write amount of VM corresponds to an amount approximately using up a set page size, it is preferable to use a page per VM. If a single write amount of VM is smaller than the page size, it is necessary to share a page among multiple VMs and to reassign pages when relocating the page to another tier so as to perform efficient relocation.

Figure 41A:
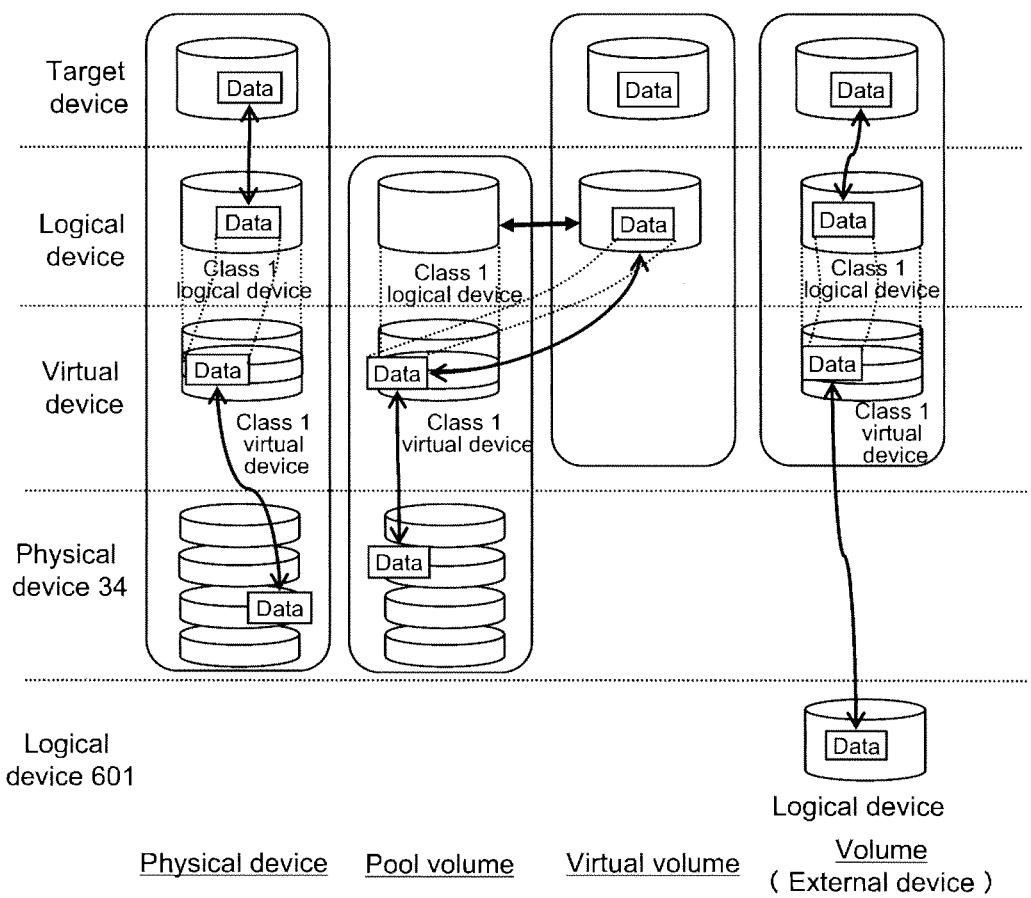
FIG. 41A is a view illustrating the correspondence between the target device, the logical device and the physical device.

FIG. 41A is an explanatory view of the target device, the logical device and the physical device. The host computer 10 accesses a target device 700 set to the storage system 30. The storage area of the target device 700 is a class 1 logical device 500. The class 1 logical device 500 is an area of a class 1 virtual device 400 composed via a RAID configuration from a physical volume. A class 1 virtual device 400 is divided into one or more class 1 logical devices 500.

Further, the host computer 10 accesses a virtual volume set to a storage system 30 as a target device 701. The virtual storage area of the target device 701 is a class 2 logical device 501. The class 2 logical device 501 is associated with a class 1 logical device 500 set as a storage pool. That is, the correspondence between the class 1 logical device and the class 2 logical device is managed via address mapping.

The host computer 10 accesses a target device 701 which is a virtual volume. The storage area of the virtual volume is a class 2 logical device 501. When the storage system 30 receives access to the class 2 logical device 501, it converts as access destination the class 1 logical device 500 associated with the class 2 logical device 501. The write data from the host computer is stored directly in the virtual device of the pool volume.

Figure 41B:
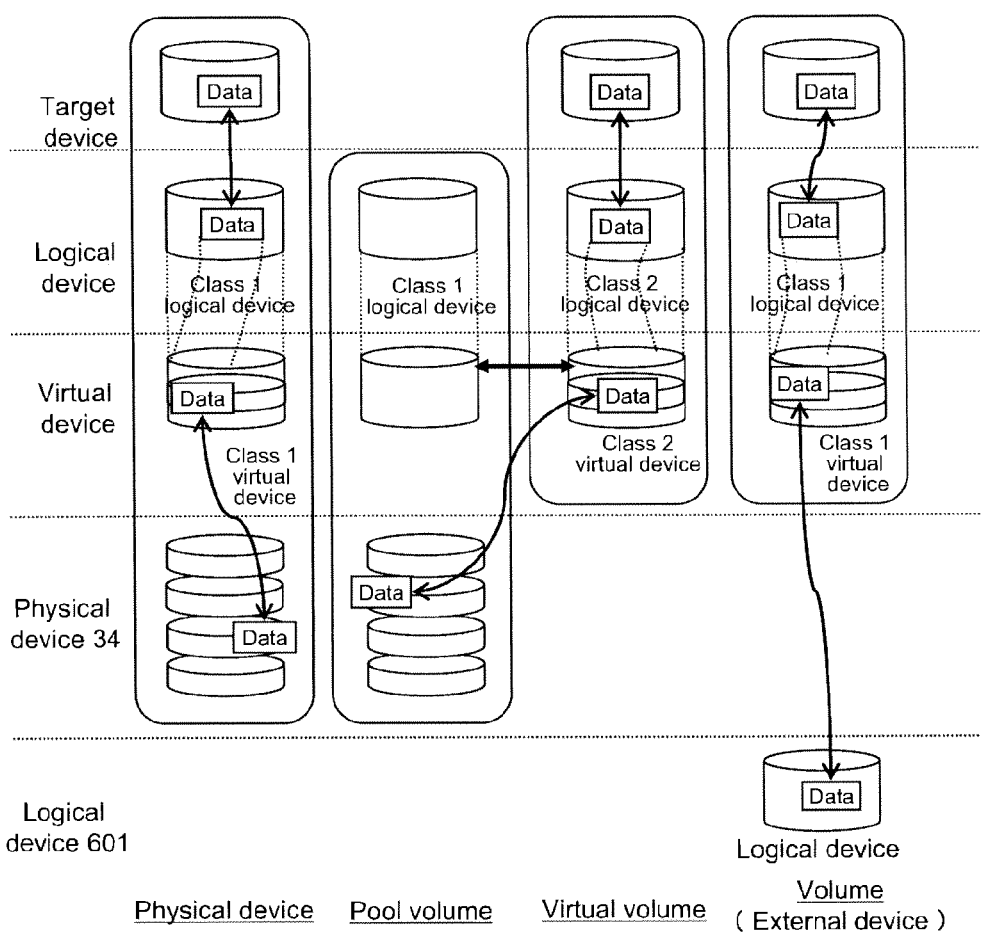
FIG. 41B is a view illustrating the correspondence between the target device, the logical device and the physical device.

FIG. 41B is a block diagram corresponding to FIG. 41A of a second computer system 1 illustrated in FIG. 2. The class 1 virtual device and the class 2 virtual device are associated by mapping addresses, and the write data from the host is directly stored in the physical device.

Embodiment 5

(5) Other Application Examples (5-1) Read/Write Process During Relocation Process and Snapshot Process Regarding a read process during the relocation process and snapshot process, after step S14106 of FIG. 30, the processor 360 determines whether the target data is currently subjected to a relocation process or not, and if it is currently subjected to a relocation process, reading is performed from the data prior to relocation. If the data is not subjected to a relocation process, the process similar to FIG. 30 is performed. As for the write process of data subjected to relocation process and snapshot process, whether the target data is currently subjected to a relocation process or not is determined prior to S14160 of FIG. 31, and if the data is currently subjected to a relocation process, the processor 360 reads data from data prior to relocation, and since the result of writing write data to the data is allocated in the cache memory 32 (S14150), stores the write data in the copy destination of the relocation process. If the relocation process is not performed currently, the process similar to FIG. 31 is performed.

When a write process is requested during the process of taking a snapshot, the processor 360 performs the process of FIG. 27. The same applies during restoration of a snapshot. Whether a data is currently subjected to relocation, subjected to taking a snapshot or subjected to restoration is stored in a status information provided per data (page). Then, when the relocation process is started, the status information is set to "relocating", and when the relocation process is completed, the status information is set to "normal" or other data indicating that relocation process is not currently performed. Similarly when a snapshot is taken, when taking of a snapshot is started, the status information is set to "taking a snapshot", and when the taking of a snapshot is completed, the status information is set to "normal". During restoration of a snapshot, the status information is similarly set to "restoring snapshot".

(5-2) Data Relocation During OLTP or Night Time Batch Processing

During OLTP (On-Line Transaction Processing) or night time batch processing, the respective VM statuses are repeatedly changed between suspended and resumed. Actually, during the daytime processing, the nighttime processing is suspended, and during the nighttime processing time, the nighttime processing is resumed and the daytime processing is suspended.

Such method can be utilized for example by relocating data used only for nighttime processing to a low performance tier during daytime processing, and in contrast, when the nighttime processing is started and the status of the VM is switched from suspended to resumed, the data is relocated to a higher performance tier.

Of course, the present invention can be assembled with a method for monitoring the access frequency. Now, the storage system 30 can equalize the assignment of pages to a virtual volume among multiple pool volumes belonging to the same tier within a pool via a rebalancing program 3506.

Figure 43:
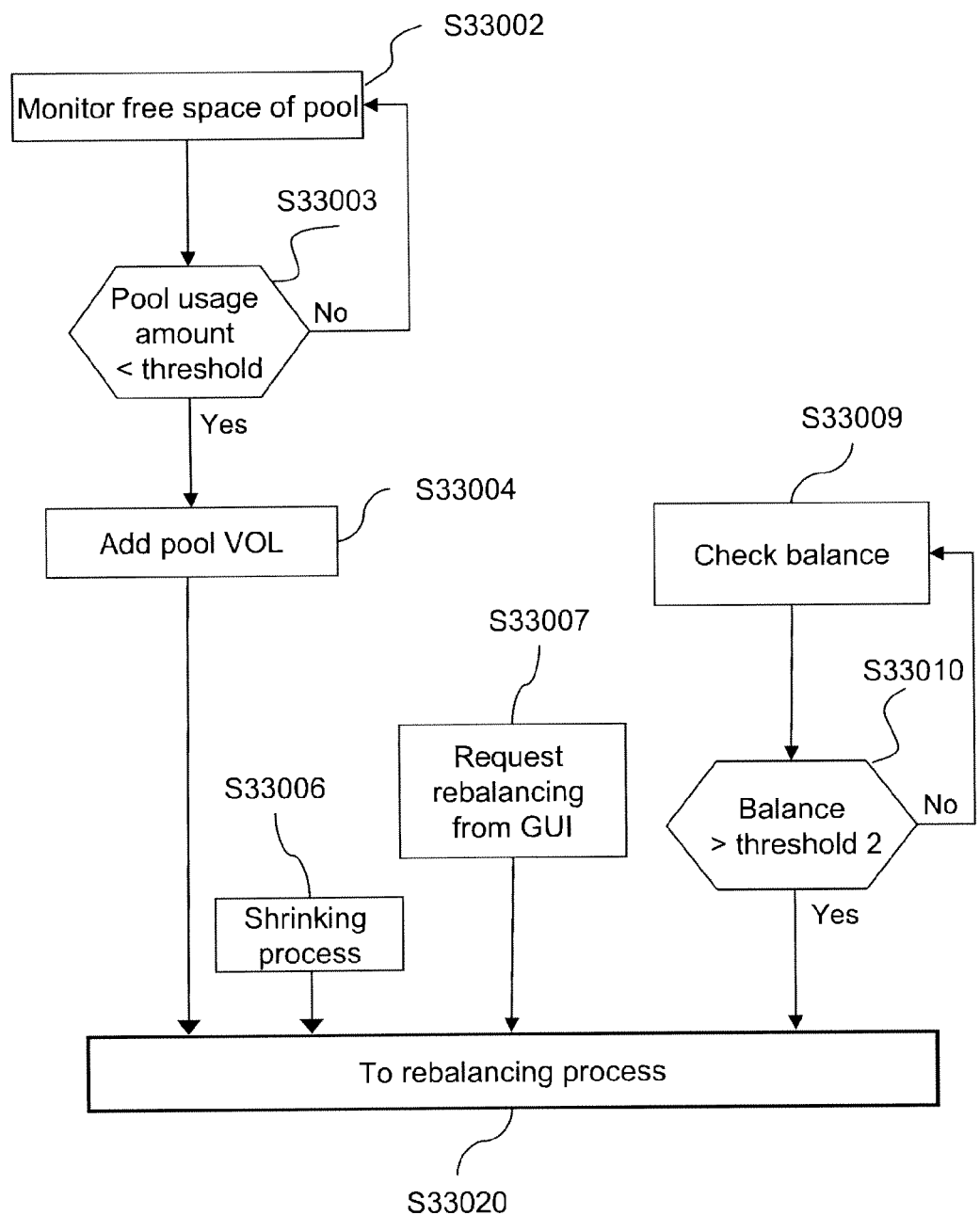
FIG. 43 is a flowchart showing the steps of equalizing the assignment of pages to virtual volumes.
Figure 44:
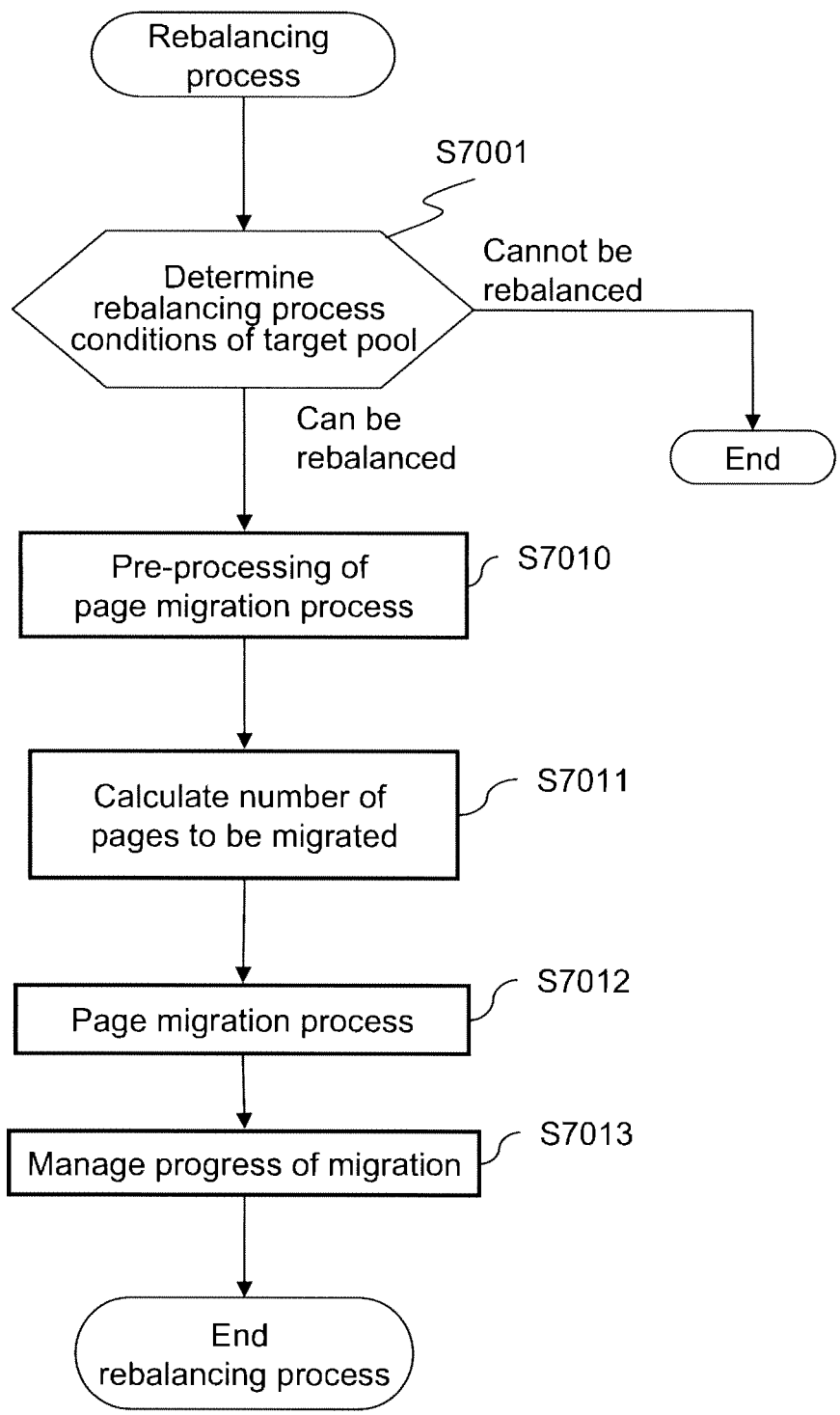
FIG. 44 is a flowchart showing the steps of a rebalancing process.

This equalization process is disclosed in PCT/JP2009/058533. The description of PCT/JP2009/058533 is hereby incorporated by reference to the present specification. The basic content of the disclosed invention will be described with reference to FIGS. 43 and 44. FIG. 43 is a flowchart illustrating the equalization process for assigning pages to a virtual volume. FIG. 44 is a flowchart showing the steps of a rebalancing process (S33020) according to FIG. 43.

The events set as the timing for executing relocation of a page in the storage system 30 are, as shown in FIG. 43, adding of a pool to a pool volume, deleting of a pool from a pool volume (shrinking), rebalancing of pages used by multiple pool volumes with respect to the overall number of pages, rebalancing of amount of use of pool with respect to the pool volume capacity, or a request sent from a user via a GUI. In the actual process, the processor 300 of the storage system 30 executes a rebalancing program 3506 including the processing steps shown in FIGS. 43 and 44 to equalize the capacity.

According to the equalizing process of page allocation to a virtual volume shown in FIG. 43, the storage system 30 monitors the free space of the pool for a certain period of time (S33002). Next, the storage system 30 determines whether the amount of usage of the whole pool (capacity of all pages used for allocation) has exceeded a threshold or not (S33003). When the threshold is exceeded, the management server 20 or the maintenance terminal performs a process to add a new pool volume to the pool. The storage system 30 updates the pool management information along with the addition of the pool volume (S33004). Thereafter, the processor 360 of the storage system 30 executes the rebalancing process (executes the rebalancing program 3506) (S33020).

On the other hand, the deleting of a pool volume also becomes the timing for performing the rebalancing process. When a rebalancing request is sent from the managing user via a GUI, the storage system executes a rebalancing process. The GUI exists in the management server 2 or the maintenance management terminal 153.

Thereafter, the monitoring function of the rebalancing program 3506 checks the balance of respective pool volumes with respect to all the pages being used per predetermined timings (S33009) and compares the same with a threshold (S33010). If the value is greater than a threshold, it is determined that the balance is deteriorated, and the storage system 30 performs a rebalancing process.

FIG. 44 is a flowchart showing the steps of the rebalancing process. The rebalancing program 3506 determines whether to perform rebalancing of a pool being the target of the rebalancing process (S7001). The determination is performed based on the determination of pool status of the pool management information table 14. When there is no free space in the pool capacity, it is determined that rebalancing cannot be performed.

When it is determined that rebalancing is possible, the rebalancing program 3506 performs a pre-processing (S7010). The pre-processing can be, for example, determining a migration source pool volume and a migration destination pool volume (for changing allocation of a page or migration), determining an order of selection (allocation order) of a pool volume to which the page migration process is applied, and simulating the capacity of a pool volume after migrating a page.

When a pool volume is added to a pool, the pool is managed by the pool management information, and the storage system 30 reviews the capacity ratio of the pool volume.

Next, the rebalancing program 3506 calculates the number of pages within the pool to be migrated (S7011). Thereafter, the process for migrating pages is performed (S7012). During the migration process, a process for discarding the fixed patterns existing in the plurality of pool volumes (such as a page in which all the data is "0") is simultaneously performed to reduce the capacity of the pool volumes.

During page migration, the rebalancing program 3506 determines whether a condition to suspend the rebalancing process has occurred or not. For example, if an I/O is output from a host computer 10 to the page subjected to the rebalancing process, the rebalancing process is suspended. When the cause of suspending the rebalancing process is gone, the rebalancing process can be resumed.

Next, the rebalancing program 3506 manages the progress of the page migration process (S7013). Based on this management step, the rebalancing program 3506 can show the state of progress of the rebalancing process to the management user. The outline of the migration process will be described below.

(5-3) Relocation (Migration) of Data Based on I/O Frequency

In order to store virtual volume data, storage areas were assigned from tiers having higher order of priority at the initial point of time. The order of priority is defined based at least on either the performance or the unit cost. Performance refers for example to the data I/O rate or the response time (length of time from receiving a command from a host to returning a response thereto). Unit cost refers to the cost required for storing unit size data (so-called bit cost, for example).

When the process for assigning storages areas is continuously performed, the data storage amount in high performance media are increased until there is no more free space in such media. Therefore, relocation of data is performed. Actually, data can be stored in dispersed manner to other tiers (other media) within the LANE set to the virtual volume.

At the initial time of storing data, high performance tiers within the LANE are selected with higher priority, and after storing data, the access frequency per page is monitored so as to store pages actually having high access frequency to higher tiers and to relocate, that is, migrate pages not having high access frequency to lower performance tiers.

Normally when an I/O is sent from the host computer 10, a read/write process (refer to FIGS. 29, 30 and 31) is executed and the access status is stored in a monitor information table. The access status includes the number of 110 occurring per page number, the average number of I/O within a given unit time, or the time of the last received I/O.

When the relocation process is started, the relocation program 3510 of FIG. 8 determines the tier which is the range of the load of the real page (such as the 110 frequency) that should exist in the target tier. The tier is determined based on capacity and performance, and is determined by referring to the monitored information.

When the tier is determined, the relocation program 3510 executes the relocation process based on the tier. For example, the relocation program 3510 checks the plurality of virtual volumes one by one, and determines whether the tier in which the volume is currently located corresponds to the tier in which it should be located. If not, the relocation program 3510 migrates the data and relocates the same to the correct tier.

The timing of performing the relocation process is either periodically or based on the timing specified by the user. The present data relocation can be performed in parallel with the relocation process monitoring the data access frequency as described above. At that time, tiers are determined based on the monitored information (current real value) and future prediction when relocating data, wherein information regarding relocated (relocation of) data to a tier is stored forcibly in an entry 1820 or the like separately from the monitored information, so as to prevent the relocation process from causing a deadlock.

According to the present invention, optimum tier location is made possible in a shorter period of time compared to relocating data after monitoring the access frequency of data. Further, the present invention enables to locate data effectively to appropriate tiers since data relocation is performed by sensing the relocation timing.

The relocation such as that performed according to the present invention cannot be performed by merely checking the number of VMs sharing the data. The present invention enables to perform relocation of data using information regarding both the actual number of accesses and the number of VMs sharing the data. Even if a large number of VMs refer to the data, if all VMs are suspended, it is not necessary to place data in a high performance tier.

Embodiment 6

(6) Application of Invention to File Format Data

Figure 46A:
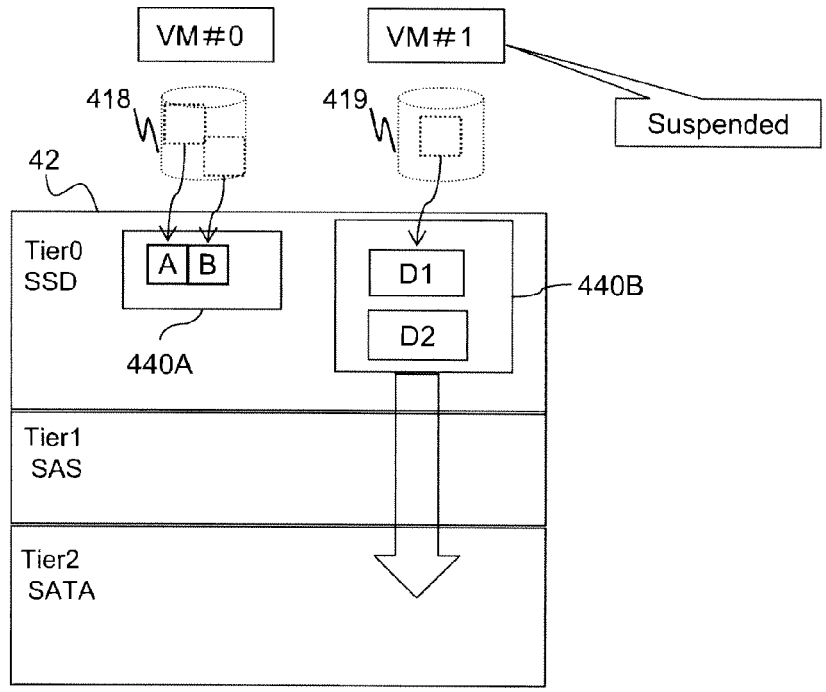
FIG. 46A illustrates the relocation of data when a VM handing file format data is suspended.
Figure 46B:
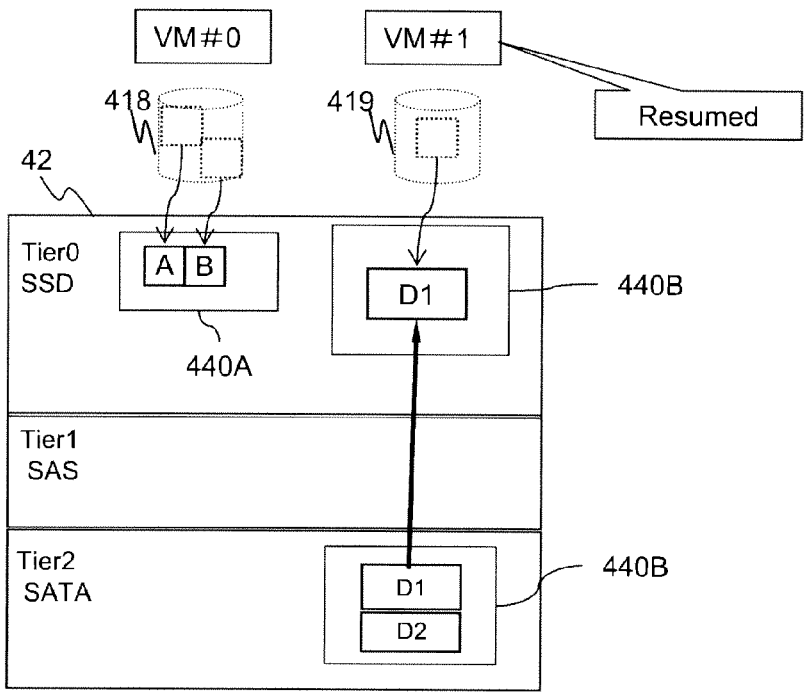
FIG. 46B illustrates the relocation of data when a VM handing file format data is resumed.

The application of the present invention to file format data will be described with reference to FIGS. 45, 46A and 46B. FIG. 45 shows a data structure in file format. FIG. 46A shows relocation of data when a VM handling file format data is suspended. FIG. 46B shows relocation of data when a VM handling file format data is resumed.

When a file 2200 in file format as shown in FIG. 45 is transmitted from VM #1, the processor 360 executes the file control program 3505 and converts the file format data into block unit data. Actually, a metadata section 2201 composed of a file name 22011, a file type 22012, a file size 22013, an offset (start position of metadata section and data section) 22014 and date information (information of date and time of creation/update/reference) 22015 is converted into block format data D1, and a data section 2202 is converted into block format data D2.

Thereafter, the processor 360 executes a command control program 3501, and at first, stores data D1 and data D2 to page 440B of Tier 0. Thereafter, the processor 360 changes the page 440B assigned to Tier 0 to Tier 2, and migrates data.

When VM #1 is resumed (restarted), at first, the processor 360 changes the tier of data D1 corresponding to the metadata section from Tier 2 to Tier 0, and migrates data. At this point of time, data D2 corresponding to the data section is not migrated. The timing for migrating data is when a read request or a write request from VM #1 occurs.

For example, when a read request occurs, since the metadata D1 of the file is placed in Tier 0 enabling high speed access, the processor 360 can execute the read process of data D2 corresponding to the data section thereof speedily. The processor 360 transmits the data D2 being read to VM #1 and simultaneously stores the same in page 440B in Tier 0. Similarly when a write request occurs, the processor 360 reads data D2, merges the same with the write request data and stores the same as new data to page 440B in Tier 0.

As described, data migration is not performed until actual access occurs and that access will positively continue in the future. Thus, efficient use of high speed Tier 0 having a small capacity is enabled, and migration of data that may not be accessed becomes unnecessary.

File format data was taken as an example in describing the present invention, but the present invention related to a database can be applied to data groups. In a database, the index section corresponds to the metadata section of the files, so that when a VM is resumed, the index section is first migrated to a higher speed tier. According to another method, the data D1 corresponding to the metadata section can remain in Tier 0 even when the VM #1 is suspended. Upon performing the above-described process, data D1 and data D2 must be stored in separate pages.

The present invention is not restricted to the illustrated embodiments, and the elements can be modified in various ways to realize the invention without falling out of range of the invention. Further, multiple elements taught in the embodiments can be combined arbitrarily to realize various inventions. For example, it is possible to delete some elements from the elements composing the embodiments. Further, it is possible to combine elements arbitrarily from various embodiments.

Further, all or a portion of the respective structures, functions, processing units and processing means taught in the embodiments can be realized via hardware by designing integrated circuits, for example. Further, the respective structures and functions can be realized via software by interpreting and executing programs for realizing the respective functions via processors. Information such as programs, table and files for realizing the respective functions can be stored in recording or memory devices such as memories, hard disks and SSDs (Solid State Drives), or in recording or memory media such as IC (Integrated Circuit) cards, SD memory cards and DVDs (Digital Versatile Discs).

Moreover, according to the above embodiments, control lines only considered necessary for description are shown, and not all the control lines and information lines required in a product are shown. It is possible to mutually couple all the components.

INDUSTRIAL APPLICABILITY

The present invention can be applied to information processing apparatuses such as large-scale computers, general purpose computers, servers and personal computers, to storage systems such as storage systems, and to advanced cellular phones.

REFERENCE SIGNS LIST

1 Computer system
10 Host computer
10A, 10B Host computer
13 Logical device management information table
14 Pool management information table
15 Pool tier management information table
20 Management server
30 Storage system
30A First storage system
30B Second storage system
31 Controller
32 Cache memory
33 Shared memory
34, 163 Physical device
35 Power supply switch
36 Power supply
40 Management network
42, 60 Pool
50 Storage area network
80 Media management information table
90 Tier management information table
101 VM
112 Storage interface
110, 210 Input device
111 VM control unit
120, 220 Output device
121 First network
123 Second network
108 Third network
125 First storage system
161 Second storage system
125A First storage system
125B Second storage system
127 Front end interface
129 Port
130, 230 CPU
131, 135, 140, 171, 240, 350 Memory
133, 139 Local router
137 Back end interface
141 Disk interface
143, 167, 360 Processor
150 Disk adapter
153 Maintenance management terminal
155 Second internal network
156 First internal network
160, 162, 250, 320 Network adapter
164, 310 Host adapter
165 Controller
169, 370 Storage adapter
170, 260 Disk drive
172 Cache memory
301 Copied volume
301AA Volume
303, 303B VM status management unit
330 Nonvolatile memory
340 Power supply control unit
351 Configuration information
352 Pool information
380 Shared memory adapter
400 Class 1 virtual device
401 Class 2 virtual device
411A Virtual page
411, 412, 413, 414, 415, 416 Virtual volume
417, 418, 419, 420, 421, 428, 800 Virtual volume
426, 900 Pool volume
427 Tier
427A, 440 Page
422, 424, 425 Real volume
500 Class 1 logical device
501 Class 2 logical device
600 External storage
700, 701 Target device
802 Media type
804, 1414, 1514 Capacity
806 Response time
902 Tier number
904 Media storage location information
908 Rotation speed
910 RAID level
1200 LANE management information table
1251 Module
1251A First module 1251B Second module
1300 Logical device specific information table
1310, 1610, 1810 Logical device number
1312 Size
1314 Device attributes
1316, 1410, 1510 Pool ID
1318 Device status
1320 LANE number
1400 Pool specific information table
1412 Usage
1416, 1516 Free space
1418, 1518 Number of pool volumes
1420, 1520 Pool volume device number list
1422, 1522 Number of Devices
1424, 1524 Device number
1426 Tier list
1500 Pool tier specific information table
1512, 1650, 1834, 1844 Tier number
1526 Pool volume list
1561 Network
1601 Virtual volume directory management information table
1620, 1820 Entry
1640, 1832 PSCB pointer
1701, PSCB (Pool Slot Control Block) management information table
1720 Pool volume address
1730 PSCB forward pointer
1740 PSCB backward pointer
1801 Virtual volume directory management information table
1802 Virtual volume directory information pointer
1812 Pair information entry
1814 Pointer
1816 Pair source device number pointer
1818 Generation number
1819 Pair continuous number
1836 Generation management information
1838 Generation number counter
1840 VM utilization status information
1842 VM usage generation counter
1900 Host computer management information table
1901 Host computer specific information table
1910 Host computer identifier
1920 Coupled storage system identifier
1930 Storage area information
2000 VM management information table
2001 VM specific information table
2010, 2030, 2110 VM identifier
2020 Physical host computer identifier
2040 Allocated resource
2050 Usage information
2100 VM status management information table
2101 VM status specific information table
2120, 2220 VM status
3501 Command control program
3503 Configuration control program
3504 Disk I/O program
3505 File control program
3506 Rebalancing program
3507 Pool control program
3508 VM status management program
3510 Relocation program
3511 Address management table
4112 Line mapping virtual page and pool page
10000 Alternate path program
30002 Pool volume group #0
30004 Pool volume group #1
30006 Pool volume group #2

The invention claimed is:

1. A computer system comprising a host computer on which at least one virtual machine is operated, a management server and a storage system mutually coupled to one another,
wherein the storage system comprises a control unit, a cache memory unit, a shared memory unit, a physical memory device unit composed of multiple types of devices, and a virtual machine status management unit;
the control unit is configured to generate multiple logical volumes to be assigned to the host computer;
the physical memory device unit is composed of the multiple types of devices having a tier assigned to each type of devices;
the logical volumes are mapped to the virtual machines; and
the type of the physical memory device assigned to the logical volume mapped to the virtual machine is changed based on a status information of the virtual machine that the virtual machine status management unit acquires from the virtual machine,
wherein the logical volumes are composed of a real volume, a first snapshot volume of the real volume, and a second snapshot volume of the first snapshot volume, wherein the real volume is mapped to the first snapshot volume and the first snapshot volume is mapped to the second snapshot volume, thereby adopting a cascading structure.

2. A computer system comprising a host computer on which at least one virtual machine is operated, a management server and a storage system mutually coupled to one another,
wherein the storage system comprises a control unit, a cache memory unit, a shared memory unit, a physical memory device unit composed of multiple types of devices, and a virtual machine, status management unit;
the control unit is configured to generate multiple logical volumes to be assigned to the host computer;
the physical memory device unit is composed of the multiple types of devices having a tier assigned to each type of devices;
the logical volumes are mapped to the virtual machines; and
the type of the physical memory device assigned to the logical volume mapped to the virtual machine is changed based on a status information of the virtual machine that the virtual machine status management unit acquires from the virtual machine,
wherein the logical volumes are composed of a real volume, a virtual volume, and a snapshot volume of the virtual volume, and when an access request occurs from the virtual machine to the virtual volume, a storage area of the physical memory device unit is assigned to the virtual volume.

3. A computer system comprising a host computer on which at least one virtual machine is operated, a management server and a storage system mutually coupled to one another,
wherein the storage system comprises a control unit, a cache memory unit, a shared memory unit, a physical memory device unit composed of multiple types of devices, and a virtual machine status management unit;
the control unit is configured to generate multiple logical volumes to be assigned to the host computer;
the physical memory device unit is composed of the multiple types of devices having a tier assigned to each type of devices, the logical volumes are mapped to the virtual machines; and the type of the physical memory device assigned to the logical volume mapped to the virtual machine is changed based on a status information of the virtual machine that the virtual machine status management unit acquires from the virtual machine, wherein the logical volumes are composed of a real volume, a virtual volume, a first virtual snapshot volume of the virtual volume, and a second virtual snapshot volume of the first virtual snapshot volume, wherein the virtual volume is mapped to the first virtual snapshot volume and the first virtual snapshot volume is mapped to the second virtual snapshot volume, thereby adopting a cascading structure, and when an access request occurs from the virtual machine to the virtual volume, a storage area of the physical memory device unit is assigned to the virtual volume.

4. A computer system comprising a host computer on which at least one virtual machine is operated, a management server and a storage system mutually coupled to one another, wherein the storage system comprises a control unit, a cache memory unit, a shared memory unit, a physical memory device unit composed of multiple types of devices, and a virtual machine status management unit;

the control unit is configured to generate multiple logical volumes to be assigned to the host computer;

the physical memory device unit is composed of the multiple types of devices having a tier assigned to each type of devices;

the logical volumes are mapped to the virtual machines; and the type of the physical memory device assigned to the logical volume mapped to the virtual machine is changed based on a status information of the virtual machine that the virtual machine status management unit acquires from the virtual machine, wherein the logical volumes are composed of a virtual volume, a first virtual snapshot volume of the virtual volume, and a second virtual snapshot volume of the first virtual snapshot volume, wherein the virtual volume is mapped to the first virtual snapshot volume and the first virtual snapshot volume is mapped to the second virtual snapshot volume, thereby adopting a cascading structure, and when an access request occurs from the virtual machine to the virtual volume, a storage area of the physical memory device unit is assigned to the virtual volume.

* * * * *